US009780573B2

(12) United States Patent
McCauley et al.

(10) Patent No.: US 9,780,573 B2
(45) Date of Patent: Oct. 3, 2017

(54) WIRELESSLY CHARGED BATTERY SYSTEM

(71) Applicant: WiTricity Corporation, Watertown, MA (US)

(72) Inventors: Alexander P. McCauley, Cambridge, MA (US); Morris P. Kesler, Bedford, MA (US); Abdel Sam Rhoufiry, Logan, UT (US); Simone Agha, Somerville, MA (US); Arunanshu M. Roy, Cambridge, MA (US)

(73) Assignee: WiTricity Corporation, Watertown, MA (US)

( * ) Notice: Subject to any disclaimer, the term of this patent is extended or adjusted under 35 U.S.C. 154(b) by 334 days.

(21) Appl. No.: 14/612,653

(22) Filed: Feb. 3, 2015

(65) Prior Publication Data

US 2015/0222129 A1    Aug. 6, 2015

Related U.S. Application Data

(60) Provisional application No. 61/935,224, filed on Feb. 3, 2014.

(51) Int. Cl.
*H01F 38/14*       (2006.01)
*H02J 5/00*        (2016.01)
(Continued)

(52) U.S. Cl.
CPC .............. *H02J 5/005* (2013.01); *H01F 27/02* (2013.01); *H01F 27/362* (2013.01);
(Continued)

(58) Field of Classification Search
CPC ...... H01F 27/02; H01F 27/362; H01F 27/365; H01F 38/14; H02J 5/005; H02J 7/025;
(Continued)

(56) References Cited

U.S. PATENT DOCUMENTS 645,576 A    3/1900 Telsa
649,621 A    5/1900 Tesla
(Continued)

FOREIGN PATENT DOCUMENTS

CA        142352      8/1912
CN     102239633     11/2011
(Continued)

OTHER PUBLICATIONS

"Intel CTO Says Gap between Humans, Machines Will Close by 2050", *Intel News Release*, (See intel.com/ . . . /20080821comp.htm?iid=S . . . ) (Printed Nov. 6, 2009).
(Continued)

*Primary Examiner* — Levi Gannon
(74) *Attorney, Agent, or Firm* — Fish & Richardson P.C.

(57) ABSTRACT

The disclosure features power transmitting apparatus for wireless power transfer to a receiver that includes a housing having a form factor that corresponds to a container featuring lateral surfaces, a bottom surface, and an opening opposite the bottom surface, a first coil formed by a continuous path of electrically conductive material and featuring a plurality of non-planar loops that conform to a first pair of opposite lateral surfaces and to the bottom surface, and a second coil formed by a continuous path of electrically conductive material and featuring a plurality of non-planar loops that conform to a second pair of opposite lateral surfaces and to the bottom surface.

21 Claims, 41 Drawing Sheets

(51) Int. Cl.
*H02J 7/00* (2006.01)
*H02J 7/02* (2016.01)
*H01F 27/02* (2006.01)
*H01F 27/36* (2006.01)
*H02J 50/12* (2016.01)

(52) U.S. Cl.
CPC ........... *H01F 27/365* (2013.01); *H01F 38/14* (2013.01); *H02J 7/0044* (2013.01); *H02J 7/025* (2013.01); *H02J 50/12* (2016.02); *H02J 7/0042* (2013.01)

(58) Field of Classification Search
CPC ........ H02J 7/0042; H02J 7/0044; H02J 17/00; H02J 50/10; H02J 50/12; H04B 5/0037; H04B 5/0075
USPC ....................................................... 307/104
See application file for complete search history.

(56) References Cited

U.S. PATENT DOCUMENTS

| | | | |
|---|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hierig et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |

(56) References Cited

U.S. PATENT DOCUMENTS

| | | |
|---|---|---|
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman et al. |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |

(56) References Cited

U.S. PATENT DOCUMENTS

| | | |
|---|---|---|
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarman et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Partovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |

(56) References Cited

U.S. PATENT DOCUMENTS

| | | |
|---|---|---|
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1* | 8/2010 | Mobarhan ............... H02J 5/005 307/104 |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0259401 A1* | 10/2010 | Azancot ............... H01F 38/14 340/657 |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |

(56) References Cited

U.S. PATENT DOCUMENTS

| | | |
|---|---|---|
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Capanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0093386 A1* | 4/2013 | Tsai ................... H02J 5/005 320/108 |
| 2013/0099587 A1 | 4/2013 | Lou et al. |
| 2013/0127253 A1* | 5/2013 | Stark ................. A61N 1/3787 307/104 |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0175877 A1* | 7/2013 | Abe ................. H04B 5/0037 307/104 |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0008996 A1* | 1/2014 | Iwasa ..................... E04B 5/43 307/104 |
| 2014/0070764 A1 | 3/2014 | Keeling |
| 2014/0091756 A1* | 4/2014 | Ofstein ................ H02J 5/005 320/108 |
| 2014/0252869 A1* | 9/2014 | Kamiura ............... H02J 7/025 307/104 |
| 2014/0292100 A1* | 10/2014 | Lee ..................... H01F 38/14 307/104 |
| 2014/0375258 A1* | 12/2014 | Arkhipenkov ......... H02J 7/025 320/108 |
| 2015/0015082 A1* | 1/2015 | Kanagawa ............ H02J 5/005 307/104 |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |

(56) References Cited

FOREIGN PATENT DOCUMENTS

| | | |
|---|---|---|
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).

"In pictures: A year in technology", *BBC News*, (Dec. 28, 2007).

"Next Little Thing 2010 Electricity without wires", CNN Money (See money.cnn.com/galleries/2009/smallbusiness/0911/gallery.next_little_thing_2010.smb/) (dated Nov. 30, 2009).

Abe et al. "A Noncontact Charger Using a Resonant Converter with Parallel Capacitor of the Secondary Coil". IEEE, 36(2):444-451, Mar./Apr. 2000.

Ahmadian, M. et al., "Miniature Transmitter 25th Annual International Conference for Implantable Micro Systems", *Proceedings of the 25th Annual International Conference of the IEEE EMBS Cancun, Mexico*, pp. 3028-3031 (Sep. 17-21, 2003).

Aoki, T. et al., "Observation of strong coupling between one atom and a monolithic microresonator", Nature, vol. 443:671-674 (2006).

Apneseth et al. "Introducing wireless proximity switches" ABB Review Apr. 2002.

Aristeidis Karalis et al., "Efficient Wireless non-radiative mid-range enegery transfer", *Annals of Physics*, vol. 323, pp. 34-48 (2008).

Baker et al., "Feedback Analysis and Design of RF Power Links for Low-Power Bionic Systems," *IEEE Transactions on Biomedical Circuits and Systems*, vol. 1(1):28-38 (Mar. 2007).

Balanis, C.A., "Antenna Theory: Analysis and Design," 3rd Edition, Sections 4.2, 4.3, 5.2, 5.3 (Wiley, New Jersey, 2005).

Berardelli, P., "Outlets Are Out", ScienceNow Daily News, Science Now, http://sciencenow.sciencemag.org/ cgi/content/full/2006/1114/2, (Nov. 14, 2006) 2 pages.

Biever, C., "Evanescent coupling' could power gadgets wirelessly", NewScientistsTech.com, http://www. newscientisttech.com/article.ns?id=dn1 0575&print=true, (Nov. 15, 2006) 2 pages.

Borenstein, S., "Man tries wirelessly boosting batteries", (The Associated Press), USA Today, (Nov. 16, 2006) 1 page.

Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).

Boyle, A., "Electro-nirvana? Not so fast", MSNBC, http://lcosmiclog.msnbc.msn.com/_news/2007/06/08/4350760- electro-nirvana-not-so-fast, (Jun. 8, 2007) 1 page.

Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).

Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).

Budhia, M. et al.,"Development of a Single-Sided Flux Magnetic Coupler for Electric Vehicle IPT", *IEEE Transactions on Industrial Electronics*, vol. 60:318-328 (Jan. 2013).

Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.

Burn et al., "Invention Description", (Feb. 5, 2008).

Cass, S., "Air Power—Wireless data connections are common—now scientists are working on wireless power", Sponsored by IEEE Spectrum, http://spectrum.ieee.org/computing/hardware/air-power, (Nov. 2006) 2 pages.

Castelvecchi, Davide, "The Power of Induction—Cutting the last cord could resonate with our increasingly gadget dependent lives", *Science News Online*, vol. 172, No. 3, Jul. 21, 2007, 6 pages.

Chang, A., "Recharging the Wireless Way—Even physicists forget to recharge their cell phones sometimes.", PC Magazine, ABC News Internet Ventures, (Dec. 12, 2006) 1 page.

Chinaview, ,"Scientists light bulb with 'wireless electricity",www.Chinaview.cn, http://news.xinhuanet.com/english/2007-06/08/content_6215681.htm,Jun. 2007,1 page.

Cooks, G., "The vision of an MIT physicist: Getting rid of pesky rechargers", Boston.com, (Dec. 11, 2006) 1 page.

Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.

(56) References Cited

OTHER PUBLICATIONS

Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/675955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs",(Science Editor), Telegraph.co.uk, http://www.telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).

Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", Proceedings of IEEE TENCON—Poster Papers, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.

(56) References Cited

OTHER PUBLICATIONS

Press Release, "The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission via an Inductive Link", *IEEE Transactions on Biomedical Engineering*, vol. 37, No. 7, pp. 716-722 (Jul. 1990).

* cited by examiner

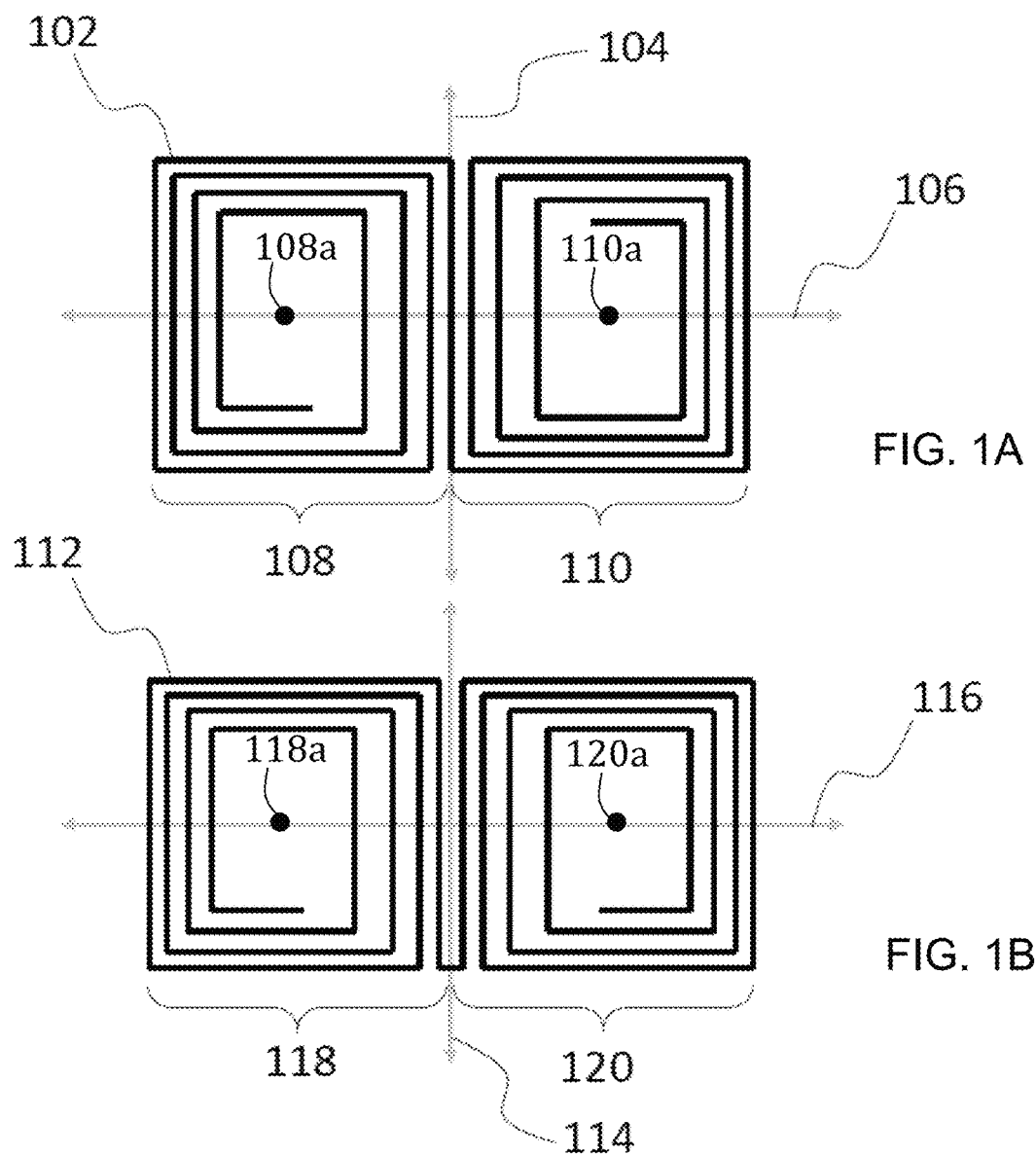

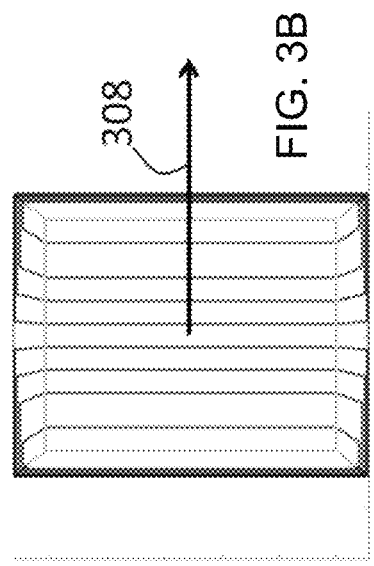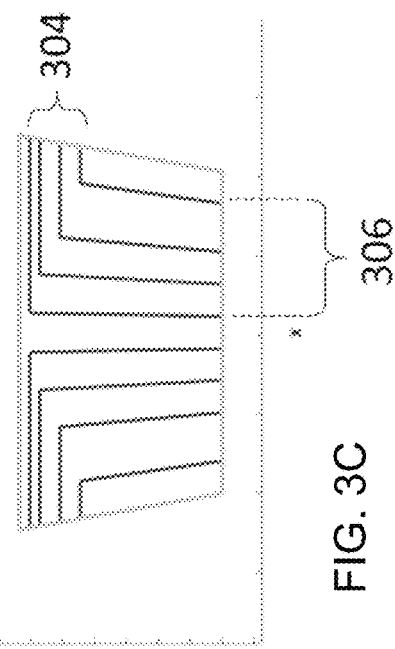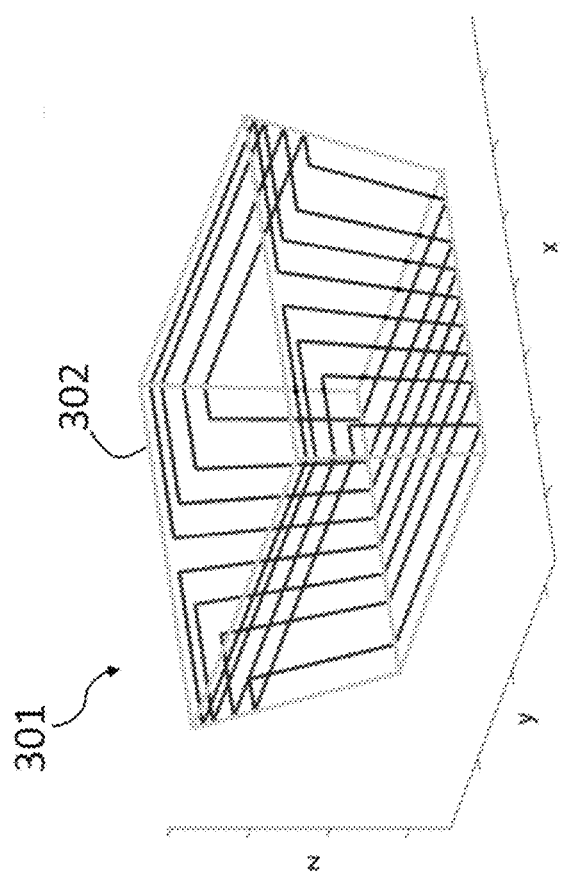

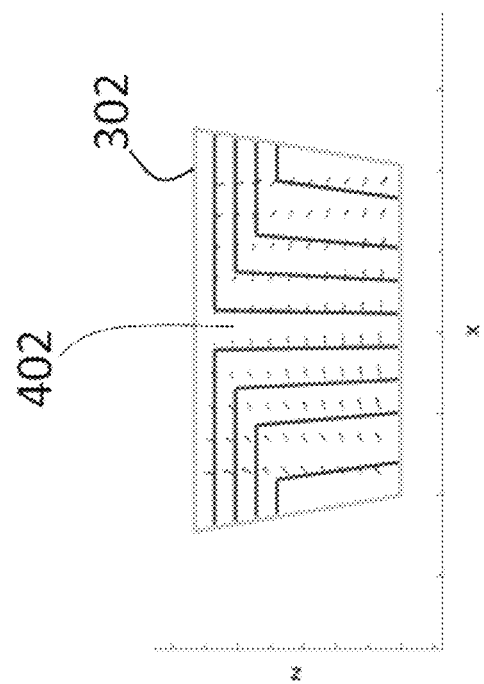
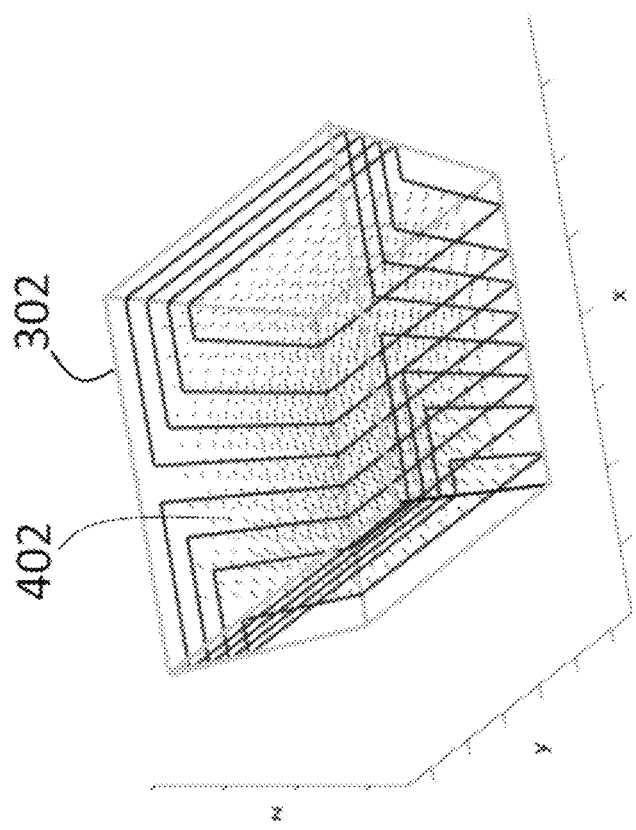
FIG. 4B
FIG. 4A

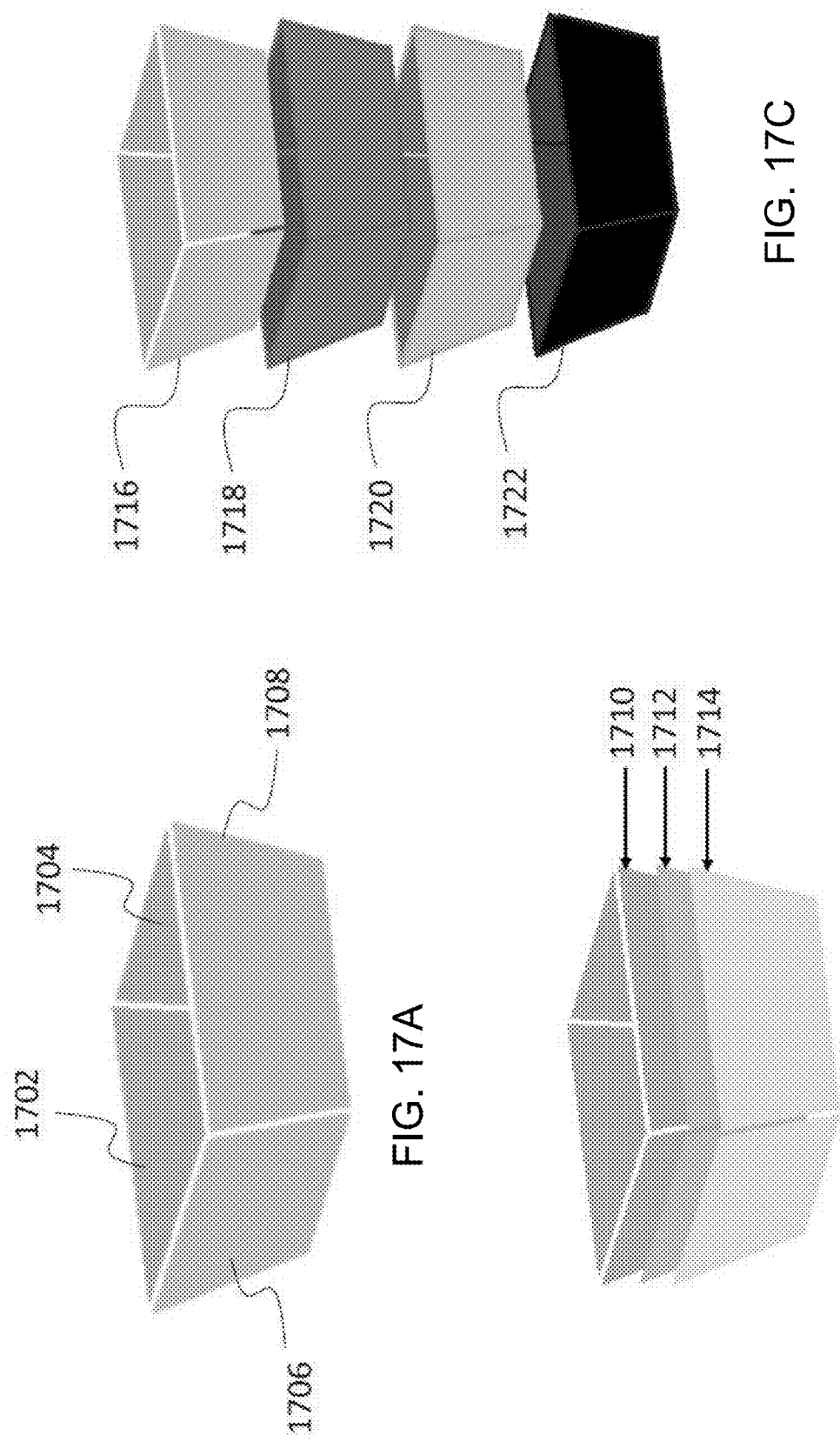

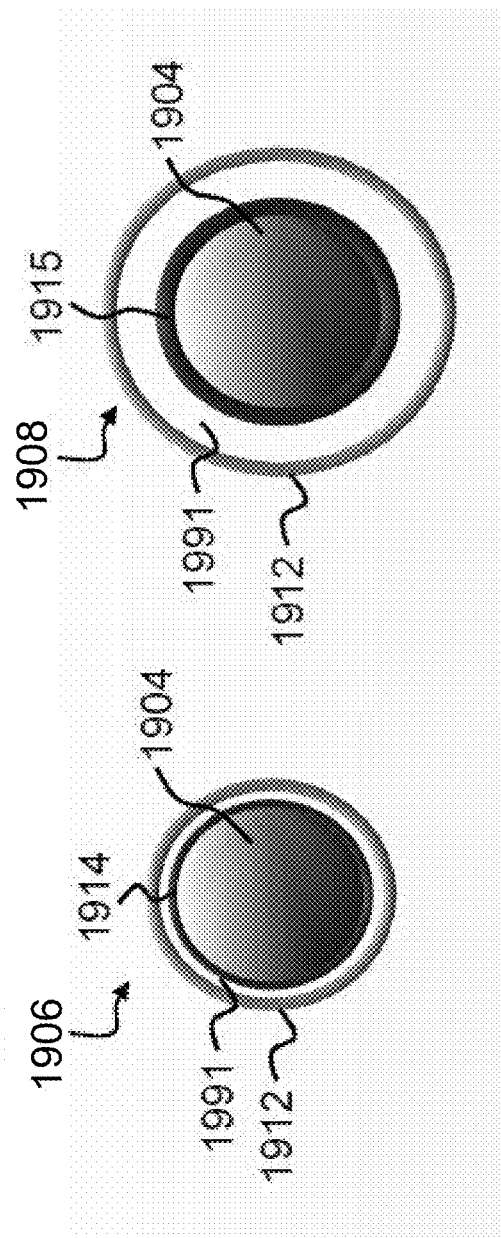

Technical Specifications: GP Ni-MH Industrial Rechargeable Batteries

GP Ni-MH batteries have high energy density and deliver up to double the capacity of Ni-CD batteries of similar size. They are most suitable for sophisticated high drain applications such as video cameras, cellular phones, notebook computers, and more.

HIGH CAPACITY SERIES

| Size | Model | V | mAh | mAh | D | H | Wt | | | |
|---|---|---|---|---|---|---|---|---|---|---|
| AAA | GP40AAAM | 1.2 | 400 | 428 | 10.2 | 22.2 | 7.7 | 40 | 16 | 400 |
| 2/3 AAA | GP50AAAH | 1.2 | 500 | 515 | 10.4 | 36.3 | 9.3 | 50 | 16 | 500 |
| 4/5 AAA | GP65AAAH | 1.3 | 650 | 680 | 10.5 | 43.7 | 13 | 65 | 16 | 650 |
| AAA | GP70AAAH | 1.3 | 700 | 730 | 10.5 | 43.7 | 13 | 70 | 16 | 700 |
| | GP75AAAH | 1.2 | 750 | 780 | 10.5 | 43.7 | 13 | 75 | 16 | 750 |
| | GP80AAAH | 1.2 | 780 | 800 | 10.5 | 43.7 | 14 | 80 | 16 | 800 |
| AAAL | GP85AAALH | 1.2 | 850 | 860 | 10.5 | 50 | 18 | 85 | 16 | 850 |
| 7/5 AAAL | GP100AAALH | 1.3 | 1000 | 1050 | 10.5 | 66.5 | 19.5 | 100 | 16 | 1000 |
| 9/5 AAAL | GP120AAALH | 1.2 | 1200 | 1250 | 10.5 | 80 | 23 | 120 | 16 | 1200 |
| 2/3 AA | GP75AAH | 1.2 | 750 | 770 | 14.5 | 28.7 | 15 | 75 | 16 | 750 |
| AA | GP150AAH** | 1.3 | 1500 | 1530 | 14.4 | 48.2 | 26 | 150 | 16 | 1500 |
| | GP160AAH** | 1.2 | 1600 | 1640 | 14.5 | 49.2 | 26 | 160 | 16 | 1600 |
| | GP170AAH | 1.2 | 1700 | 1750 | 14.5 | 49.2 | 27 | 170 | 16 | 1700 |
| | GP180AAH | 1.2 | 1800 | 1850 | 14.5 | 49.2 | 27 | 180 | 16 | 1800 |
| 7/5 AA | GP190AAH | 1.2 | 1900 | 1960 | 14.5 | 65 | 35 | 190 | 16 | 1900 |

| Medium | Susceptibility χ∗ Permeability μ [N/m²] (volumetric SI) | Relative Permeability μ/μ₀ | Magnetic field | Frequency max. |
|---|---|---|---|---|
| Metglas | 1.25 | 1,000,000[5] | at 0.5 T | 100 kHz |
| Nanoperm | 10×10⁻² | 80,000[6] | at 0.5 T | 10 kHz |
| Mu-metal | 2.5×10⁻² | 20,000[7] | at 0.002 T | |
| Mu-metal | | 50,000[8] | | |
| Cobalt-iron (high permeability strip material) | | 18,000[9] | | |
| Permalloy | 8,000 | 8,000[7] | at 0.002 T | |
| Electrical steel | 5.0×10⁻³ | 4,000[7] | at 0.002 T | |
| Ferritic Stainless Steel (annealed) | | 1000 – 1800[10] | | |
| Martensitic Stainless Steel (annealed) | | 750 – 950[10] | | |
| Ferrite (manganese zinc) | >8.0×10⁻⁴ | (640 or more) | | 100 kHz ~ 1 MHz |
| Ferrite (nickel zinc) | 2.0×10⁻⁵ – 8.0×10⁻⁴ | 16–640 | | 100 kHz ~ 1 MHz |

FIG. 22C

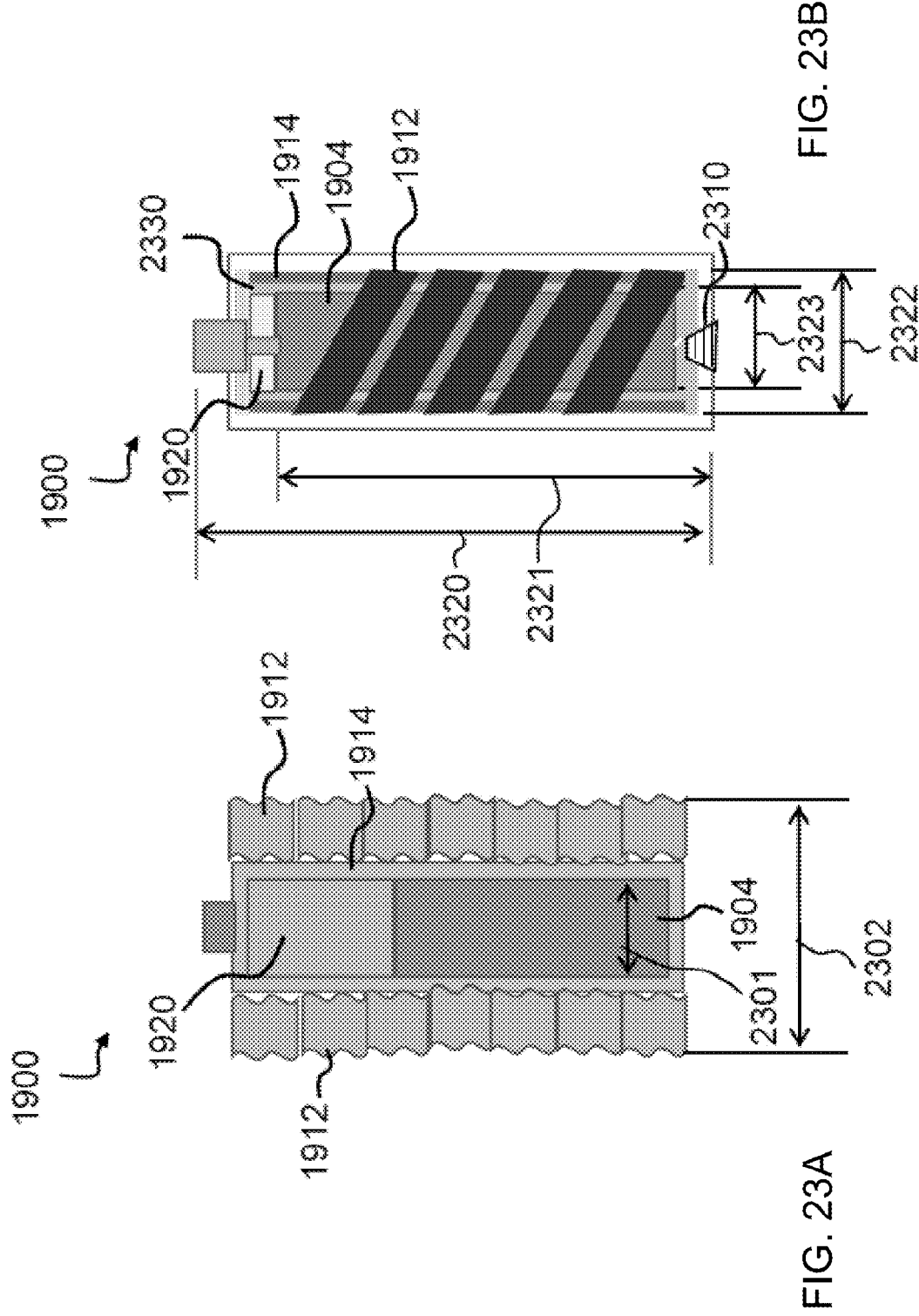

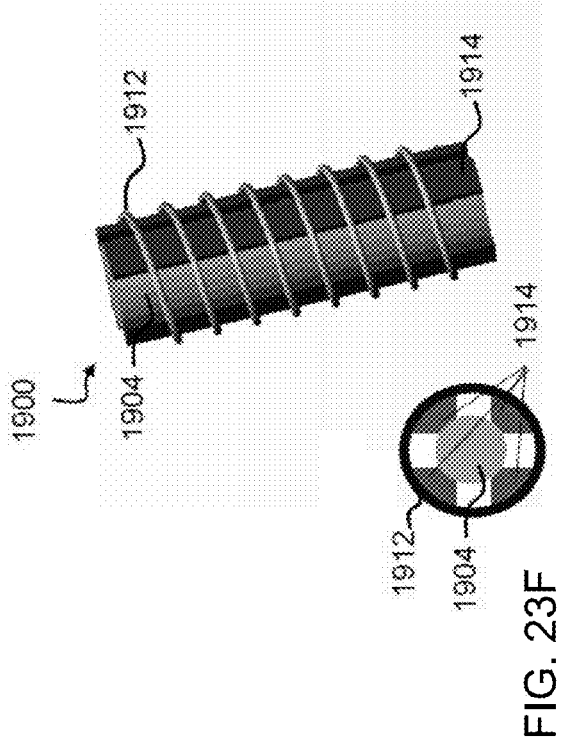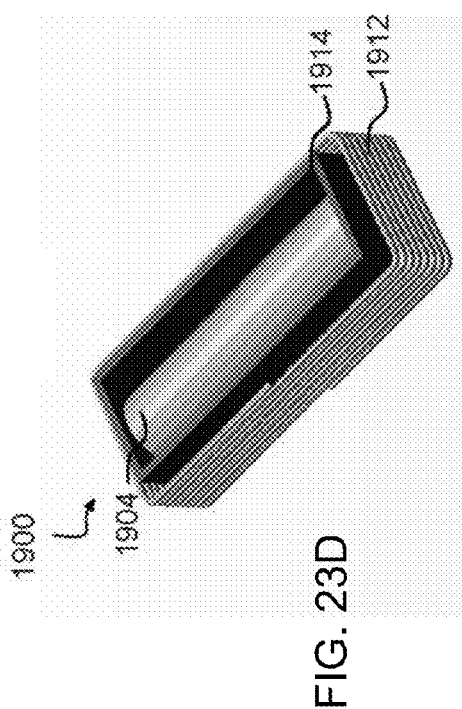

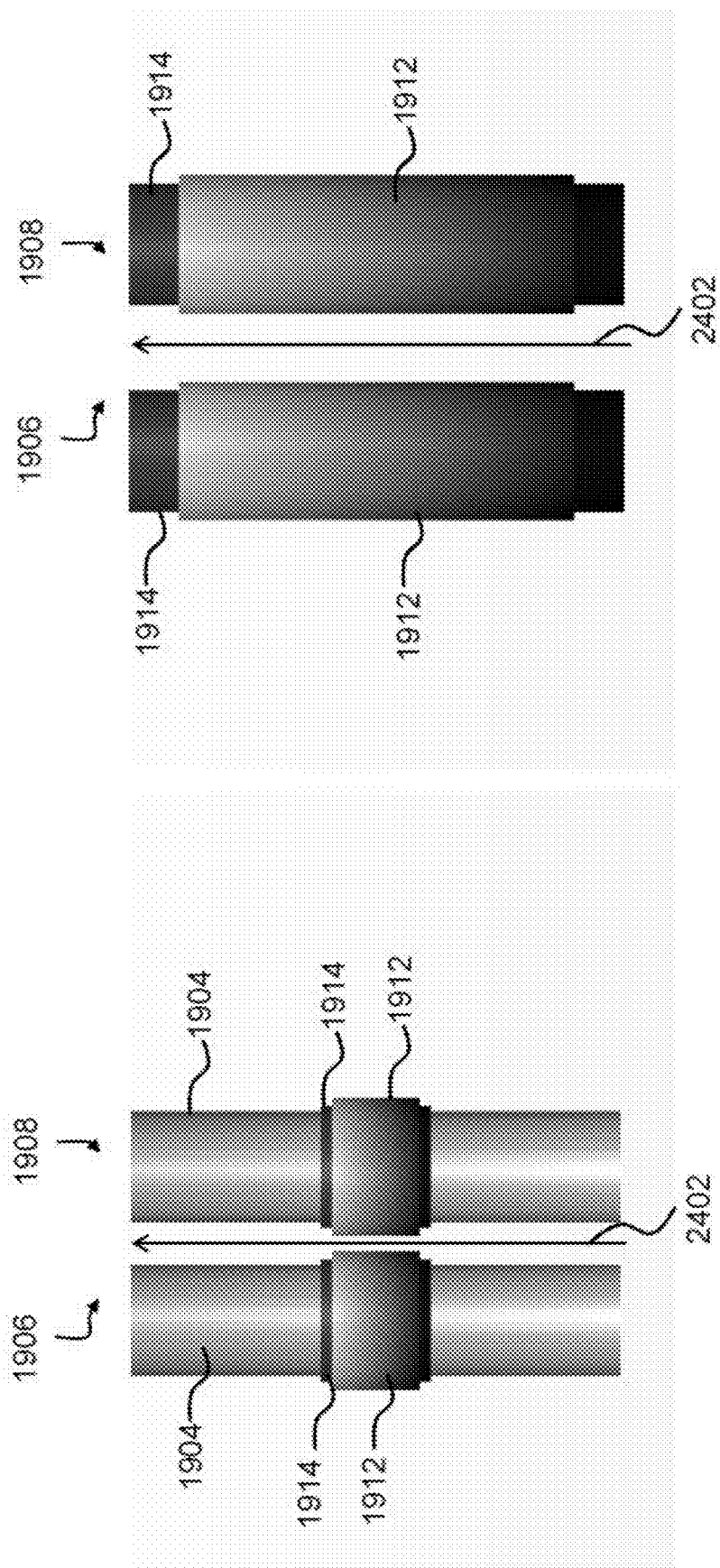

WIRELESSLY CHARGED BATTERY SYSTEM

CROSS REFERENCE TO RELATED APPLICATIONS

This application claims priority to U.S. Provisional Application No. 61/935,224, filed on Feb. 3, 2014, the entire contents of which are incorporated herein by reference.

TECHNICAL FIELD

This disclosure relates to wireless power transfer, including wireless power transfer to, and charging of, batteries and battery systems.

BACKGROUND

Energy can be transferred from a power source to receiving device using a variety of known techniques such as radiative (far-field) techniques. For example, radiative techniques using low-directionality antennas can transfer a small portion of the supplied radiated power, namely, that portion in the direction of, and overlapping with, the receiving device used for pick up. In this example, most of the energy is radiated away in all the other directions than the direction of the receiving device, and typically the transferred energy is insufficient to power or charge the receiving device. In another example of radiative techniques, directional antennas are used to confine and preferentially direct the radiated energy towards the receiving device. In this case, an uninterruptible line-of-sight and potentially complicated tracking and steering mechanisms are used.

Another approach is to use non-radiative (near-field) techniques. For example, techniques known as traditional induction schemes do not (intentionally) radiate power, but uses an oscillating current passing through a primary coil, to generate an oscillating magnetic near-field that induces currents in a near-by receiving or secondary coil. Traditional induction schemes can transfer modest to large amounts of power over very short distances. In these schemes, the offset tolerance offset tolerances between the power source and the receiving device are very small. Electric transformers and proximity chargers are examples using the traditional induction schemes.

SUMMARY

In general, in a first aspect, the disclosure features a power transmitting apparatus for wireless power transfer to a receiver, the apparatus including a housing having a form factor that corresponds to a container having lateral surfaces, a bottom surface, and an opening opposite the bottom surface, and a coil that conforms to a shape of the housing, where the coil is formed by a continuous path of electrically conductive material and includes a first plurality of non-planar loops that conform to multiple lateral surfaces and the bottom surface, and a second plurality of non-planar loops that conform to multiple lateral surfaces and the bottom surface.

Embodiments of the apparatus can include any one or more of the following features.

The first and second pluralities of loops can be positioned so that during operation of the power transmitting apparatus, a magnetic field dipole extends from the first plurality of loops to the second plurality of loops in a direction substantially perpendicular to at least one lateral surface of the housing. By way of example, a direction is "substantially perpendicular" to a surface if the direction forms an angle with a normal to the surface that is less than 15°.

Each lateral surface of the housing can include a first edge width measured at a position where the lateral surface contacts the bottom surface, and a second edge width measured at a position opposite to the position where the lateral surface contacts the bottom surface, and the second edge width can be larger than the first edge width. The second edge width can be larger than the first edge width by a factor of at least 1.1 (e.g., by a factor of at least 1.4, by a factor of at least 1.6, by a factor of up to 2.0).

The first plurality of loops and the second plurality of loops can be wound in a common helical direction about an axis that extends through a center of the first plurality of loops and through a center of the second plurality of loops. The first plurality of loops and the second plurality of loops can be wound in an opposite helical direction about an axis that extends through a center of the first plurality of loops and through a center of the second plurality of loops.

During operation, the apparatus can be configured to generate an oscillating magnetic field at a frequency of between 10 kHz and 100 MHz (e.g., a frequency of about 6.78 MHz) to transfer power to a receiver. The apparatus can be configured to generate an oscillating magnetic field that includes frequency components at two or more frequencies between 10 kHz and 100 MHz (e.g., a frequency of about 6.78 MHz and a frequency of about 13.56 MHz) to transfer power to a receiver.

Spacings between adjacent loops can vary in the first plurality of loops and in the second plurality of loops. Each of the lateral surfaces can include a lower edge that is adjacent to the bottom surface and an upper edge opposite the lower edge, and spacings between adjacent loops in the first and second pluralities of loops can be larger adjacent to the upper edge than adjacent to the lower edge.

The housing can include a planar bottom surface and four lateral surfaces, each of the lateral surfaces being inclined at an angle of between 90° and 180° relative to the bottom surface. The housing can include a bottom surface and curved lateral surfaces that are joined to the bottom surface to form a housing with a continuously curved shape. Each lateral surface can be planar and can have a trapezoidal shape, and each lateral surface can include a lower edge that contacts the bottom surface and an upper edge wider than the lower edge and positioned opposite the lower edge. The first plurality of loops can overlap portions of a first, a second, and a third lateral surface, where the first and second lateral surfaces are positioned on opposite sides of the bottom surface. The second plurality of loops can overlap portions of the second, the third, and a fourth lateral surface, where the fourth lateral surface is positioned on an opposite side of the bottom surface from the first lateral surface. The first and second pluralities of loops can each overlap a portion of the bottom surface.

The coil can be positioned outside a volume enclosed by the lateral surfaces and bottom surface of the housing. The coil can be positioned within a volume enclosed by the lateral surfaces and bottom surface of the housing. The coil can be positioned within the lateral surfaces and bottom surface of the housing. The coil can be positioned on or within an insert that is dimensioned to fit within a volume enclosed by the lateral surfaces and bottom surface of the housing. The container can correspond to a box or a bowl.

Embodiments of the apparatus can also include any of the other aspects and/or features disclosed herein, including aspects and features disclosed in different embodiments, in any combination as appropriate.

In another aspect, the disclosure features a power transmitting apparatus for wireless power transfer to a receiver, the apparatus including a housing having a form factor that corresponds to a container having lateral surfaces, a bottom surface, and an opening opposite the bottom surface, a first coil formed by a continuous path of electrically conductive material and having a plurality of non-planar loops that conform to a first pair of opposite lateral surfaces and to the bottom surface, and a second coil formed by a continuous path of electrically conductive material and having a plurality of non-planar loops that conform to a second pair of opposite lateral surfaces and to the bottom surface.

Embodiments of the apparatus can include any one or more of the following features.

Each lateral surface of the housing can include a first edge width measured at a position where the lateral surface contacts the bottom surface, and a second edge width measured at an opening opposite to the position where the lateral surface contacts the bottom surface, and where the second edge width is larger than the first edge width.

The first and second coils can be positioned so that during operation of the power transmitting apparatus, the first coil generates a magnetic field having a dipole moment that extends in a first direction, and the second coil generates a magnetic field having a dipole moment that extends in a second direction substantially perpendicular to the first direction. By way of example, one direction is "substantially perpendicular" to another direction if an included angle between the two directions is less than 15°.

The first and second coils can be positioned outside a volume enclosed by the lateral surfaces and bottom surface. The first and second coils can be positioned inside a volume enclosed by the lateral surfaces and bottom surface. The first and second coils can be positioned on or within a sleeve that is dimensioned to conform to a shape of the housing.

The first coil can be positioned on or within a first sleeve that is dimensioned to conform to a shape of the housing, and the second coil can be positioned on or within a second sleeve that is dimensioned to conform to a shape of the housing or to a shape of the first sleeve.

The housing can include first supporting layer. The first supporting layer can include magnetic material. The magnetic material can include a ferrite material. The housing can include a second layer featuring a shielding material. The shielding material can include copper.

The apparatus can include a third coil having a plurality of non-planar loops that conform to each of the lateral surfaces. During operation of the power transmitting apparatus, the third coil can generate a magnetic field having a dipole moment that extends in a third direction substantially perpendicular to the first and second directions.

The first, second, and third coils can be printed on one or more circuit boards. The first, second, and third coils can each be positioned on or within sleeves. The sleeves can be stacked to form a shell external to or internal to the housing.

One of the first, second, and third coils can be positioned external to the housing, another one of the first, second, and third coils can be positioned internal to the housing, and another one of the first, second, and third coils can be positioned within walls of the housing formed by the lateral surfaces and bottom surface.

The first and second directions can be substantially parallel to a plane defined by the bottom surface, and the third direction can be substantially perpendicular to the bottom surface.

The apparatus can include a control unit connected to each of the first, second, and third coils, where during operation, the control unit can be configured to apply a first oscillating electrical potential to the first coil, and apply a second oscillating electrical potential to the second coil, where the second oscillating electrical potential is out of phase with respect to the first oscillating electrical potential. The first and second oscillating electrical potentials can be out of phase by about 90°. The control unit can be configured to apply a third oscillating electrical potential to a third coil, the third coil comprising a plurality of non-planar loops that conform to each of the lateral surfaces, and vary a phase difference between and first and third oscillating electrical potentials between 0° and 90°.

The apparatus can include a first decoupling unit connected to the first coil, a second decoupling unit connected to the second coil, and a third decoupling unit connected to the third coil. Each decoupling unit can be connected in series to a corresponding coil. Each decoupling unit can include one or more decoupling elements. At least one of the one or more decoupling units can include inductors. At least one of the one or more decoupling units can include inductors connected in parallel to capacitors. The capacitors can include capacitors having a variable capacitance.

The first decoupling unit can include a first decoupling element configured to reduce magnetic coupling between the first coil and the second coil, and a second decoupling element configured to reduce magnetic coupling between the first coil and the third coil. The second decoupling unit can include a third decoupling element configured to reduce magnetic coupling between the second coil and the first coil, and a fourth decoupling element configured to reduce magnetic coupling between the second coil and the third coil. The third decoupling unit can include a fifth decoupling element configured to reduce magnetic coupling between the third coil and the first coil, and a sixth decoupling element configured to reduce magnetic coupling between the third coil and the second coil. Each of the first, second, third, fourth, fifth, and sixth decoupling elements can include an inductor, and the control unit can be configured to adjust positions of the first, second, third, fourth, fifth, and sixth decoupling elements to reduce magnetic coupling between the first, second, and third coils. Each of the first, second, third, fourth, fifth, and sixth decoupling elements can include an inductor connected in parallel to a capacitor having a variable capacitance, and the control unit can be configured to adjust capacitances of each of the capacitors in the first, second, third, fourth, fifth, and sixth decoupling elements to reduce magnetic coupling between the first, second, and third coils.

At least some of the inductors can be printed on substrates that are oriented parallel to one another. At least some of the inductors can include coils wound around a common magnetic material. The container can correspond to a box or a bowl.

Embodiments of the apparatus can also include any of the other aspects and/or features disclosed herein, including aspects and features disclosed in different embodiments, in any combination as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

FIGS. 1A and 1B are schematic diagrams showing different embodiments of substantially 2D resonator coils.

FIGS. 3A, 3B, and 3C are schematic diagrams showing perspective, top, and side views, respectively, of an embodiment of a 3D resonator coil.

FIGS. 4A and 4B are schematic diagrams showing an embodiment of a 3D resonator coil with calculated magnetic field lines.

FIG. 17A is a schematic diagram showing an embodiment of a wireless power transmitting apparatus.

FIG. 17B is a schematic diagram showing another embodiment of a wireless power transmitting apparatus.

FIG. 17C is a schematic diagram showing a further embodiment of a wireless power transmitting apparatus.

FIGS. 19J and 19K are schematic diagrams showing end views of the wirelessly chargeable batteries of FIGS. 19H and 19I, respectively.

FIGS. 20A and 20B are tables showing examples of sizes and specifications of battery cells.

FIG. 22C is a table showing properties of a variety of magnetic materials.

FIGS. 23A-23F are schematic diagrams showing embodiments of wirelessly chargeable batteries.

FIGS. 24A and 24B are schematic diagrams showing embodiments of wirelessly chargeable batteries.

Like reference symbols in the various drawings indicate like elements.

DETAILED DESCRIPTION

Figure 2B:
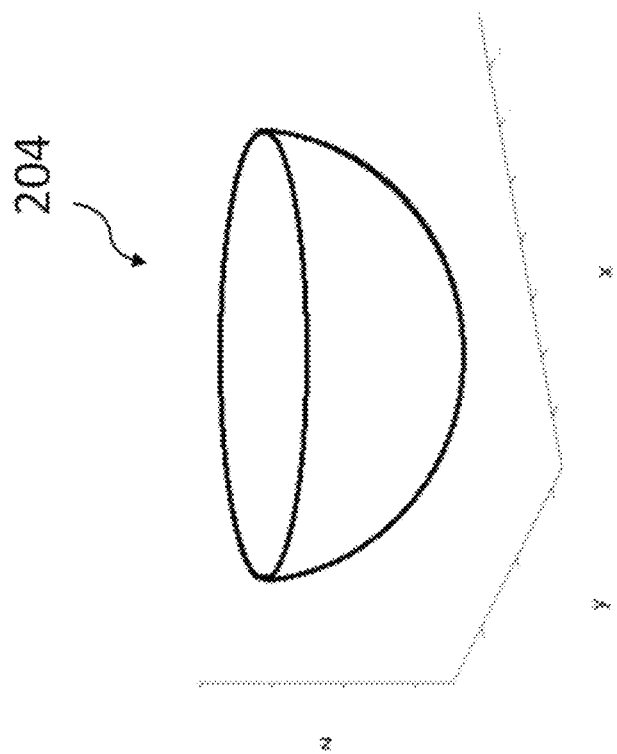
FIGS. 2A and 2B are schematic diagrams showing different embodiments of a wireless power transmitting apparatus.

The methods and systems described herein can be implemented in many ways. Some useful embodiments are described below. However, the scope of the present disclosure is not limited to the detailed embodiments described herein.

A power transmitting apparatus can be configured to transmit power to a power receiving apparatus. For example, the power receiving apparatus can include one or more wirelessly chargeable batteries. One or more receiver resonators can be integrated into the one or more batteries, thereby allowing the battery to be wirelessly rechargeable. As such, a user can conveniently charge the one or more batteries without physically connecting wires to the batteries. The user can not need to often replace the batteries, thereby reducing maintenance needs of an electronic device.

The power transmitting apparatus can include one or more source resonator coils and/or one or more source resonators, which can be activated by a controller. The controller can activate the one or more source coils and/or resonators in a way to generate time-varying magnetic fields in a 3D space in which the power receiving apparatus can be positioned. In some cases, the one or more receiver resonators of the power receiving apparatus can be positioned in a random orientation. The disclosed techniques can be used to activate the one or more source resonators to effectively transmit power to the randomly oriented receiver resonators. This can allow a user to randomly position the power receiving apparatus in or near the power transmitting apparatus without worrying about the orientations of its receiver resonators. In some other cases, the one or more source coils and/or resonators can be activated to transmit power to receiver resonators with a selected orientation. In some embodiments, the power transmitting apparatus and the power receiving apparatus can communicate to optimize the power transfer depending on a condition of the power receiving apparatus. For example, when one or more batteries of the power receiving apparatus is charged above a threshold, the power transmitting apparatus can reduce or stop the power transmission based on the communication.

As used herein, a "coil" is formed from a continuous path of electrically conductive material, and can include one or more loops of the conductive material. In some embodiments, a coil can include a first plurality of loops and one or more additional pluralities of loops. The first plurality of loops and the additional pluralities of loops (e.g., a second plurality of loops) are connected by (e.g., formed from) electrically conductive material. The first plurality of loops can be coplanar with, or non-coplanar with, another plurality of loops forming a portion of the coil.

Source Resonator

In some embodiments, the characteristics of a resonator inductive coil can be an important factor in attaining efficient transfer of wireless energy. FIGS. 1A and 1B show examples of embodiments of resonator inductive coils for efficient transfer of wireless energy. FIG. 1A shows a figure-8 shaped coil 102 that is anti-symmetric about both axes 104 and 106. In other words, the two halves 108 and 110 of coil 102 are oriented with respect to one another such that a center of inversion symmetry is located at the intersection of axes 104 and 106. As a result, the loops in each of the two halves are wound in opposite helical directions. For example, the plurality of loops that correspond to half 108 are wound in a clockwise direction about an axis 118a that extends through a central region of half 108, while the plurality of loops that correspond to half 110 are wound in a counter-clockwise direction about an axis 110a that extends through a central region of half 110.

The resonator inductive coil shown in FIG. 1A can be driven (e.g., by causing an electrical current to flow through the coil) such that the magnetic field dipole moments of the first half 108 of the coil and the second half 110 of the coil can be in different directions relative to one another. For example, the dipole moment of first half 108 of coil 102 can be in the direction out of the plane of FIG. 1A, and the dipole moment of second half 110 of coil 102 can be in the direction into the plane of FIG. 1A.

FIG. 1B shows a figure-8 shaped coil 112 that is symmetric about axis 114. In other words, the two halves 118 and 120 of the coil are mirror images of one another about axis 114. As a result, the loops in each of the two halves are wound in the same helical direction. For example, the plurality of loops that correspond to first half 118 are wound in a clockwise direction about an axis 118a that extends through a central region of first half 118, and the plurality of loops that correspond to second half 120 are also wound in a clockwise direction about an axis 120a that extends through a central region of second half 120.

The resonator inductive coil shown in FIG. 1B can be driven (e.g., by causing an electrical current to flow through the coil) such that the magnetic field dipole moments of the first half 118 of the coil and the second half 120 of the coil can be in the same direction relative to one another. For example, the dipole moments for both first and second halves 118 and 120 of coil 112 can both be directed into or out of the plane of FIG. 1B.

Figure 2A:
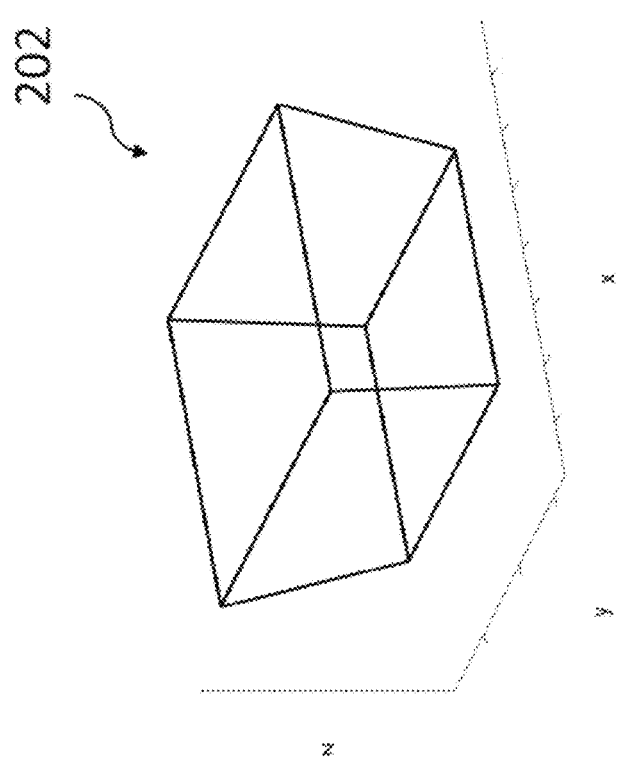

The resonator coils shown in FIGS. 1A and 1B can be shaped such that the resulting shape and density of the oscillating magnetic fields generated when an oscillating current passes through the coils facilitates efficient transfer of energy in a wireless power transmitting apparatus. FIGS. 2A and 2B show examples of embodiments of a wireless power transmitting apparatus. Apparatus 202 in FIG. 2A has a form factor that corresponds to box-like shape, while apparatus 204 in FIG. 2B has a form factor that corresponds to a bowl-like shape.

FIG. 3A shows a schematic diagram of an embodiment of a wireless power transmitting apparatus 301 (e.g., a wireless power source), configured as a "charging box" or "charging volume" or "charging container", and featuring a resonator coil 302 positioned on, in, or near a surface of an enclosure 303. FIGS. 3B and 3C are schematic diagrams that show top and side views, respectively, of resonator coil 302.

In some embodiments, apparatus 301 can include more than one resonator coil. For example, apparatus 301 can include two or more resonator coils connected in series and/or in parallel with one another to form a 3-dimensional figure-8 shaped resonator coil similar to the 2-dimensional figure-8 shaped resonator coil shown in FIG. 1A and FIG. 1B.

In FIGS. 3A-3C, the shape of the resonator coil determines the shape and direction of the oscillating magnetic field generated when a sinusoidal current is applied to the coil. FIG. 3B shows that the dipole moment of the magnetic field generated by coil 302 is substantially along direction 308, parallel to the x-axis (as defined in the coordinate system illustrated in the figure).

The shape of the resonator coil can be selected so that the strength and direction of the resulting magnetic field is approximately uniform within the space enclosed by the resonator coil. As shown in FIG. 3C, in some embodiments the space between adjacent windings of the resonator coil can vary depending on where the windings are positioned relative to enclosure 303. There can be variations in the space between the coil traces positioned anywhere on, in, or near enclosure 303. For example, for coil windings 304 near the top of enclosure 303, the spacing of the coil traces can vary from relatively larger to relatively smaller in the direction of the positive z-axis, as defined by the Cartesian coordinate system shown in FIGS. 3A-3C. Note that the Cartesian coordinate system is provided for purposes of discussion only, and is provided only to clarify the location and direction of certain physical components and parameters.

In FIGS. 3A-3D, coil 302 can have a symmetric or anti-symmetric configuration, as discussed above in connection with FIGS. 1A-1C. In other words, coil 302 includes a first plurality of loops that corresponds, for example, to portion 108 or portion 118 in FIGS. 1A and 1B, respectively, and a second plurality of loops that corresponds, for example, to portion 110 or portion 120 in FIGS. 1A and 1B, respectively. With respect to an axis that extends through each plurality of loops of coil 302 (e.g., an axis that extends between opposite lateral surfaces in FIG. 3A that are inclined slightly with respect to the y-z plane), the two pluralities of loops can be wound in a common helical direction about the axis or in opposite helical directions about the axis.

Figure 3D:
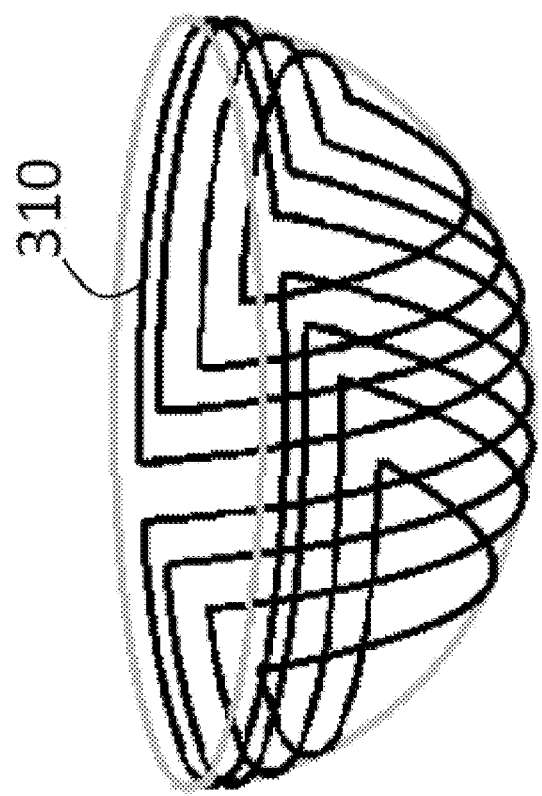
FIG. 3D is a schematic diagram showing another embodiment of a 3D resonator coil.

FIG. 3D is a schematic diagram showing an embodiment of a wireless power transmitting apparatus that includes a bowl-shaped resonator coil 310. In certain embodiments, the apparatus can include more than one resonator coil; the multiple resonator coils can optionally be arranged in a bowl shape. In some embodiments, two or more resonator coils can be connected in series and/or in parallel with one another to form a 3-dimensional figure-8 shaped resonator coil similar to the 2-dimensional figure-8 shaped resonator coil shown in FIGS. 1A and 1B.

FIGS. 4A and 4B are schematic diagrams showing embodiments of wireless power transfer apparatuses that are similar to those shown in FIGS. 3A and 3C. In FIGS. 4A and 4B, arrows 402 correspond to vectors that represent the direction and field strength of the magnetic field generated by the apparatuses at a particular point in time. The arrows were generated by electromagnetic simulations based on a computational model of the resonator shape shown in FIGS. 3A and 3C. FIG. 4A shows a perspective view of the wireless power transmitting apparatus as well as the magnetic field represented by arrows 402. In FIG. 4B, arrows 402 are oriented mostly in the direction of the x-axis, with some curving of the field towards the edges and top of the apparatus (i.e., along the +z direction).

Figure 5:
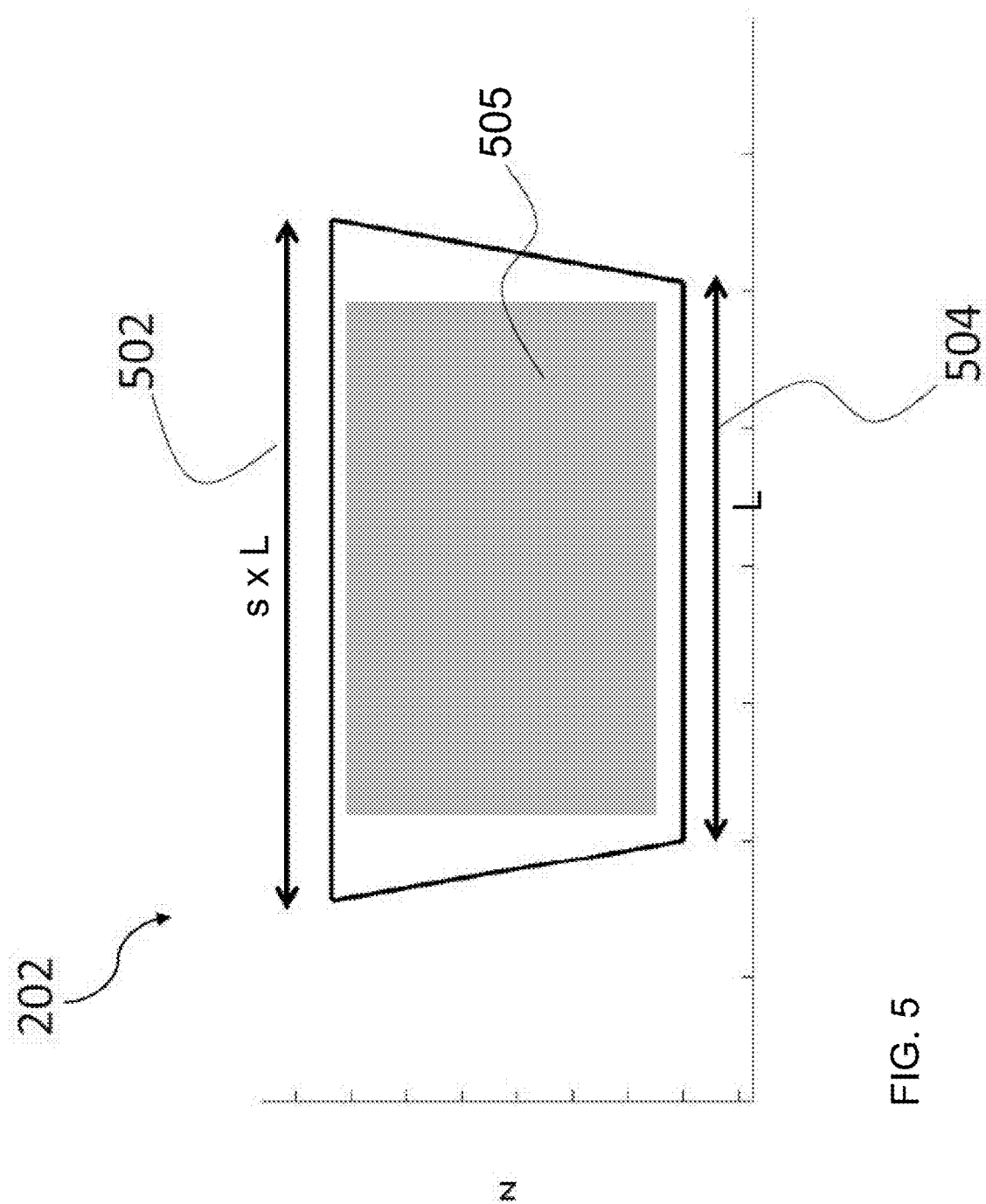
FIG. 5 is a schematic diagram showing an embodiment of a wireless power transmitting apparatus.

In some embodiments, wireless power transmitting apparatus 202 can be shaped to achieve efficient power transfer. For example, the apparatus can be shaped to be larger on one end as shown in FIG. 5. In FIG. 5, the length L 504 of the base of the apparatus can be scaled by a factor s so that at the top of the apparatus, the length 502 is s×L. By adjusting the scale factor s, the shape of the container can be adjusted to achieve efficient energy transfer in the active volume 505 of the power transmitting apparatus. In certain embodiments, for example, s can be 0.75 or more (e.g., 0.85 or more, 0.95 or more, 1.0 or more, 1.1 or more, 1.2 or more, 1.3 or more, 1.5 or more, 2.0 or more, 3.0 or more, 5.0 or more, 7.0 or more, 10.0 or more).

In some embodiments, the "active volume" is a region of space relative to the container volume in which the coupling k between a resonator of the apparatus and a resonator of a device (i.e. a wirelessly rechargeable battery) is maintained within a desirable range. In certain embodiments, the "active volume" is a region of space relative to the container volume in which the transferred power between the apparatus and a device is within a range such that the apparatus will efficiently charge or power devices (i.e. a wirelessly rechargeable battery) but will not harm the devices due to power dissipation. For example, for a container of approximately 8 inches by 10 inches by 5 inches, the corresponding approximate active volume can be 7 inches by 9 inches by 4 inches.

In some embodiments, the overall dimensions of the active volume can be less than the interior volume of the container. For example, in certain embodiments, the active volume can correspond to a region of space interior to the volume enclosed by the container, and spaced from the walls of the container by less than 0.5 inches, less than 1 inch, less than 2 inches, or greater than 2 inches from the sides of the container.

In some embodiments, the active volume can be greater than the volume enclosed by the container. In general, the shape of the active volume can be similar to the shape of the container, or can be of a different shape. The shape of the active volume can depend on the magnitude and direction of the magnetic fields generated by the shaped resonator coil or coils. For example, in some embodiments, a scale factor s greater than 1 has been found to offer significant improvement in the overall uniformity of the magnetic field within the container volume. Uniformity of magnetic field strength in the active volume can be measured as a ratio of the maximum of the magnetic field strength to the minimum of the magnetic field strength. In some embodiments, a more uniform magnetic field can be desirable because it can result in more uniform charging rates and more uniform requirements for wireless capture devices operating in the charging volume. In certain embodiments, as the scale factor s was increased to greater than 1.25, greater than 1.5, or greater than 1.75, the uniformity of magnetic field was increased.

Figure 6:
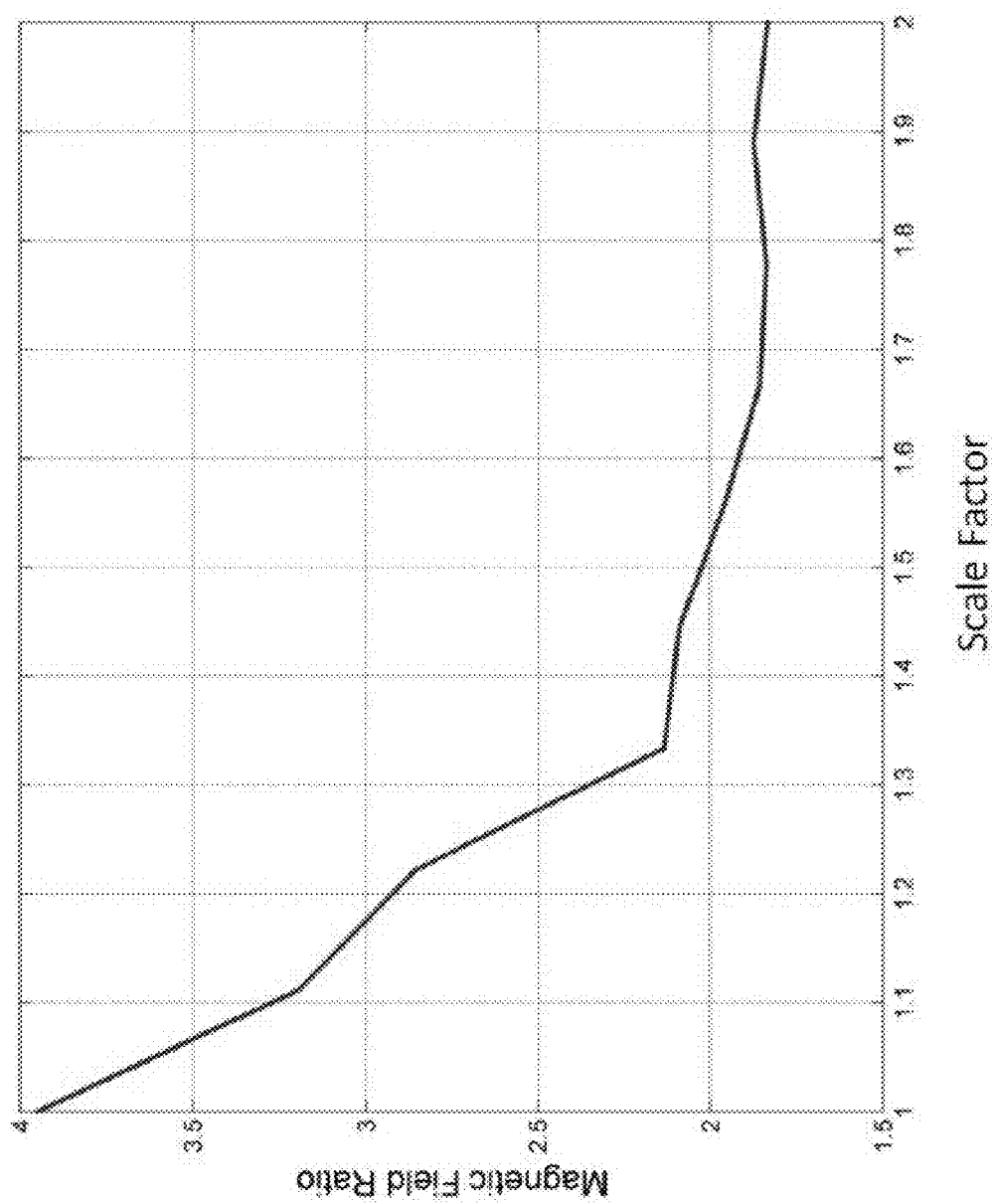
FIG. 6 is a plot of magnetic field ratio as a function of scale factor for an embodiment of a wireless power transmitting apparatus.

FIG. 6 shows a plot of the calculated magnetic field ratio, $\text{Max}_{active\ area}|B|/\text{Min}_{active\ area}|B|$, as the scale factor s is increased for a certain embodiment of the power transmitting apparatus. The particular embodiment modeled in FIG. 6 is an apparatus with dimensions of approximately 8 inches by 10 inches by 5 inches, with an active area of approximately 7 inches by 9 inches by 4 inches. The resonator in this embodiment has approximately 6 turns per half of the figure-8 shape and is driven at 6.78 MHz with a sinusoidal waveform by a class E amplifier. As the scale factor s is increased, as shown in FIG. 6, the maximum field strength approaches the minimum field strength.

Figure 7:
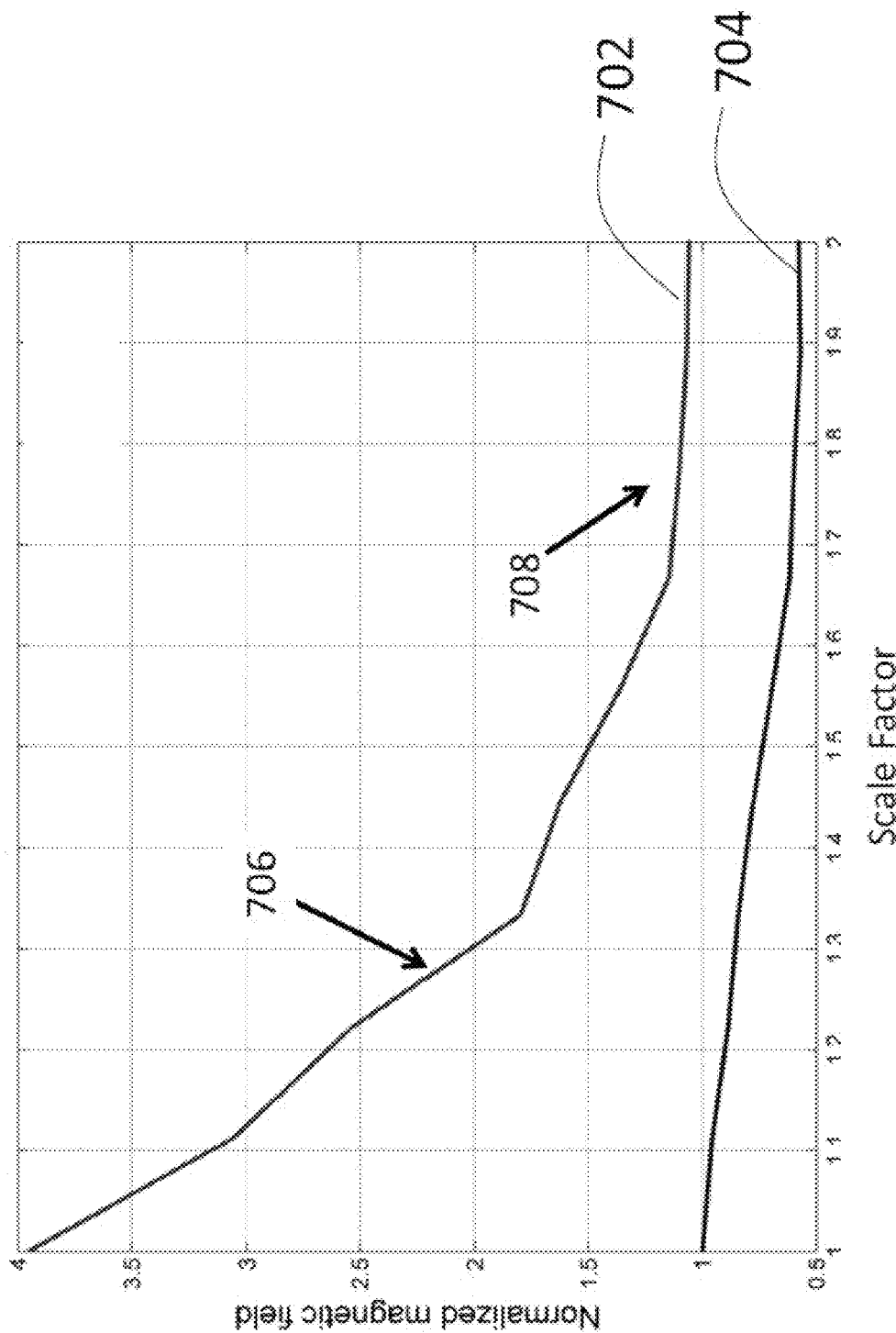
FIG. 7 is a plot of maximum and minimum magnetic field magnitudes as a function of scale factor for an embodiment of a wireless power transmitting apparatus.

FIG. 7 shows a plot of the maximum field strength ($\text{Max}_{active\ area}|B|$) 702, normalized to the minimum field strength ($\text{Min}_{active\ area}|B|$) 704, as the scale factor s is increased for the embodiment of the power transmitting apparatus described above. As $\text{Max}_{active\ area}|B|$ decreases in region 706 of the plot, high fields are eliminated from the active volume. Eliminating high fields can decrease unnecessary power dissipation into devices and components that can be placed inside the container. In addition, the heating up of a wireless capture device, such as a wirelessly chargeable battery, can also be reduced. As the field strength becomes more uniform within the volume, the efficiency of wireless power transfer to multiple device resonators in the volume becomes more predictable and can be controllable using relatively simple control algorithms. As the scale factor approaches a value of 2.0 for this embodiment in region 708 of the plot, the field remains relatively uniform but the overall field strength, for a given drive waveform, is decreasing. While the decrease in field strength can be compensated for by increasing the drive power supplied by the power supply, the efficiency of the wireless power transfer system can be reduced.

In certain embodiments, the scale factor s can be adjusted to increase field uniformity, increase transfer efficiency within a specified volume, reduce heating of extraneous objects, minimize control algorithm complexity, and/or reduce component count in the transmitter and/or receivers. In some embodiments, the scale factor s can be selected to balance a trade-off between two or more of the foregoing performance goals.

Figure 8A:
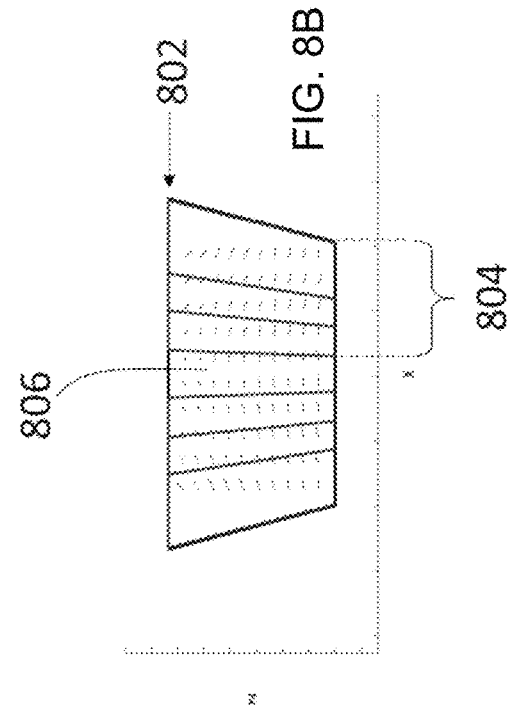
FIG. 8A is a schematic diagram showing a perspective view of an embodiment of a resonator coil.
Figure 8B:
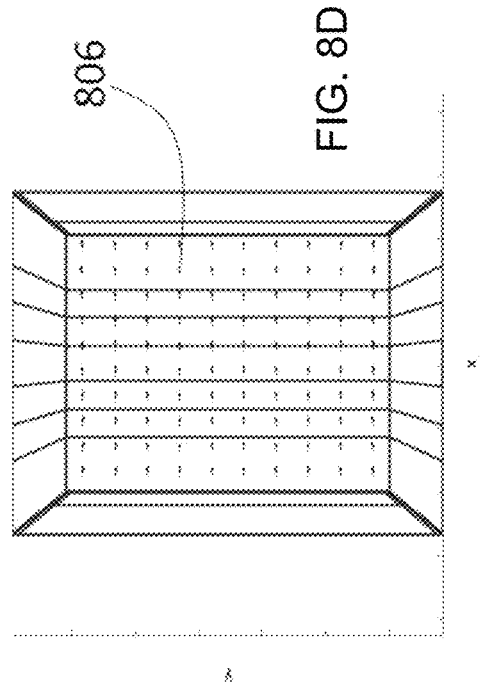
FIG. 8B is a schematic diagram showing a side view of the resonator coil of FIG. 8A and the calculated magnetic field generated by the coil during operation.
Figure 8C:
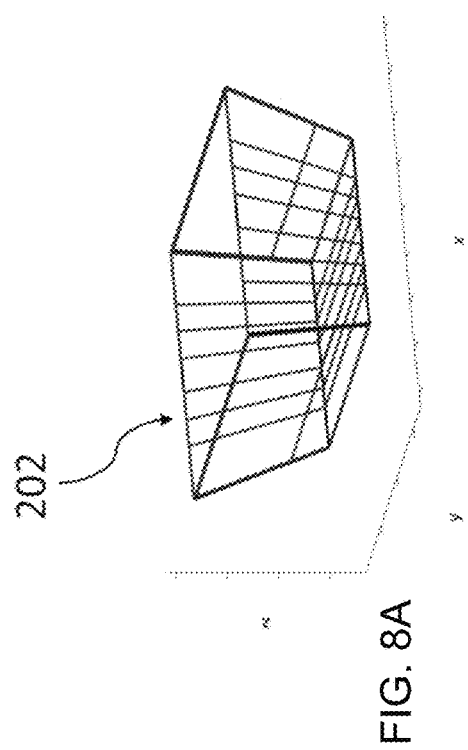
FIG. 8C is a schematic diagram showing a top view of the resonator coil of FIG. 8A.

FIGS. 8A-8C are schematic diagrams showing perspective, side, and top views of another embodiment of a resonator coil of a wireless power transmitting apparatus 202. The spacing between coil windings at the top edge 802 of the apparatus is increased while the spacing between coil windings at the bottom and sides of the apparatus has stayed about the same or slightly decreased, relative to embodiment shown in FIGS. 3A-3C.

Figure 8D:
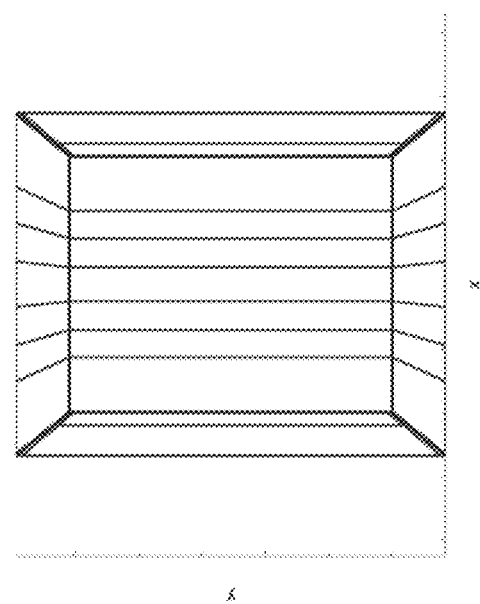
FIG. 8D is a schematic diagram showing a top view of the resonator coil of FIG. 8A and the calculated magnetic field generated by the coil during operation.

FIG. 8D is a schematic diagram showing the same top view of the apparatus as in FIG. 8C, with arrows 806 representing vectors that correspond to the magnetic field distribution generated by the resonator coil at a particular point in time. The apparatus of FIGS. 8A-8D has been shown to produce an even more uniform magnetic field distribution than the embodiment shown in FIGS. 3A-3C. As before, the arrows are aligned substantially in the direction of the x-axis, but relative to the magnetic field distribution shown in FIGS. 4A and 4B, have less curvature at the sides and top edges of the apparatus.

Figure 9B:
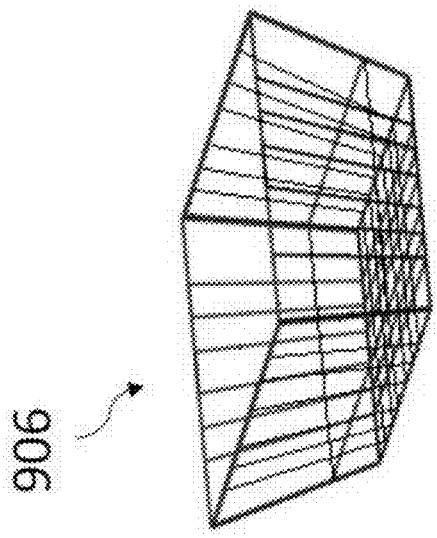
FIG. 9B is a schematic diagram showing the two resonator coils of FIG. 9A overlapped.
Figure 9A:
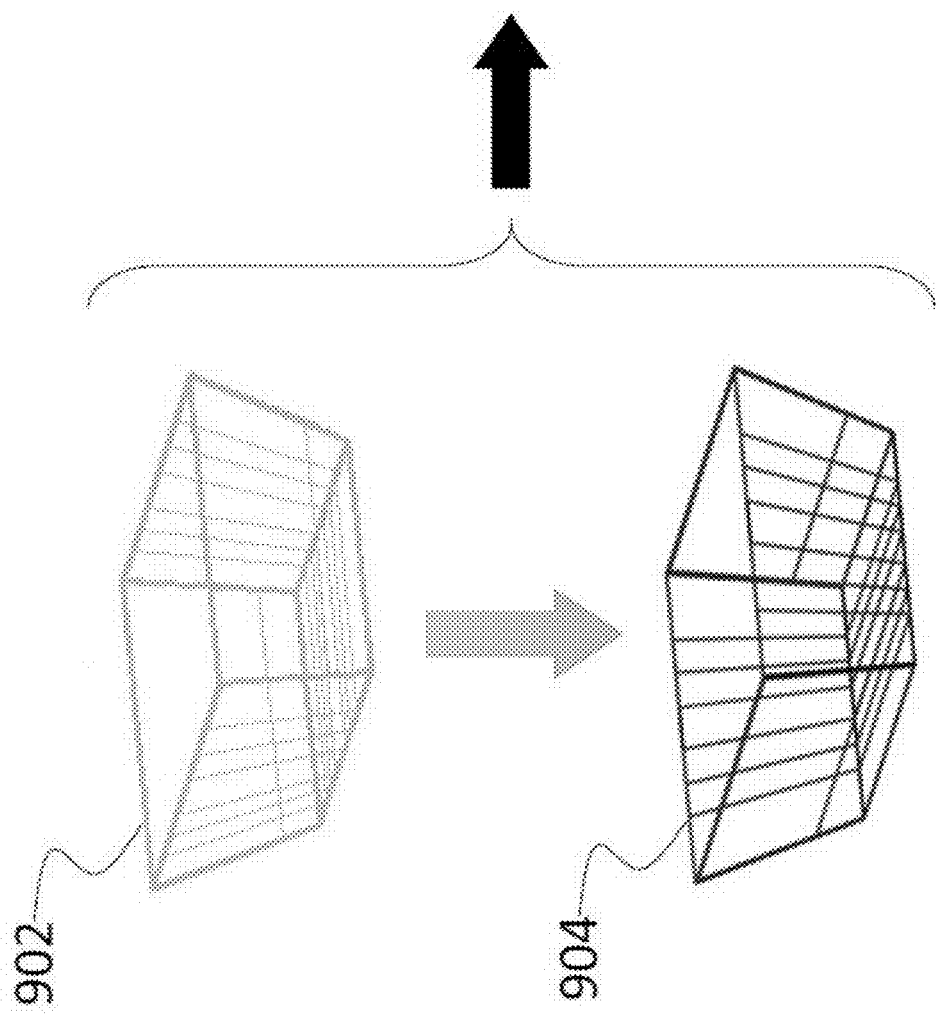
FIG. 9A is a schematic diagram showing separate resonator inductive coils that can be overlapped.
Figure 31:
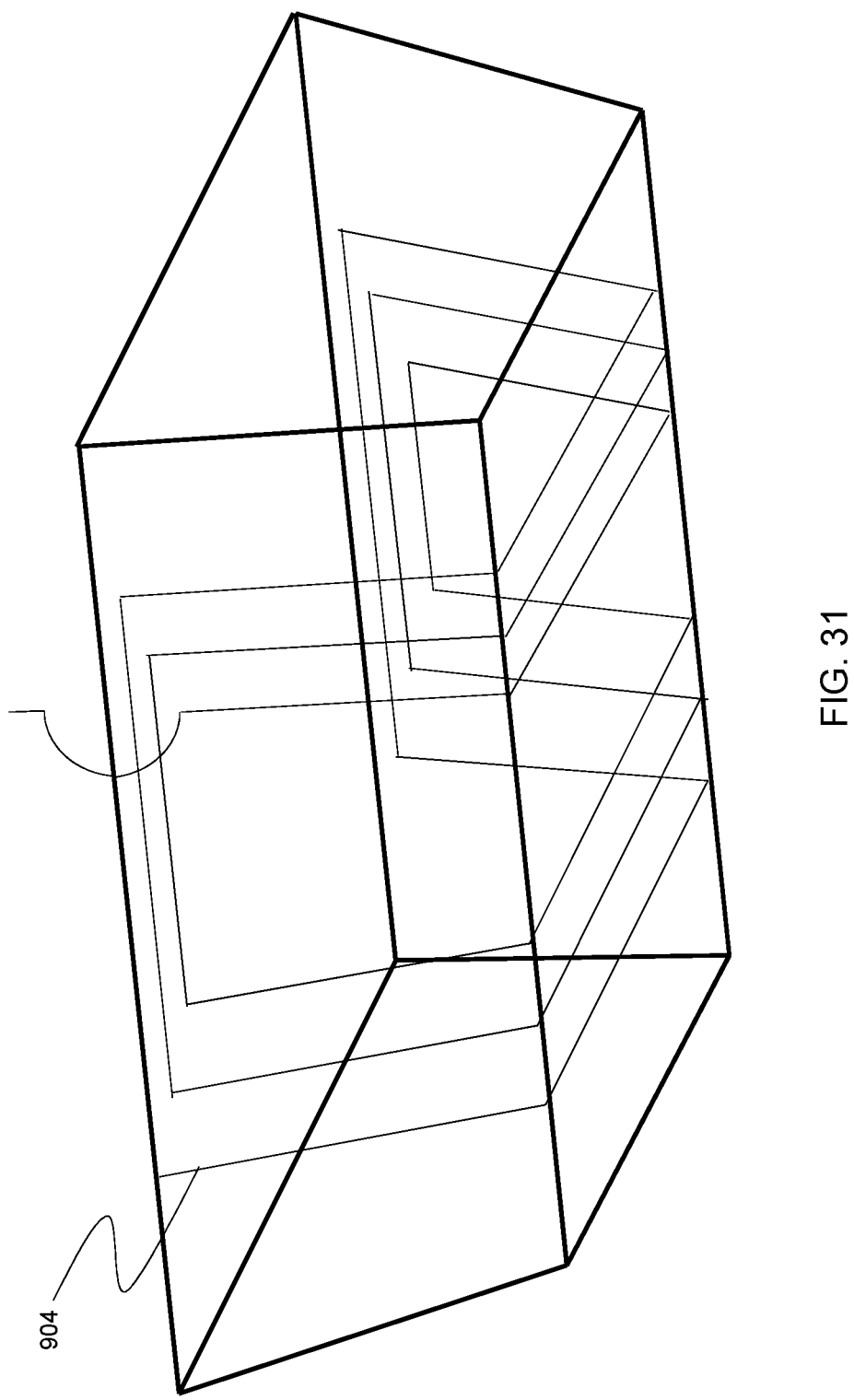
FIG. 31 is a schematic diagram showing an enlarged view of one of the resonator coils of FIG. 9A.

In some embodiments, the power transmitting apparatus can include more than one coil and/or resonator and these coils/resonators can be substantially overlapping. FIG. 9A is a schematic diagram showing two resonator coils 902 and 904, which are overlapped to form resonator coil 906, as shown in FIG. 9B. FIG. 31 is an enlarged view of resonator coil 904, showing the loops of coil 904 that form successive turns of the coil as a continuous path of electrically conductive material. The region of overlap of the resonators can be determined by the desired shape of the power transmitting apparatus, the desired magnetic field strength, the desired direction and/or uniformity of the magnetic fields, the desired coupling coefficients with receiver resonators, and/or the desired active volume.

For example, for a power transmitting apparatus shaped like an open box or container, overlap between two or more resonator coils can occur on any side of the container, on the inside and/or outside of the container, on adjacent sides of a container, and/or on the edges of the container.

As an example, two similarly shaped resonator coils 902, 904 are overlapped in FIGS. 9A and 9B. Note that while the conducting traces of the two coils 902 and 904 appear to be intersecting in FIG. 9B, the traces or conductors of each coil are insulated so that the two coils do not make electrical contact with each other, except, in some embodiments, at the input and output ports for each of the coils.

Figure 10B:
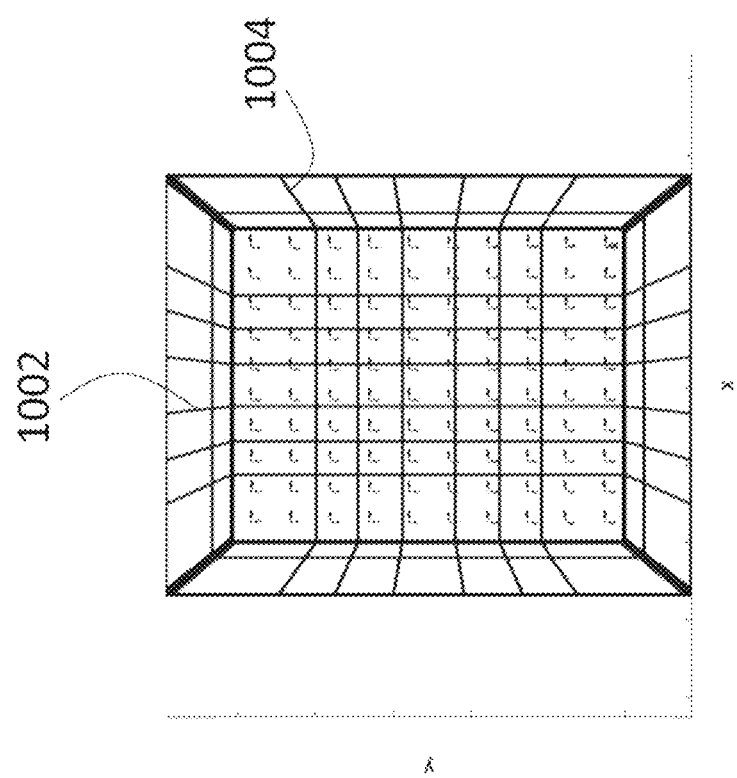
FIG. 10B is a schematic diagram showing a top view of the two overlapped resonator coils of FIG. 10A.
Figure 10A:
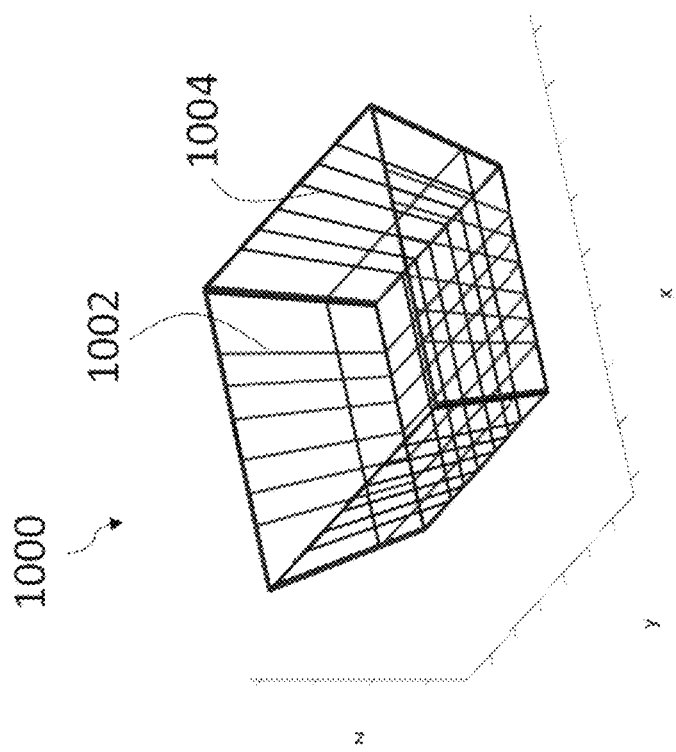
FIG. 10A is a schematic diagram showing a perspective view of two overlapped resonator coils.

In certain embodiments, for an apparatus in the form of a container with inside and outside walls, a resonator coil can be located close to (e.g., interior or exterior to) or between the inside and outside walls. FIGS. 10A and 10B are schematic diagrams showing a power transmitting apparatus that includes two overlapping resonator coils 1002 and 1004. Resonator coil 1002 can be on the outside of the apparatus' container while the resonator coil 1004 can be on the inside of the container.

FIG. 17B is a schematic diagram showing another embodiment of a power transmitting apparatus in which a resonator and/or coil are formed on one or more substrates 1710, 1712, 1714. The substrates have conformal shapes and can be stacked to form a power transmitting apparatus. In general, any number of substrates can be used, and not all substrates include resonators or coils. FIG. 17C shows a schematic diagram of a power transmitting apparatus in which resonators and/or coils can be formed in or on any of substrates 1716, 1718, 1720, and 1722. The configurations of the resonators and/or coils can be selected to generate magnetic fields of desired strength and direction.

Returning to FIGS. 9A and 9B, in some embodiments, two resonator coils, such as coils 902 and 904, can be driven out of phase to generate a magnetic field with a rotating dipole moment. During operation of the apparatus, the dipole moment of the magnetic field can be rotated to determine an optimum charging field and then the dipole moment can be held substantially stationary to support charging. In certain embodiments, the dipole moment can be continually rotated while devices are being charged. A rotating or positionally varying dipole moment of the magnetic field can be desirable when charging multiple device resonators whose integrated magnetic resonators are aligned randomly with respect to each other.

Figure 11:
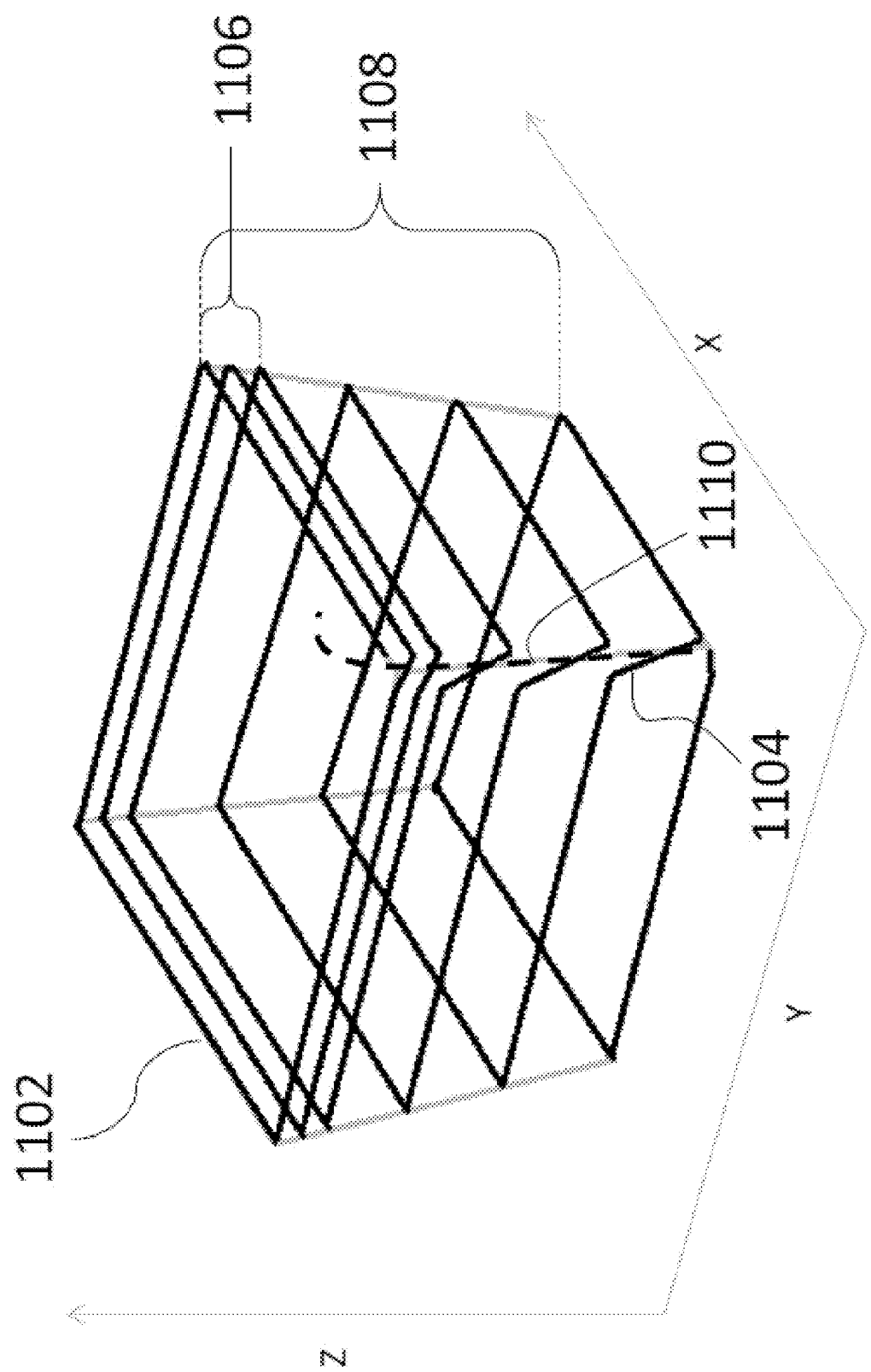
FIG. 11 is a schematic diagram showing an embodiment of a resonator coil.

FIG. 11 shows an embodiment of a resonator coil for a wireless power transmitting apparatus. In FIG. 11, resonator coil 1102 is wound primarily around an axis oriented in the z-direction. The spacing of the windings of the resonator coil varies along the coil span 1108 (i.e., along the z-axis). In this embodiment, the windings of the coil form acute angles 1104 at one corner of the container. A return trace 1110 is positioned for connection to the resonator and/or to impedance matching components. In FIG. 11, the direction of the magnetic dipole moment generated by the resonator coil during operation is substantially in the direction of the z-axis.

In some embodiments, overlapping resonator coils such as those shown in FIGS. 9A and 9B can be further overlapped with additional resonator coils, such as the resonator coil shown in FIG. 11, resulting in three or more overlapped resonator coils. The resonator coils can be connector to resonator capacitors and can each be driven separately (i.e. different amplifiers) to shape the magnetic field in the x, y, and z directions. In some embodiments, the resonators can all be driven by a single amplifier, and the single amplifier can be switchably connected to any or all of the resonators and/or resonator coils.

In certain embodiments, lumped capacitor elements can be distributed along the length of a resonator coil trace. Such configurations can be used to reduce the impact of self-resonance in a resonator coil on the overall resonator design. For example, at every turn of a resonator coil, a capacitor can be placed across a break or gap in a coil trace. In some embodiments, a capacitance can be formed by a break and/or gap in a coil trace.

Power Sources and Source Electronics

Figure 12:
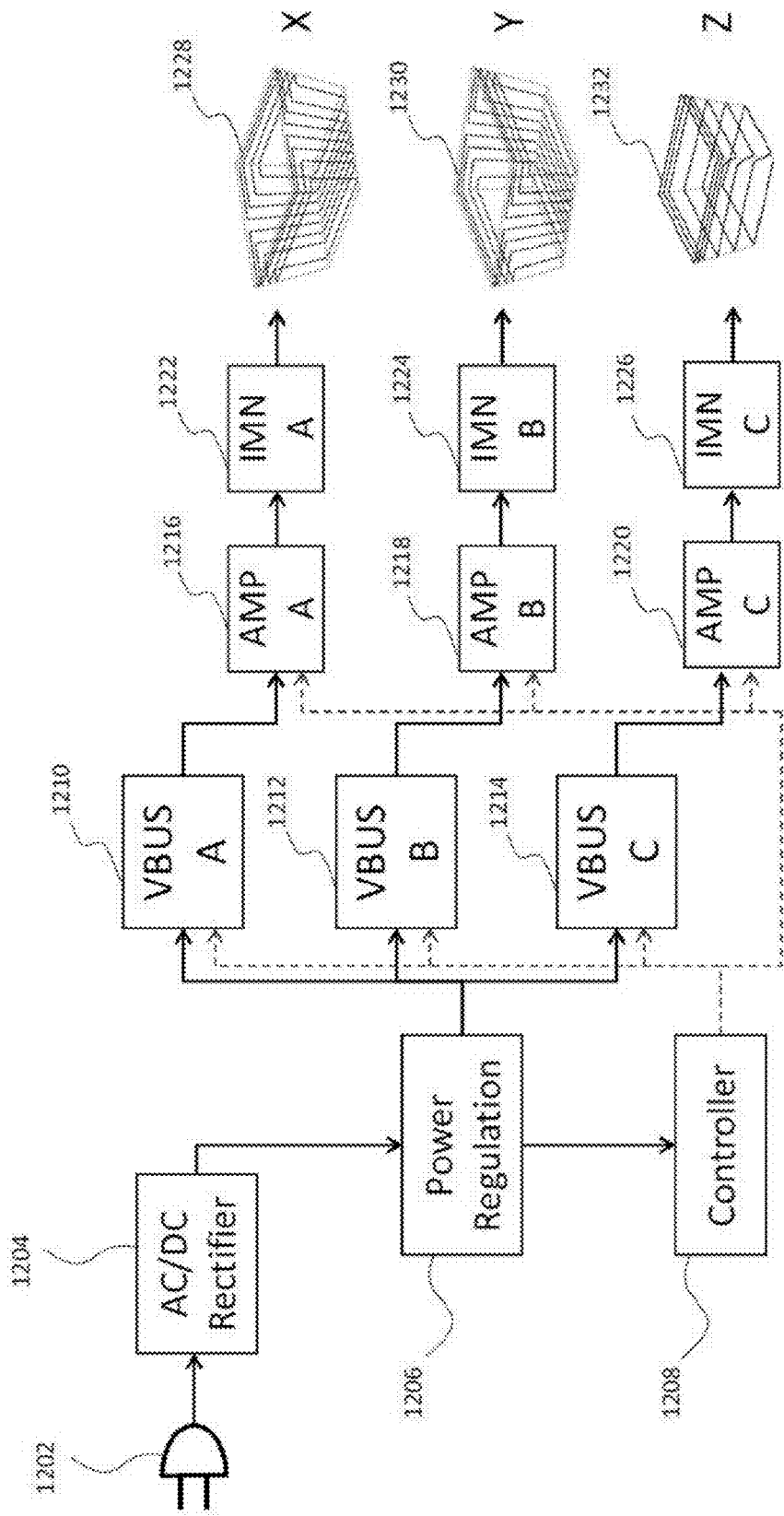
FIG. 12 is a schematic diagram showing an embodiment of an electronic subsystem of a wireless power transmitting apparatus.

FIG. 12 is a schematic diagram showing an example of a wireless power transmitting apparatus. Power can be delivered from a source 1202 that can include one or more of AC mains, solar power, and/or battery power. A rectifier 1204 can optionally be used to transform AC power to DC power. The power can be filtered and/or regulated by power regulation device 1206 before being supplied to a controller 1208 and busses 1210, 1212, 1214 to distribute and/or control the power. Power can then be supplied via busses 1210, 1212, 1214 to one or more amplifiers 1216, 1218, 1220. In some embodiments, the one or more amplifiers 1216, 1218, 1220 can be used to drive one or more resonators and/or resonator coils 1228, 1230, 1232. The driving configuration of the resonators/resonator coils (i.e., whether or not multiple amplifiers are used to drive the multiple resonators/coils) can be determined by taking account of factors such as the cost, flexibility, efficiency, size, and/or complexity of various implementations.

Each resonator or resonator coil 1228, 1230, 1232 can also have an associated impedance matching network 1222, 1224, 1226. An impedance matching network for each resonator or for combinations of resonators and/or coils can be used to improve power transfer efficiency between the power transmitting apparatus and the device that is receiving power that is transmitted wirelessly. In FIG. 12, the three resonator coils 1228, 1230, 1232 generate magnetic fields with dipole moments substantially in the x, y, and z coordinate directions, respectively.

In general, a wireless power transmitting apparatus can include an amplifier of class A, B, C, D, DE, E, and/or F. In certain embodiments, more than one type of amplifier can be used to drive a resonator coil.

In some embodiments, a first resonator oriented to generate a magnetic field with a dipole moment along the x-axis can be driven with a signal at constant phase while a second resonator oriented to generate a magnetic field with a dipole moment along the y-axis can be driven with a signal at a constant phase that is 90 degrees out of phase with the driving signal of the first resonator. Further, in certain embodiments, a third resonator oriented to generate a magnetic field with a dipole moment along the z-axis can have a variable phase so that it coincides minimally with the phases of the signals driving the first and second resonators.

In certain embodiments, a wireless power transmitting apparatus that includes one or more resonator coils can be scaled in any dimension (i.e., along the x-, y-, and/or z-coordinate directions). To compensate for a difference in coupling due to a change in a dimension of the apparatus, a resonator coil having a dipole moment that aligns with the changed dimension can be driven with a larger or smaller current to improve magnetic field uniformity for the scaled active volume. For example, for an apparatus that has been scaled to be larger in the y-direction, the current used to drive the one or more resonators that generate the magnetic field with a dipole moment along the y-axis can be increased.

Figure 13:
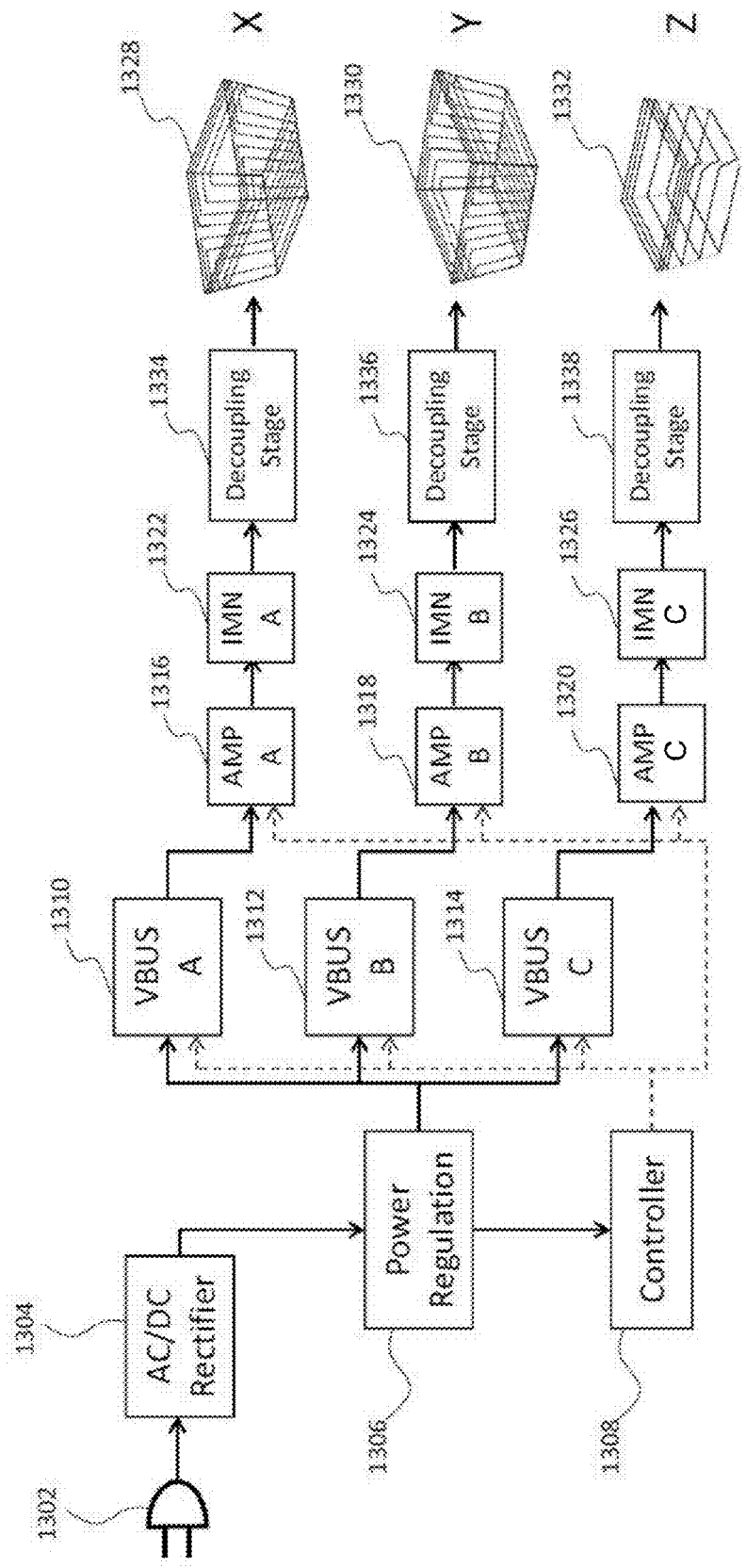
FIG. 13 is a schematic diagram showing another embodiment of an electronic subsystem of a wireless power transmitting apparatus.

In some embodiments, overlapping resonators of the power transmitting apparatus can be wirelessly coupled to each other. For example, in FIGS. 9A and 9B, resonator 902 can be wirelessly coupled to resonator 904 due to the close proximity of the resonators in the apparatus. This coupling can cause currents to be generated in nearby resonators (such as a resonator in a nearby power transmitting apparatus) and can decrease the efficiency of wireless power transfer to a device (i.e., a wirelessly rechargeable battery). In certain embodiments, this "intra-source coil coupling" can be reduced by a "decoupling" circuit or stage positioned between an impedance matching network and a resonator. FIG. 13 is a schematic diagram showing an embodiment of a wireless power transmitting apparatus that includes decoupling stages. In particular, the apparatus shown in FIG. 13 is similar to the apparatus shown in FIG. 12, with similar components in FIG. 13 having reference numbers that are larger by 100 than the reference numbers of corresponding components in FIG. 12. For example, power source 1302 in FIG. 13 is similar to power source 1202 in FIG. 12. In FIG. 13, decoupling stages 1334, 1336, 1338 reduce undesirable coupling between resonator coils 1328 and 1330, between resonator coils 1328 and 1332, and between resonator coils 1330 and 1332.

Figure 14A:
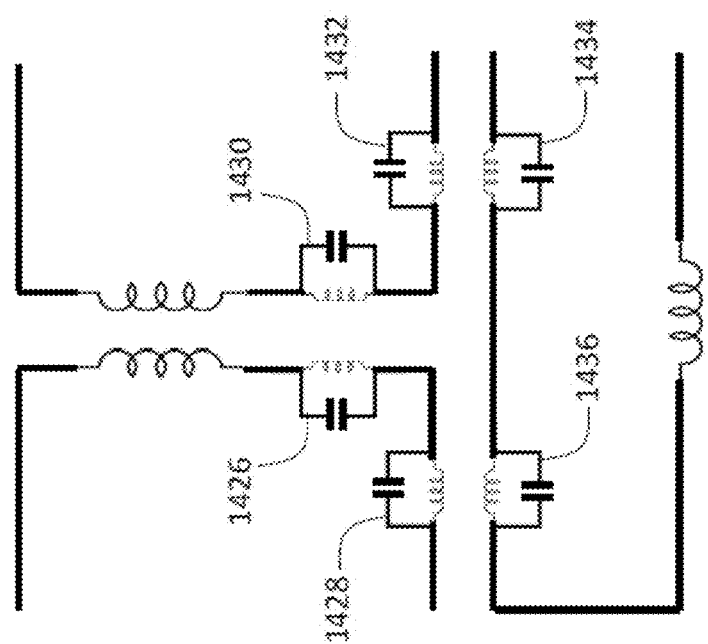
FIG. 14A is a schematic diagram showing an embodiment of a circuit with decoupling elements.

FIG. 14A is a schematic diagram showing an example of a decoupling stage between resonators. In FIG. 14A, three resonators 1402, 1404, 1406 of a wireless power transmitting apparatus (each resonator is shown as an incomplete circuit) each include an inductive element 1408, 1410, 1412, respectively, used to generate a magnetic field for wireless energy transfer. Because resonators 1402, 1404, 1406 can be overlapped (or in close proximity) as shown in FIG. 9B, coupling can occur between inductive elements 1408, 1410, 1412 (e.g., resonator coils). In other words, resonator 1402 can induce a voltage in resonator 1404 and/or in resonator 1406, resonator 1404 can induce a voltage in resonator 1402 and/or in resonator 1406, and so on. For example, where resonator 1402 induces a current in resonator 1404, the induced voltage V will be proportional to the inductances $L_1$ and $L_2$ of the inductive elements 1408, 1410 of resonators 1402, 1404 with coupling constant k according to the expression:

$$V \sim k\sqrt{L_1 L_2}.$$

To decouple the inductive elements 1408 and 1410, additional inductors 1416 and 1418 are connected in series to inductive elements 1408 and 14010, respectively, and placed in close proximity to one another. The voltage induced by the coupling of inductors 1416 and 1418 can reduce the overall voltage induced in resonator 1404 by the field generated by resonator 1402 (and vice versa). Because the incidental coupling between inductors 1408 and 1410 is typically relatively low, the inductances of the "decoupling" inductors 1416 and 1418 can be relatively small. Between resonators 1402 and 1406, inductors 1414 and 1424 can be used to decouple inductors 1408 and 1412. Between resonators 1404 and 1406, inductors 1420 and 1422 can be used to decouple inductors 1410 and 1412. The decoupling inductive elements, such as inductors 1416 and 1414 shown in FIG. 14A, can be connected in series with inductor 1408.

Figure 14B:
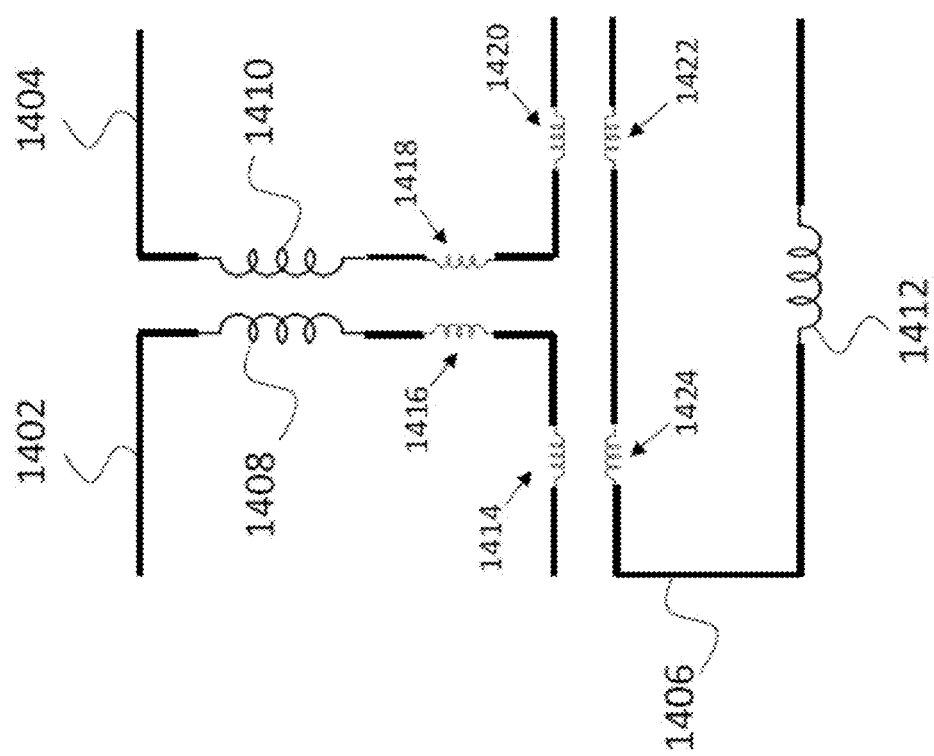
FIG. 14B is a schematic diagram showing another embodiment of a circuit with decoupling elements.

In certain embodiments, decoupling inductors 1416 and 1418 can be moved relative to one another to achieve a desired coupling and/or to generate a desired overall induced voltage in the corresponding resonators. FIG. 14B shows a schematic diagram of an embodiment of a decoupling stage featuring both inductors and capacitors. The capacitors are connected in parallel to the inductors and used as shunt capacitors. In some embodiments, instead of mechanically moving the decoupling inductors to vary the coupling and/or the total induced voltage, capacitors 1426 and/or 1430 can be tuned or detuned to couple inductors 1416 and 1418 and/or to decouple inductors 1408 and 1410.

Figures 15A, 15B:
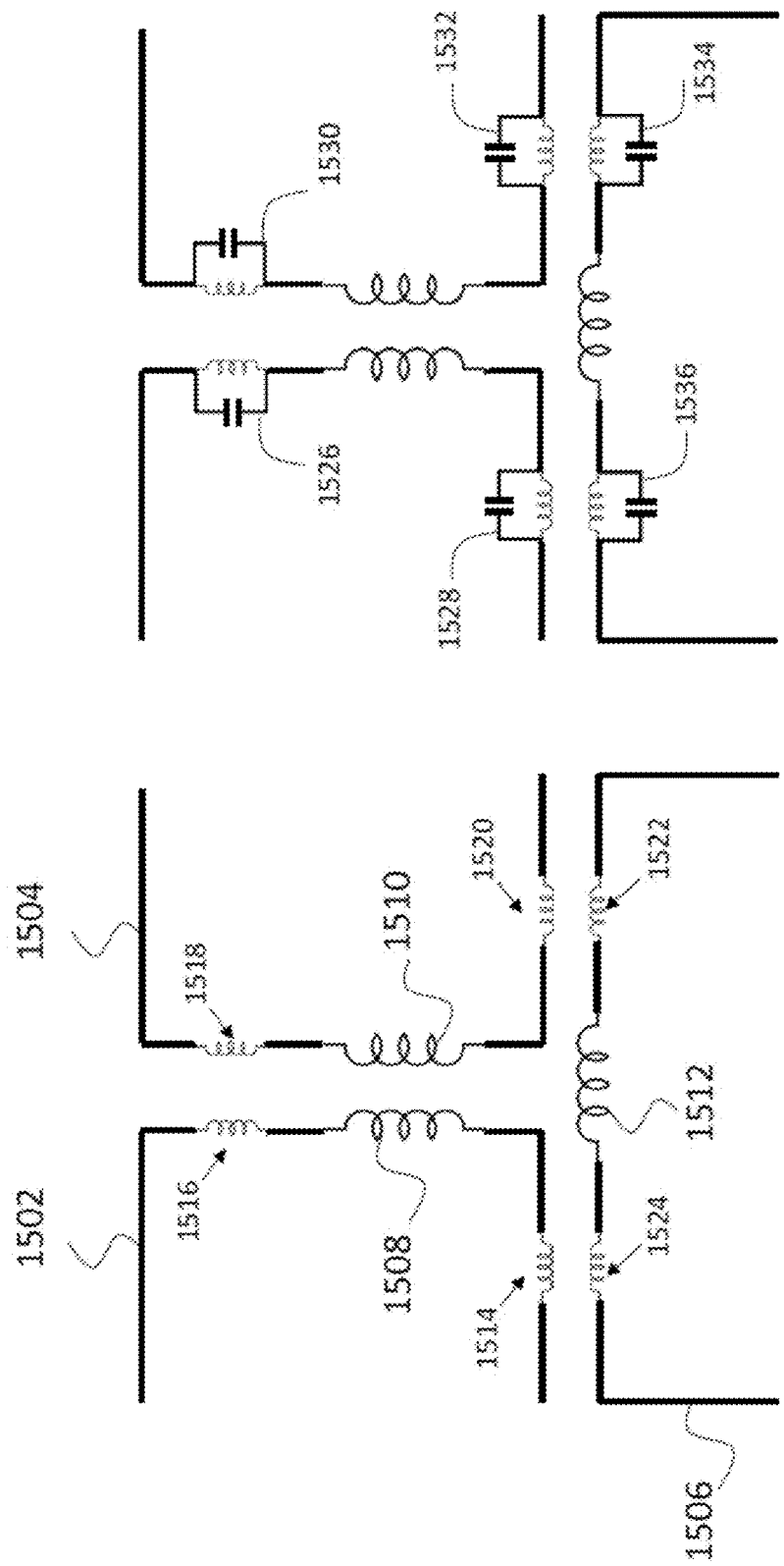
FIG. 15A is a schematic diagram showing a further embodiment of a circuit with decoupling elements.
FIG. 15B is a schematic diagram showing another embodiment of a circuit with decoupling elements.

FIG. 15A is a schematic diagram showing another embodiment of a wireless power transmitting apparatus. Certain components in FIG. 15A are similar to corresponding components in FIG. 14A, and have reference labels that differ by a factor of 100 (e.g., resonator 1502 in FIG. 15A is similar to resonator 1402 in FIG. 14A). In FIG. 15A, inductors 1508, 1510, and 1512 of resonators 1502, 1504, and 1506 can be used for wireless energy transfer. The three inductors are shown to be in close proximity to each other. Movable decoupling inductors 1516 and 1514 are connected in series with inductor 1508 and on either side of inductor 1508. Similarly, movable decoupling inductors 1518 and 1520 are connected in series with inductor 1510 and on either side of inductor 1510, and movable decoupling inductors 1522 and 1524 are connected in series with inductor 1512 and on either side of inductor 1512.

FIG. 15B is a schematic diagram showing a further embodiment of a wireless power transmitting apparatus. Capacitors 1526, 1528, 1530, 1532, 1536, and 1534 are connected in parallel to decoupling inductors to achieve a purpose similar to the purpose described above in connection with FIG. 14B.

Figure 16B:
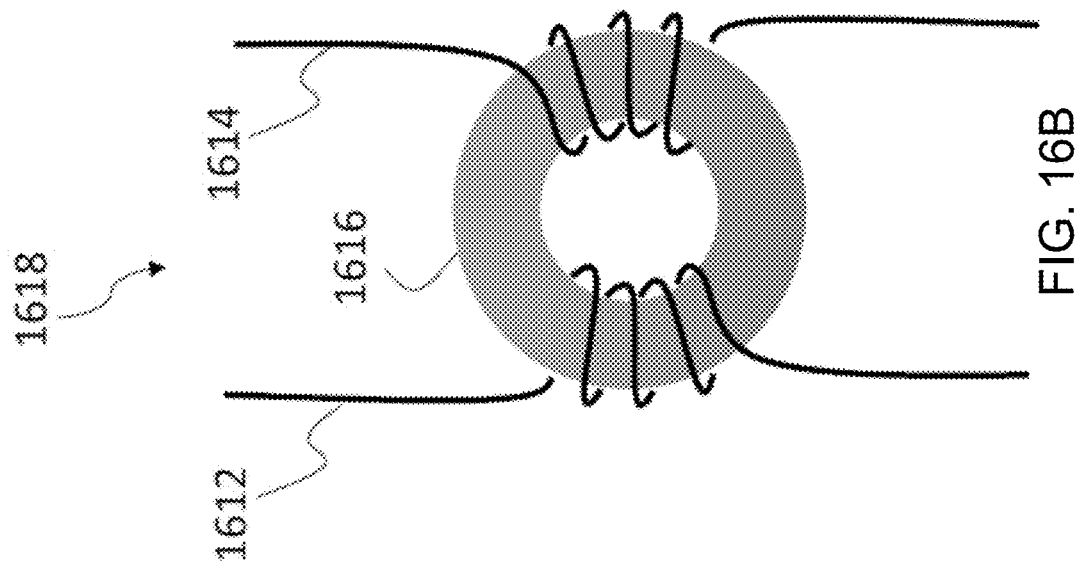
FIGS. 16A and 16B are schematic diagrams showing embodiments of decoupling elements.
Figure 16A:
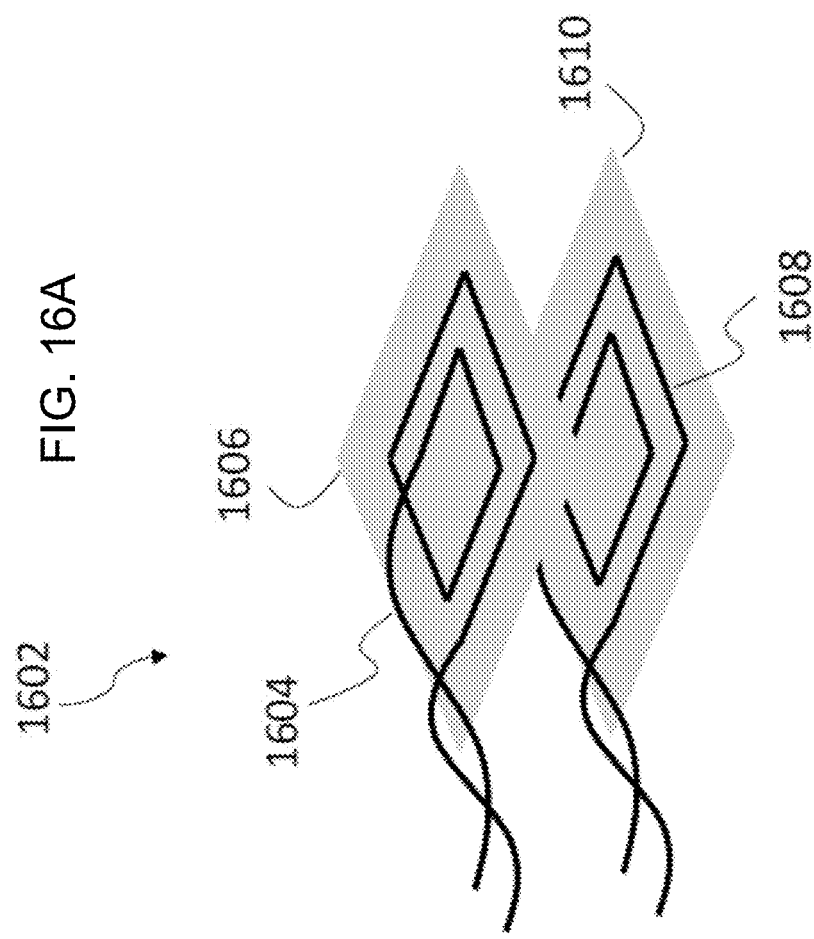

FIG. 16A shows an embodiment of a pair of decoupling inductors. Inductors 1604 and 1608 are printed on substrates 1606 and 1610, respectively, arranged in a substantially parallel orientation.

FIG. 16B shows another embodiment of a pair of decoupling inductors in which the inductors 1612 and 1614 are wound around a shared magnetic core 1616 such that the inductors are parallel to one another.

Source Mechanical Components

In embodiments, resonator coils for a wireless power transmitting apparatus can be printed on a rigid substrate, a flexible substrate, and/or PCB material. The coils can be printed onto the substrate or otherwise affixed by tape or glue. In some embodiments, resonator coils can be manufactured by forming the sides of the apparatus separately and then soldering them together. FIG. 17A shows four sides 1702, 1704, 1706, 1708 of a substrate that a resonator can be formed or printed on so that the corners of the resonator can be joined by solder. In some embodiments, the coil can be printed on a single piece of substrate which is folded together to create a container shape similar to that shown in FIG. 2.

In some embodiments, each resonator coil can be printed on a separate layer of substrate, as shown in FIG. 17B. In FIG. 17B, three resonator coils are printed on three different substrates 1710, 1712, 1714 to minimize contact and potentially increase the space between overlapping coils (thereby reducing the intra-source coil coupling).

Figure 18B:
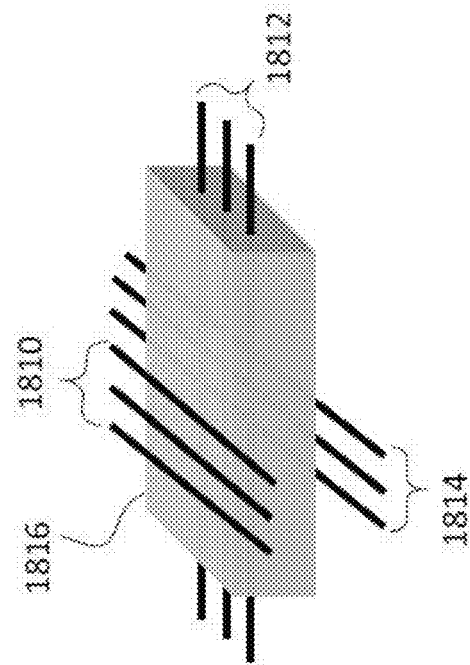
FIGS. 18A and 18B are schematic diagrams showing coil traces formed on one or more layers of a substrate.
Figure 18A:
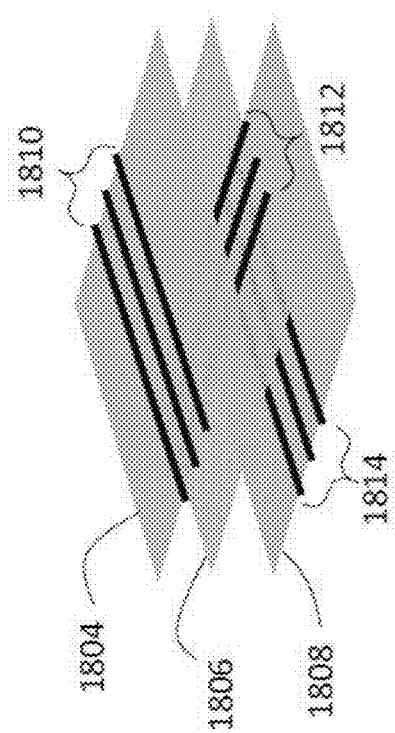

FIG. 18A shows a schematic diagram of a power transmitting apparatus in which three layers of substrate 1804, 1806, 1808 are used to support three different resonator coils 1810, 1812, 1814, respectively. These three layers can be stacked on top of one another. FIG. 18B shows a schematic diagram of another embodiment of a power transmitting apparatus in which one layer of substrate 1816 is used to hold three different resonator coils 1810, 1812, 1814 such that the coils do not touch directly.

In some embodiments, the shape of the face of any of the surfaces of a wireless power transmitting apparatus can be a square, a rectangle, trapezoid, a circle, an oval, a triangle, a diamond or any other shape. Resonator coil design can vary based on the shape used for the apparatus. In some embodiments, curved edges and/or corners for the resonator coils can be chosen to create a more uniform magnetic field. In certain embodiments, any of the sides or faces of a container can be scaled by a scale factor as described previously in this disclosure.

In some embodiments, magnetic material can be used on all, some, or none of the sides of the apparatus to shape the resulting magnetic field or to decrease losses in magnetic field strength that can occur in a lossy environment. A lossy environment can include metallic surfaces and/or objects. In some embodiments, other materials such as an air gaps, plastics, copper, etc. can be used between the outer surface of the apparatus and the resonators to decrease losses and/or to shape magnetic fields generated by the resonators. FIG. 17C shows an embodiment of a wireless power transmitting apparatus that includes several layers to eliminate losses in the environment, etc. For example, the layers can include a first layer 1722 that can be a hard outer layer formed from a rigid plastic to protect against mechanical damage. The layers can also include a second layer 1720 (e.g., formed from a material such as copper) and a third layer 1718 (e.g., formed from a ferrite material) to minimize losses by the magnetic field created by one or more resonators formed on fourth layer 1716. Alternatively, in some embodiments, as discussed previously, one or more of first layer 1722, second layer 1720, third layer 1718, and fourth layer 1716 can be a substrate material that supports or contains resonator coils. The layers are stacked together as shown in FIG. 17C to form the apparatus.

In some embodiments, the electronics of a wireless power transmitting apparatus can be cooled through passive or active methods such as thermal interface materials, air gaps, cooling fans, and/or heat sinks. In certain embodiments, structures formed of materials such as conductors and/or ferrites can be used to shield the resonators and/or coils of the transmitting apparatus from the electronic components of the source power and control circuitry.

Wireless Power Transfer in Battery-Operated Systems

The methods and systems disclosed herein can be used to wirelessly transfer power to a battery, a system of batteries, and/or a charging unit (referred to collectively as a "power receiving apparatus"), either alone or while installed in a battery-operated device. In some embodiments, the battery can provide power to the electronic device while the electronic device is being used.

In certain embodiments, the device can be moved during use and while the power receiving apparatus is providing power to the device. As such, the device can be conveniently used and charged at the same time without requiring that the device be physically connected to a power source. Moreover, power can be delivered to the device (e.g., to the batteries of the device) when the device is in a variety of orientations with respect to the source resonator; that is, the device does not have to be precisely positioned with respect to the source resonator, or installed on a charging unit, to deliver power to its power receiving apparatus.

The operating frequencies of power transfer can be in the range of 10 kHz to 100 MHz. For example, the operating frequency can be 13.56 MHz or 6.78 MHz. In some embodiments, power can be transmitted at multiple operating frequencies. For example, the multiple operating frequencies can be 6.78 MHz and 13.56 MHz. In this example, one frequency is a harmonic frequency (e.g, a second harmonic) of the other frequency.

In this disclosure, "wireless energy transfer" from one resonator to another resonator refers to transferring energy to do useful work (e.g., mechanical work) such as powering electronic devices, vehicles, lighting a light bulb or charging batteries. Similarly, "wireless power transfer" from one resonator to another resonator refers to transferring power to do useful work (e.g., mechanical work) such as powering electronic devices, vehicles, lighting a light bulb or charging batteries. Both wireless energy transfer and wireless power transfer refer to the transfer (or equivalently, the transmission) of energy to provide operating power that would otherwise be provided through a connection to a power source, such as a connection to a main voltage source. Accordingly, with the above understanding, the expressions "wireless energy transfer" and "wireless power transfer" are used interchangeably in this disclosure. It is also understood that, "wireless power transfer" and "wireless energy transfer" can be accompanied by the transfer of information; that is, information can be transferred via an electromagnetic signal along with the energy or power to do useful work.

Power Receiving Apparatus

Figures 19A, 19B, 19C:
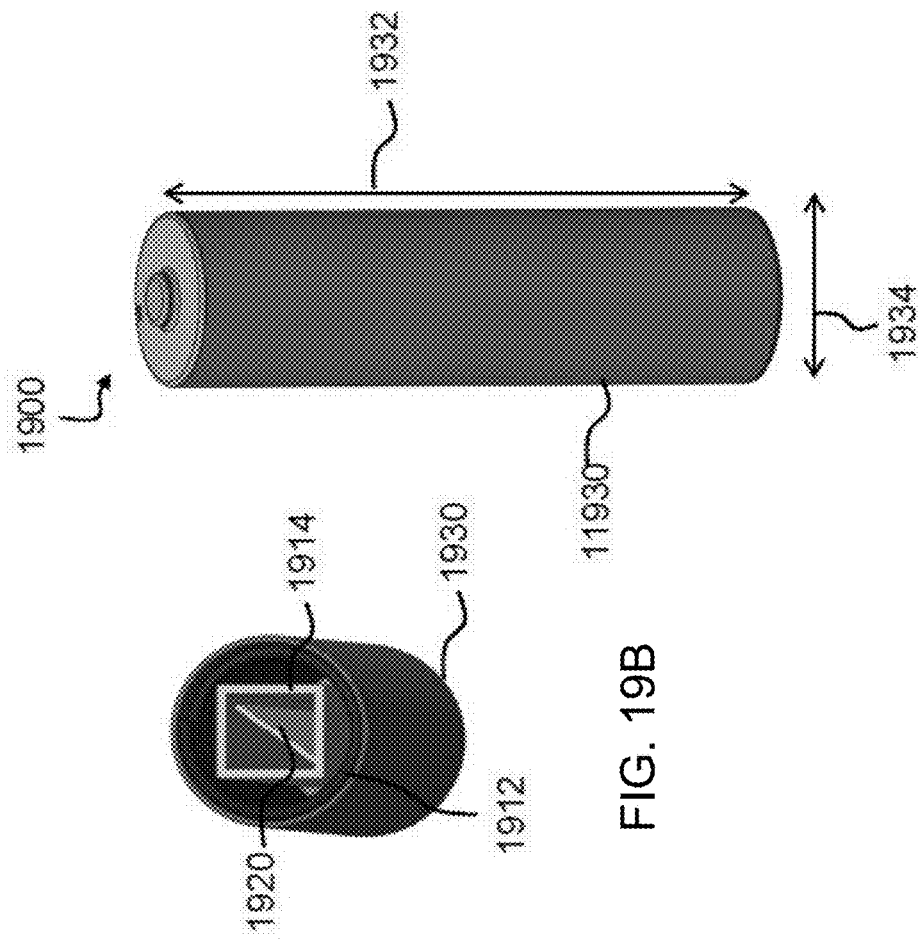
FIG. 19A is a schematic diagram showing a cut-away view of an embodiment of a wirelessly chargeable battery.
FIG. 19B is a schematic diagram showing a magnetic material of the wirelessly chargeable battery of FIG. 19A.
FIG. 19C is a schematic diagram showing a perspective view of the wirelessly chargeable battery of FIG. 19A.

FIGS. 19A-19C are schematic diagrams showing an example of a power receiving apparatus implemented in the form factor of a battery 1900. The following discussion refers to battery 1900 for purposes of clarity in discussing various aspects and features of wireless power transfer systems. It should be appreciated, however, that a power receiving apparatus can be implemented in a variety of forms (including forms other than batteries), and the features disclosed herein are applicable to a power receiving apparatus in any form, not only when implemented as a battery.

Battery 1900 includes a power receiving sub-structure 1902 connected to a battery cell 1904. The power receiving sub-structure 1902 includes a coil 1912 formed by a plurality of loops of conductive material and a magnetic material 1914 disposed in a core region within coil 1912. In this example, the magnetic material 1914 is a hollow rectangular shaped tubular member enclosing control electronics 1920, as shown in FIG. 19B. In some embodiments, coil 1912 and magnetic material 1914 form a receiver resonator which can wirelessly receive power from a source resonator. The received power induces oscillating currents in the loops of the coil 1912, for example, at an operating frequency of the source resonator. Control electronics 1920 convert the induced current to a DC voltage which is applied to the battery cell 1904, which stores the received power. The DC voltage can be substantially constant, with variations within 1% (e.g., within 3%, within 5%, within 10%) relative to its average of the constant voltage.

In certain embodiments, a resonant frequency of the receiver resonator is determined by the inductance and capacitance of the coil 1912. Alternatively, the receiver resonator can include a capacitor which can be arranged in control electronics 1920. The resonant frequency of the receiver resonator can be controlled by a capacitance value of the capacitor.

FIG. 19C is a schematic diagram showing the battery 1900 including its battery housing 1930 (also referred as "battery shell" or "battery enclosure") which encloses the power receiving sub-structure 1902 and the battery cell 1904 (not shown in FIG. 19C). For example, the battery housing 1930 can be made from materials such as plastic, rubber, kapton, and/or ABS. In some embodiments, at least some portion of the battery housing 1930 can include a material that has low loss and does not significantly attenuate the oscillating fields (e.g., electric, magnetic fields) in the battery 1900. For example, the attenuation can be less than 10% (e.g., less than 5%) of total energy of oscillating magnetic fields. In some embodiments, a battery 1900 does not include a battery housing 1930.

In certain embodiments, housing 1930 is dimensioned to engage with a battery compartment of a battery-operated device. By engaging with a battery compartment, battery 1900 can be used to deliver power to the battery-operated device without modifying the device. That is, instead of installing conventional batteries to power the device, battery 1900 can be installed simply and quickly.

Figure 19E:
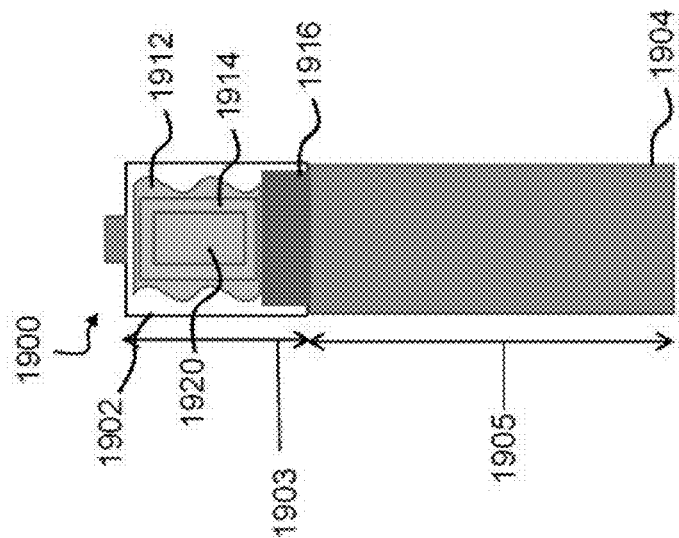
FIG. 19E is a schematic diagram showing another embodiment of a wirelessly chargeable battery.
Figure 19D:
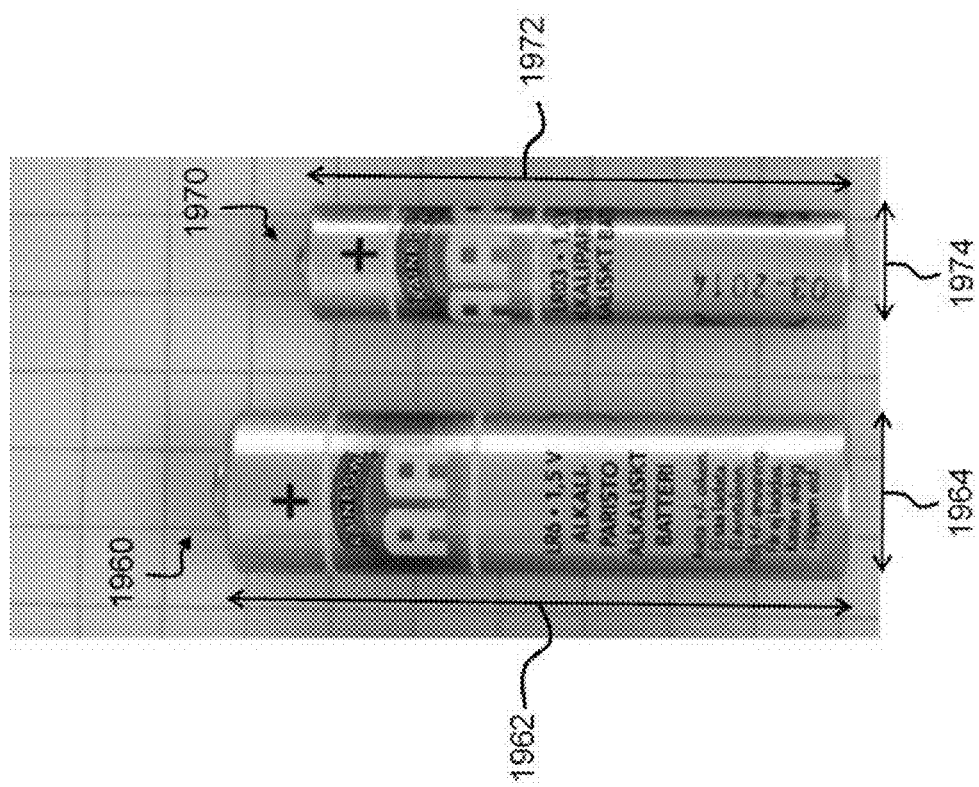
FIG. 19D is an image of two standard sized batteries.

FIG. 19D is an image of a standard AA battery 1960 and a standard AAA battery 1970. Standard AA battery has a length 1962 of about 50.1-50.5 mm without its button terminal and a diameter 1964 of about 13.5-14.5 mm. Standard AAA battery 1970 has a length 1972 of about 44.5 mm and a diameter 1974 of about 10.5 mm. In the example embodiment shown in FIGS. 19A-19C, housing 1930 of battery 1900 has exterior dimensions that are substantially similar in size to the exterior dimensions of a standard AA battery. Thus, referring to FIG. 19A, battery cell 1904 has a length 1905 smaller than the length 1962 of the standard AA battery 1960 to include space for incorporating the power receiving sub-structure 1902. In this example, the battery cell 1904 has a length 1905 corresponding to approximately ¼ of the length 1962 of the standard AA battery cell shown in FIG. 19D. The battery housing 1930 has a length 1932 approximately equal to the length 1962 and a diameter 1934 approximately equal to the diameter 1964 of the standard AA battery 1960. Accordingly, the battery 1900 can easily replace a standard AA battery for use in conventional applications.

In some embodiments, a length 1904 of a battery cell 1904 can be a fraction (e.g., ¾ or less, ⅔ or less, ½ or less, ⅓ or less, ¼ or less) than the length 1962 of the standard AA battery cell 1960. For a given diameter, the larger the length 1905 of battery cell 1904, the larger the capacity of battery cell 1904 to store energy. In some embodiments, the larger the length 1905, the greater the extent to which the length of coil 1912 is reduced due to space constraints. The reduced length of coil 1912 can reduce a coupling coefficient of energy transfer between the battery cell 1904 and a source resonator. As such, the length 1905 of the battery cell 1904 can be selected for a particular application depending on several factors such as down-time and use-time of the battery cell. As used herein, down-time is the period of time when a battery cell 1904 receives power from a source, and use-time is the period of time when the battery cell 1904 is unable to receive power from the source because battery 1900 is delivering power to the device.

FIG. 19E is a schematic diagram showing another embodiment of a wirelessly chargeable battery 1900, which includes a coil 1912, magnetic material 1914 and control electronics 1920. Power receiving element 1902 is securely fixed to a battery cell 1904 by a locking element 1916 (e.g., a locking ring, adhesive, ferrite material, or similar functional mechanism). In this embodiment, the battery 1900 has a substantially similar size as the standard AA battery 1960. The battery cell 1904 has a length 1905 corresponding to about ⅔ of the length 1962 of the standard AA battery 1960 and the power receiving sub-structure 1902 has a length 1903 of about ⅓ of the length 1962 of the standard AA battery 1960.

While the foregoing embodiments have the form factor of a conventional AAA battery, the power receiving apparatuses disclosed herein can have form factors that correspond to any of a variety of different conventional batteries. For example, the batteries can have a form factor that is substantially similar to the form factor of a conventional AAA, AA, C, D, 9 V, LiPo cell, or C123 battery, e.g., within 3% (e.g., within 5%, within 10%) of the volume of such a conventional battery. Battery cell 1904 can have a length 1905 that is a fraction of a length of a conventional battery.

In some embodiments, a battery cell 1904 can be a rechargeable battery cell such as lead-acid, valve regulated lead-acid, gel, absorbed glass mat, nickel-cadmium (NiCd), nickel-zinc (NiZn), nickel metal hydride (NiMH), lithium-ion (Li-ion), lithium poly or molten sand based rechargeable battery cell. In certain embodiments, battery cell 1904 can include solid state materials such as $Ag_4RbI_5$, $LiI/Al_2O_3$ mixtures, clay and β-alumina group of compounds ($NaAl_{11}O_{17}$), or glassy and polymeric materials that can be readily made in thin film form. In certain embodiments, battery cell 1904 can include fuel cells, capacitors, super capacitors, piezoelectric elements, or springs.

Figure 20B:
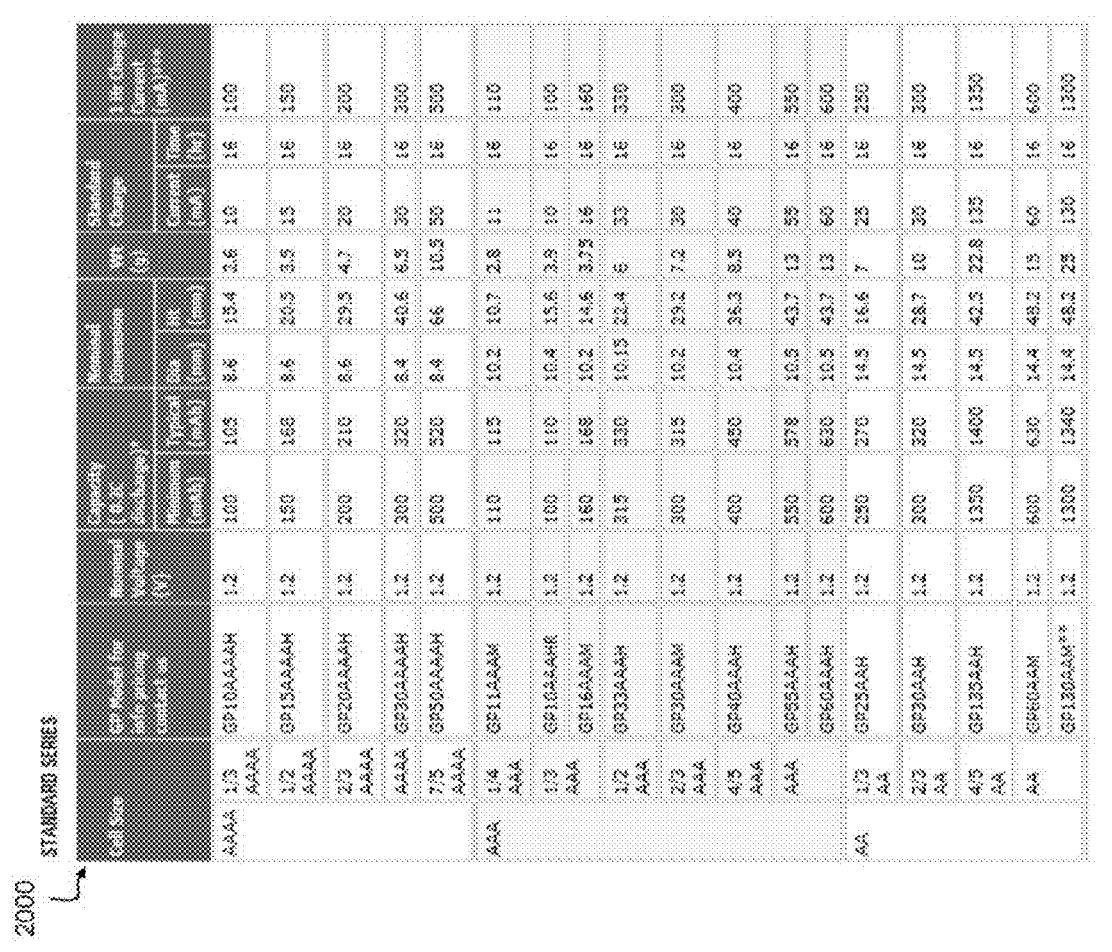

In certain embodiments, battery cell 1904 can be made from a commercially available battery cell. For example, the battery cell 1904 can be made from one or more battery cells with a ⅘ AA battery type with 1100 mA-hr capacity. The battery cell 1904 can be made from one or more battery cells with a ⅔ AA battery type with 700 mA-hr capacity. The battery cell 1904 can be made from one or more battery cells with a AAA battery type with 700 mA-hr capacity. The battery cell 1904 can be made from one or more battery cells with a ⅔ AAA battery type with 400 mA-hr capacity. The battery cell 1904 can be made from one or more battery cells with a AAAA battery type with 300 mA-hr capacity. The battery cell 1904 can be made from one or more battery cells with a ½ AAA battery type with 250 mA-hr capacity. The battery cell 1904 can be made from one or more battery cells with a ⅓ AAA battery type with 180 mA-hr capacity. The battery cell 1904 can be made from one or more battery cells with a ¼ AAA battery type with 85 mA-hr capacity. The battery cell 1904 can be made from one or more battery cells with a ⅓ AA battery type or a ½ AAAA battery type. FIGS. 20A and 20B are tables 2000 listing exemplary sizes and specifications of commercially available Ni-MH battery cells, which can be used for the battery cell 1904. Alternatively, a battery cell 1904 can be a custom made battery cell.

In some embodiments, a battery 1900 can include multiple battery cells 1904 which can correspond to one or more different types of battery cells. This can be advantageous when one of the battery cells 1904 has a defect because the battery 1900 can still store power through the other battery cells 1904 which function properly.

In certain embodiments, a power receiving apparatus does not include a battery cell 1904 but directly provides power to an electronic device.

Figures 19F, 19G, 19H, 19I:
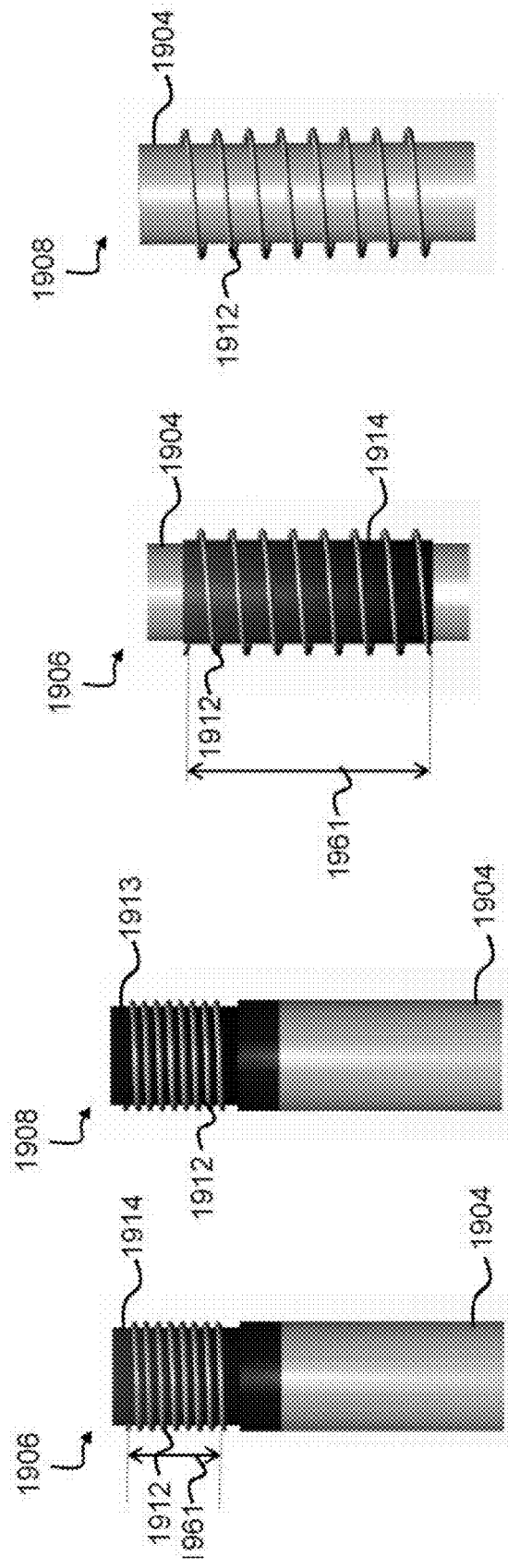
FIGS. 19F-19I are schematic diagrams showing additional embodiments of wirelessly chargeable batteries.

FIG. 19F is a schematic diagram showing an embodiment of a wirelessly chargeable battery 1906 having a receiver resonator including a coil 1912, and a magnetic material 1914 positioned in a core of the coil 1912. The magnetic material 1914 is positioned adjacent to a battery cell 1904, which has a substantially similar diameter to that of a standard AA battery. For example, the diameter of battery cell 1904 can differ from that of the standard AA battery by less than 2% (e.g., less than 5%, less than 10%, less than 15%). In some embodiments, the battery cell 1904 has a substantially similar diameter and length to that of a standard AA battery. For example, the diameter and length of the battery cell 1904 can differ from that of the standard AA battery by less than 2% (e.g., less than 5%, less than 10%). The magnetic material 1914 is shaped as a hollow cylindrical shell covering a cylindrical container (not shown in FIG. 19F), which encloses control electronics 1920 (not shown in FIG. 19F).

FIG. 19G is a schematic diagram showing another embodiment of a wirelessly chargeable battery 1908 having a receiver resonator including a coil 1912, which is connected to a battery cell 1904. The coil 1912 wraps around a cylindrical container 1913, which encloses control electronics 1920 (not shown in FIG. 19G). Hence, there is no magnetic material between the coil 1920 and the container 1913. The absence of magnetic material reduces the weight and manufacturing cost of the battery 1908. In this embodiment, the battery cell 1904 has a substantially similar diameter to a standard AA battery.

FIG. 19H is a schematic diagram of an embodiment of a wirelessly chargeable battery 1906 which has a coil 1912 wrapped around a magnetic material 1914 shaped as a hollow cylinder. Magnetic material 1914 encloses a battery cell 1904. In this embodiment, the battery cell 1904 has a substantially similar size to a standard AAA battery. The coil 1912 has a length 1961 that extends a substantial portion of the battery cell 1904 unlike the embodiment shown in FIG. 19F. For example, in FIG. 19H, the length 1961 extends at least 75% (e.g., at least 80%, at least 90%) of the length of the battery cell 1904. In FIG. 19F, a length 1961 of coil 1912 is less than 40% (e.g., less than 30%, less than 25%) of the length of battery cell 1904. The longer length 1916 can provide a larger coupling coefficient of power transfer from a source resonator than the example shown in FIG. 19F. FIG. 19J shows an end view of battery 1906 that illustrates the arrangement of the battery cell 1904 as seen along a coaxial axis (pointing out of the plane of the figure). In some embodiments, the thickness of the magnetic material 1914 can be in a range of 0.5-1 mm. For example, the thickness can be 0.52±0.05 mm. In some embodiments, the thickness can be 0.5 mm or more, 0.55 mm or more, 0.6 mm or more, 0.65 mm or more, 1 mm or less, 0.95 mm or less, 0.9 mm or less. The combined thickness of the magnetic material 1914 and a gap 1991 can be in a range of 1-3 mm. In some embodiments, the combined thickness can be 0.8 mm or more, 0.9 mm or more, 1 mm or less, 2 mm or less, 3 mm or less, 4 mm or less. In some embodiments, the combined thickness can be 2±0.1 mm. The thicknesses can be selected to increase energy coupling to a source resonator and/or reduce losses due to the magnetic material 1914, if any.

A battery 1900 (such as battery 1906) can include a battery cell 1904 which has a metallic outer surface or contains metal. This can induce a loss of the energy received by the battery 1900. Thus, in some embodiments, it can be desirable to shield the metal of the battery cell 1904 from an adjacent coil 1912. In certain embodiments, a magnetic material 1914 can be used as shield between the coil 1912 and the battery cell 1904. For example, in FIG. 19H, magnetic material 1914 is positioned between the coil 1912 and the battery cell 1904. When power provided by a source resonator induces oscillating currents in the coil 1912, the magnetic material 1914 can reduce the amount of penetration of the fields (e.g., electric field, magnetic field) generated by the currents into the battery cell 1904. The reduction or absence of penetration of the fields into the battery cell 1904 can increase the energy stored in the battery cell 1904 for given amount of received energy. In some embodiments, the magnetic material 1914 can be used to shield the coil 1913 from other lossy objects (e.g., control electronics 1920, other perturbing objects such as metal in a connected electronic device).

In certain embodiments, a magnetic material 1914 can be arranged to improve the coupling coefficient of energy transfer between a source resonator and a coil 1912. In certain embodiments, a magnetic material 1914 can be positioned to reduce the coupling between a coil 1912 and an electronic device connected to a battery cell 1904. For example, the magnetic material 1914 can be positioned between a metallic portion of the electronic device and the coil 1912 to shield the effect of loss in the metallic portion. In certain embodiments, the thickness of the magnetic material 1914 can be in a range of 0.5-1 mm. For example, the thickness can be 0.52±0.05 mm. In some examples, the thickness can be 0.5 mm or more, 0.55 mm or more, 0.6 mm or more, 0.65 mm or more, 1 mm or less, 0.95 mm or less, 0.9 mm or less. The thickness can be at least 1 times (e.g., at least 1.5 times, at least 2 times) the skin depth of fields (e.g., electric fields, magnetic fields) that can penetrate the battery cell 1904. In some embodiments, the magnetic material 1914 can be separated from the coil 1912 with a gap thickness of at least 0.1 mm (e.g., at least 0.5 mm, at least 1 mm, at least 1.5 mm) or less than 3 mm (e.g., less than 2 mm, less than 1 mm, less than 0.5 mm). The gap thickness can be selected based the skin depth of fields that can penetrate the battery cell 1904, to improve the shielding effect.

FIG. 19I is a schematic diagram of an embodiment of a wirelessly chargeable battery 1908 which has a coil 1912 wrapped around a battery cell 1904. In this embodiment, there is no magnetic material between the coil 1912 and the battery cell 1904. Embodiments with no magnetic material between coil 1912 and battery cell 1904 can be used, for example, when the loss due to the battery cell 1904 is negligible (e.g., loss is less than 5% of power received from a source resonator). In some embodiments, the battery cell 1904 has an outer surface 1915 facing the coil 1912 made from a metal with high conductivity and low loss. The outer surface 1915 can act as a shield for the coil 1912. In such embodiments, the volume of the battery cell 1904 and/or the diameter of the coil 1912 can be made larger due to the absence of a magnetic material, which also reduces the weight of the battery 1906. FIG. 19K shows an end view of battery 1908 along its coaxial axis (pointing out of the plane of the figure). A gap 1991 (e.g., air gap) is positioned between the coil 1912 and the outer surface 1915. In some embodiments, a dielectric medium such as adhesive can be placed between the coil 1912 and the outer surface 1915.

Figure 21B:
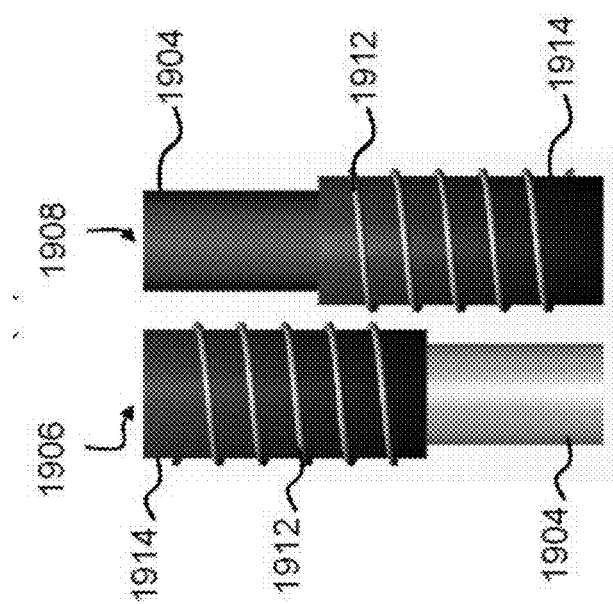
FIGS. 21A-21G are schematic diagrams showing embodiments of wirelessly chargeable batteries.
Figure 21A:
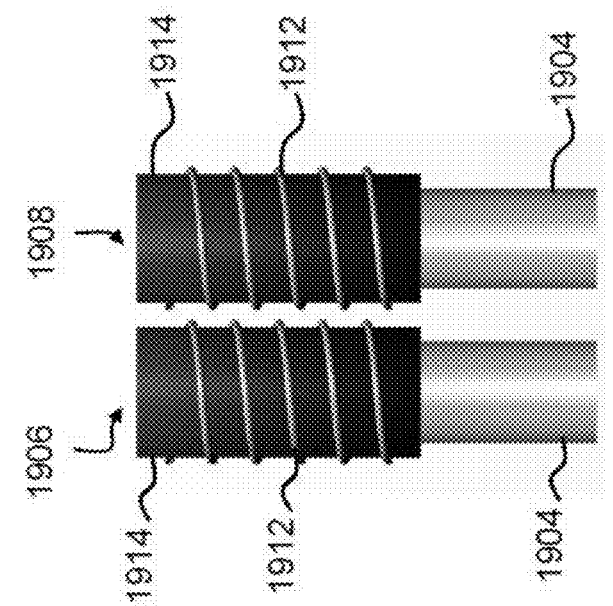

In general, a wide variety of arrangements of multiple wirelessly chargeable batteries can be implemented. In particular, specific designs of the can be implemented batteries and specific arrangements of batteries can be used based on factors such as coupling between adjacent batteries and the field distribution generated by one or more source resonators. In some embodiments, a battery 1906 and a battery 1908 can be positioned in a side-by-side aligned arrangement, as shown in FIG. 21A. In certain embodiments, a battery 1906 and a battery 1908 can be positioned in an anti-aligned arrangement, as shown in FIG. 21B. The anti-aligned arrangement can reduce the coupling between the coils 1912 of the batteries 1906 and 1908.

Resonators can generally be oriented along different directions with respect to an axis of a battery cell. FIG. 21C is a schematic diagram showing an example arrangement where a battery 1906 has its battery cell 1904 with its coaxial axis along a direction 2110 and a coil 1912 with its coaxial axis along a direction 2112. The directions 2110 and 2112 are orthogonal to each other. Conversely, battery 1908 has coaxial axes of battery cell 1904 and coil 1912 parallel to each other being oriented along direction 2110.

Positioning batteries 1906 and 1908 adjacent to one another and with resonators oriented in orthogonal directions can reduce coupling between coils 1912 of the batteries due to their orthogonal arrangement. Moreover, for a given magnetic field direction provided by a source resonator, either or both of the batteries 1906 and 1908 can be charged and provide power to an electronic device. For example, when the source resonator generates a magnetic field along direction 2110, the battery 1908 can be predominantly charged. When the magnetic field is generated along direction 2112, the battery 1906 can be predominantly charged. When the magnetic field points in a direction between directions 2110 and 2112, both batteries 1906 and 1908 can be charged. In this approach, the electronic device can receive power from the source resonator in a wide range of orientations of the electronic device with respect to the source resonator.

Figure 21D:
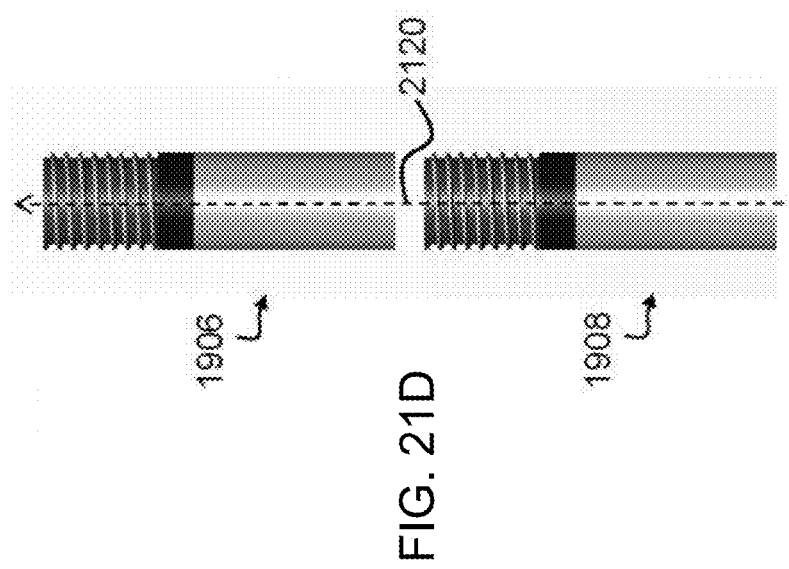
Figure 21C:
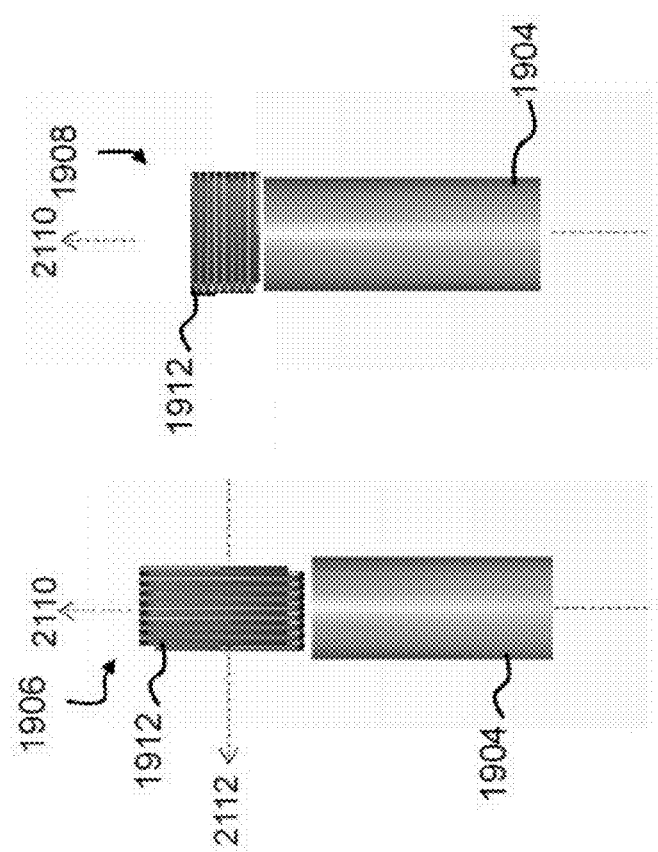
Figures 21E, 21F, 21G:
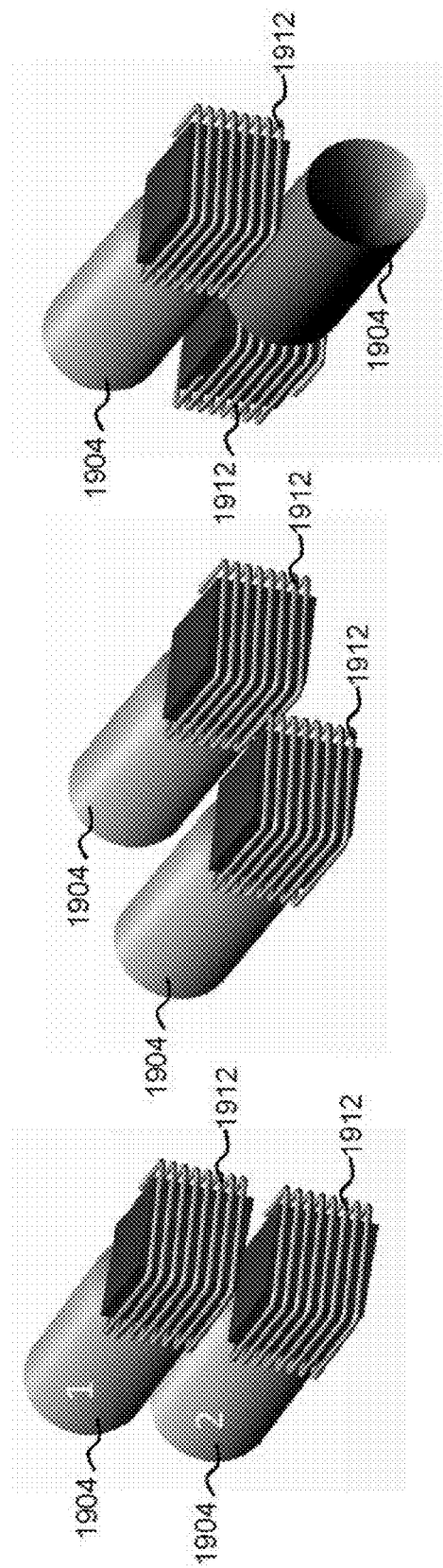

FIG. 21D is a schematic diagram showing another example arrangement of a battery 1906 and a battery 1908, where the axes of each battery are coincident along an axis 2120. Coupling between the coils of batteries 1906 and 1908 can be significantly reduced due to the presence of battery cell 1904 of battery 1906. FIGS. 21E-21G are schematic diagrams showing other example arrangements of two batteries with coils 1912 oriented perpendicular to the axis of their respective battery cells 1904. In some embodiments, two coils 1912 can be aligned to each other as shown in FIG. 21E. Alternatively, when coupling between adjacent coils 1912 is large, the battery cells 1104 can be anti-aligned as shown in FIG. 21G. The asymmetry of the anti-alignment can reduce the coupling between the adjacent coils. In certain embodiments, two coils 1912 can be displaced as shown in FIG. 21F. The amount of displacement can be depend on the exact field (e.g., electric, magnetic) distribution of a region where the two coils 1912 are positioned. The displacement can be determined to reduce the coupling between the two coils 1912. For example, when the field distribution in the region has a strong gradient, the displaced arrangement of FIG. 21F can have reduced coupling between the two coils 1912.

Figure 22A:
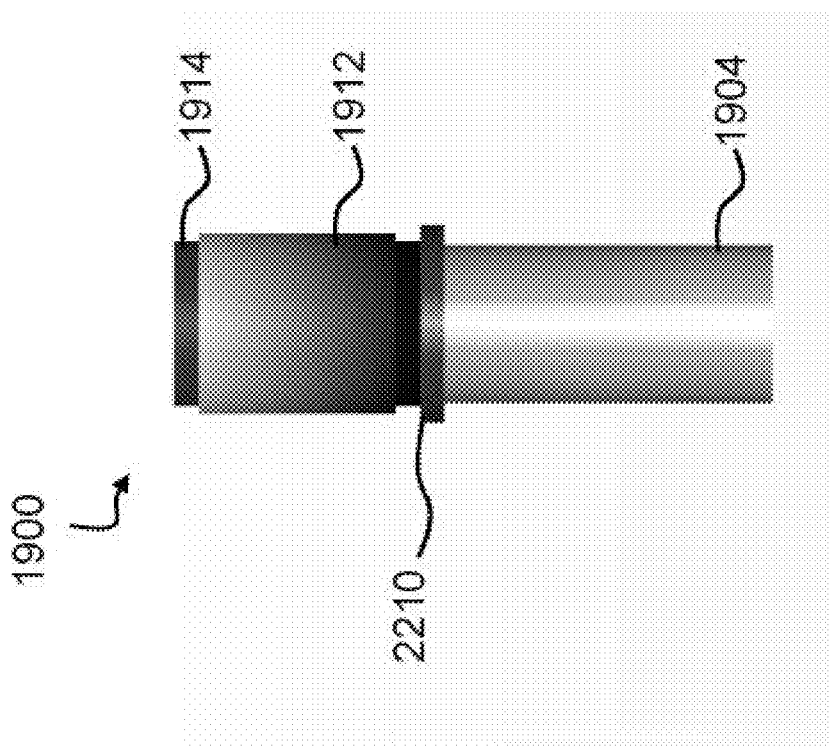
FIGS. 22A and 22B are schematic diagrams showing embodiments of wirelessly chargeable batteries.

FIG. 22A is a schematic diagram showing an embodiment of a battery 1900. In this embodiment, the battery 1900 includes an intermediate element 2210 between a magnetic material 1914 and a battery cell 1904. The intermediate element 2210 can act as a shield to reduce penetration of fields (e.g., electric fields, magnetic fields) induced by the currents into the battery cell 1904. The intermediate element 2210 can be formed from the same material as the magnetic material 1914. In some embodiments, the intermediate element 2210 can be formed from material with a higher shielding effect than the magnetic material 1914. The intermediate element 2210 can be formed from one or more materials (e.g., metglass, nanoperm, mu-metal, cobalt-iron, permalloy, electric steel, ferrite stainless steel, martensitic stainless steel) listed in the table shown in FIG. 22C.

In some embodiments, the intermediate element 2210 can function as a rigid locking element which fixes the connection of the magnetic material 1914 and the battery cell 1904. For example, the intermediate element 2210 can be made from a shock absorbing material that reinforces the battery 1900 so that the battery can withstand force applied along its coaxial direction.

Figure 22B:
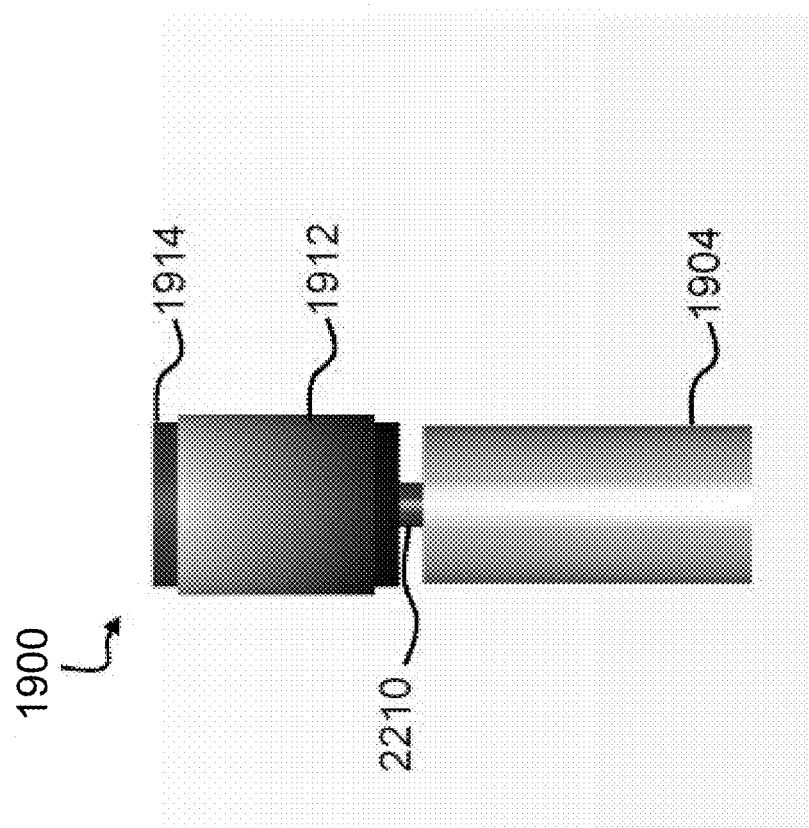

FIG. 22B is a schematic diagram showing another embodiment of a battery 1900 including an intermediate element 2210. The diameter of the intermediate elements 2210 can be selected based factors such as cost, weight, shielding and reinforcement of the battery 1900. For example, the diameter can be less than 90% (e.g., less than 75%, less than 50%, less than 25%) of a diameter of the battery cell 1904.

In some embodiments, a battery 1900 can have a diameter of a specific standard battery (e.g., AA battery) while including a battery cell with a size of another standard battery (e.g., AAA battery). As an example, FIG. 23A is a schematic diagram showing a battery 1900 that includes a battery cell 1904 with a diameter 2301 corresponding substantially to a diameter of a standard AAA battery or a standard AAA battery cell. A receiver resonator includes a coil 1912 wrapped around a magnetic material 1914. In this embodiment, the magnetic material 1914 encloses the battery cell 1904. The combined thickness of the coil 1912 and the magnetic material 1914 is selected such that the total diameter 2302 is substantially the same as a standard AA battery. For example, the total diameter 2302 can be within 2% (e.g., within 5%) of the diameter of the standard AA battery. In certain embodiments, the diameter 2302 of the battery 1900 and/or the diameter of 2301 of the battery cell 1904 is not exactly equivalent to that of a standard battery, but is within 2% (e.g., within 5%, within 10%). In this approach, a standard battery of a smaller size can be easily modified to be used as a standard battery of a larger size. For example, the coil, magnetic material and control electronics can be built alone as a stand-alone unit which is connected to a commercially available standard battery. The stand-alone unit can be implemented as a sleeve, with an interior opening dimensioned to receive a standard battery or a standard battery cell, which is inserted into the sleeve.

FIG. 23B is a schematic diagram showing an embodiment of a battery 1900 having a specific standard battery size (e.g., AA battery size) while including a battery cell with a size of a smaller standard battery (e.g., AAA battery). The battery 1900 includes control electronics 1920 which occupy 20% or less (e.g., 10% or less, 5% or less) of the volume of a battery cell 1904. For example, in some embodiments, the control electronics have a height of about 5 mm and a diameter of about 12.6 mm. By reducing size of the control electronics 1920, the energy storage capacity of the battery cell 1904 can be increased for the given specific standard battery size.

In this embodiment, the battery 1900 includes a buffer 2310 (e.g., a spring, a conical spring contact, a cushion) for absorbing compressive force applied to the battery 1900 along its coaxial direction. Compression of buffer 2310 can help to absorb the force that is typically applied to the battery when it is introduced into a battery compartment of a device, making battery 1900 more damage-resistant. In FIG. 23B, the buffer 2310 is positioned at the negative terminal of the battery 1900. In some embodiments, the buffer 2310 can be positioned at the positive terminal of the battery 11900. Further, in certain embodiments, the buffer 2310 can be positioned at both the positive and negative terminals of the battery 1900. Dimensions 2320-2323 can correspond to those of a standard AAA battery, for example. That is, the values of the dimensions can be about 1.985, about 1.772, about 0.470-0.487, and about 0.403 inches, respectively. Magnetic material 1914 is a flexible ferrite material joined to a copper shield 2330 by an adhesive. The copper shield 2330 wraps around the battery cell 1904 and the control electronics 1920.

Figure 23E:
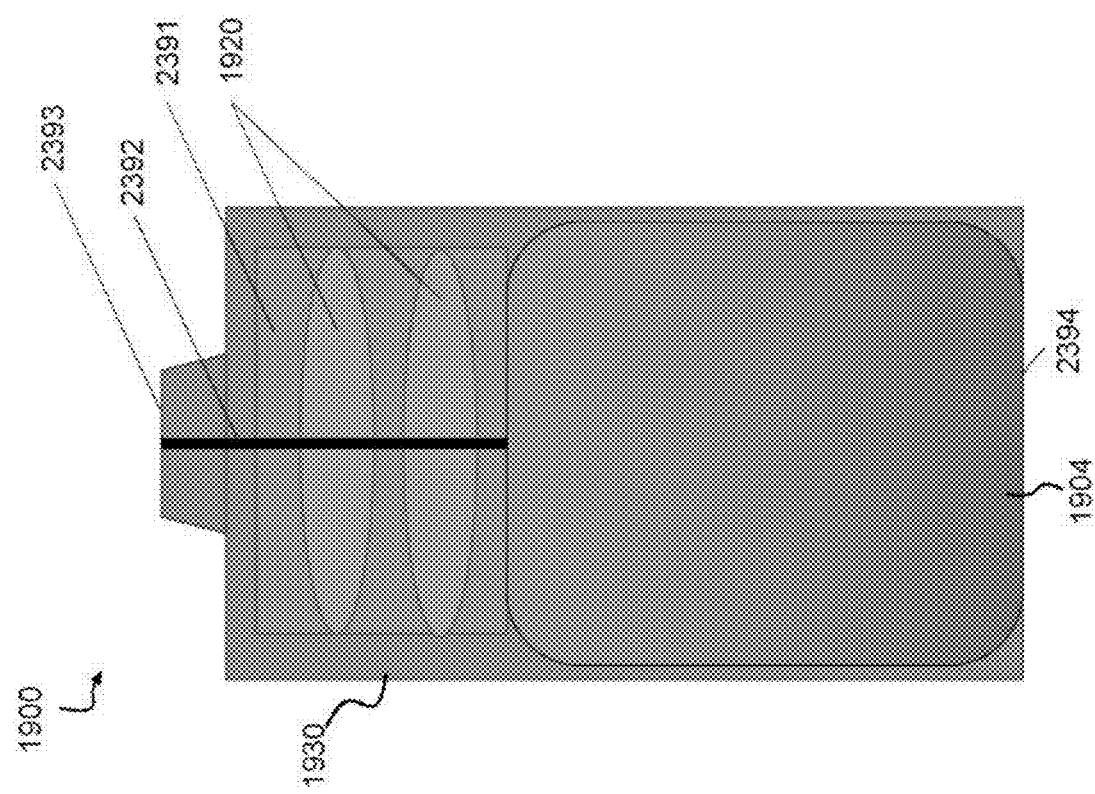

FIG. 23E is a schematic diagram of another embodiment of a battery 1100 (where coil 1912 and magnetic material 1914 are not shown). In this embodiment, the bottom of the battery cell 1904 is in contact with a negative terminal 2394 of the battery 1900, formed at the bottom of battery housing 1930. The large contact area between the negative terminal 2394 and the battery 1900 can spread stress applied along the coaxial axis of the battery cell 1904 over a large area. In this embodiment, the battery 1900 includes a support 2392 (e.g., a wire) which extends from a positive terminal 2393 of the battery 1900 to the battery cell 1904. The support 2392 passes through adhesive 2391 (e.g., epoxy) which contains control electronics 1920. The adhesive 2391 can absorb force applied along the coaxial axis, thereby reducing stress applied to the control electronics 1920, which can include a PCB.

In some embodiments, battery 1900 can include a magnetic material 1914 with several magnetic elements spaced apart from each other, as shown in FIG. 23C. FIG. 23F is a top view of the battery 1900 of FIG. 23C, which shows four magnetic elements of the magnetic material 1914. The magnetic elements can be located at positions which can increase the coupling coefficient of energy transfer from a source resonator or at positions which effectively shield and reduce the loss effect of an enclosed battery cell 1904. Moreover, in this approach, the total weight of the battery 1900 can be reduced by eliminating unnecessary portions of the magnetic material 1914. The shape and position of each magnetic element can be determined based on the relative arrangement of the coil 1912 and battery cell 1904. For example, the magnetic elements can be positioned to guide and shape the fields (e.g., electric fields, magnetic fields) induced by the currents of the coil 1912 to reduce penetration of the fields into the battery cell 1904. This can reduce losses induced by the battery cell 1904.

In some embodiments, a battery 1900 can include a coil 1913 and a magnetic material in a rectangular arrangement, as shown in FIG. 23D. A battery cell 1904 is arranged with the magnetic material 1914 in way such that the coaxial axis of the battery cell 1904 intersects the magnetic material 1914. The embodiment shown in FIG. 23D can be used us a wirelessly chargeable battery for a standard 9V battery which has a rectangular, cuboid shape. For example, a standard AAA battery cell can be modified to be used as a standard 9V battery.

FIG. 24A is a schematic diagram showing two batteries 1906 and 1908, where each battery has a coil 1912 and magnetic material 1914 positioned at the center of battery cell 1904 along the axes of batteries 1906 and 1908. The two batteries 1906 and 1908 can be used together in a device. More generally, however, each of the coils 1912 and magnetic materials 1914 can be placed at a position other than at the center of battery cell 1904 along the axes of batteries 1906 and 1908. For example, in some embodiments, the coil 1912 and the magnetic material 1914 are movable in a direction parallel to axis 2402. The relative arrangements of the coils 1912 and magnetic materials 1914 of the batteries 1906 and 1908 can therefore be selected manually. In some embodiments, adjusting the relative positions of the coils 1912 can reduce coupling between the coils. This can be desirable when the coupling between coils 1912 can lead to detuning of the resonant frequencies by an amount that exceeds the bandwidth of each coil, for example.

FIG. 24B is a schematic diagram showing another embodiment with two batteries 1906 and 1908, where each battery has a magnetic material 1914 enclosing its battery cell 1904 (not shown) in its entirety. In some embodiments, the batteries 1906 and 1908 include coils 1912 that are wound around the entire (or nearly the entire) magnetic material 1914. For example, each battery can have its coil 1912 wound around a substantial portion (e.g., 80% or more, 90% or more) of its magnetic material 1914, but not necessarily 100%. Winding around less than 100% of the magnetic material is a configuration that can be employed, for example, when battery 1930 housing limits the available space for coils.

It should understood that the techniques and configurations disclosed in connection with FIGS. 21A-21G and 24A-24B can be extended to more than two batteries 1900 (e.g., three or more batteries, four or more batteries, five or more batteries).

In general, the power receiving apparatus can be configured engage with a battery compartment of a battery-operated device. In some embodiments, the power receiving apparatus can include electrodes which connect to the device for providing power. In certain embodiments, the power receiving apparatus can inductively transfer power directly to the device.

Coils, Magnetic Materials, and Control Electronics of the Power Receiving Apparatus A receiver resonator can include a coil 1912, which is formed from materials with high conductivity at an operating frequency of the resonator. For example, for receiving power at frequencies of about 6 MHz, the coil 1912 can include copper ribbon and PCB traces. For receiving power at lower frequencies (e.g., 2 MHz or lower), the coil 1912 can include litz wire.

In some embodiments, coil 1912 can be formed from solid copper or can be printed or etched on flexible printed-circuit-board (PCB). The solid copper or flexible PCB can be wrapped around a battery cell 1904. For example, the coil 1912 can be formed as multiple conducting windings which are soldered together. This approach can be advantageous for frequencies where the AC conducting loss of copper is low. For example, copper can be used at operating frequencies greater than 2 MHz. In certain embodiments, copper can be used, for example, at operating frequencies of about 6 MHz (e.g., 5.5-6.5 MHz, 5-7 MHz). In some embodiments, using copper can reduce the cost of manufacturing the coils.

In certain embodiments, a coil 1912 can be printed on a label such as flexible substrate (e.g., a thin flexible paper or plastic material). The coil 1912 can be printed using printed traces, conducting ink, or conducting gel. The flexible substrates are typically easy to manufacture, transport, and store, thereby reducing manufacturing costs. Flexible substrates can easily deform to shapes that correspond to a variety of form factors of a battery cell 1904. In some embodiments, the exact geometry of the coil 1912 can be adjusted before the coil is fabricated (e.g., "printed") based on the specific geometrical configuration of battery cell 1904.

In some embodiments, a coil 1912 can be directly printed on a magnetic material 1914. The coil 1912 can be printed using printed traces, conducting ink or conducting gel. Overall the combined thickness of the coil 1912 and the magnetic material 1914 can be relatively small because no adhesive layer is used between coil 1912 and magnetic material 1914.

In certain embodiments, coil 1912 can be formed from a solid piece of conductive material that is wrapped around a magnetic material 1914 or a battery cell 1904. For example, coil 1912 can be a single sheet of conducting film with only a one-turn winding. This can eliminate soldering different pieces of conductors together during manufacture.

In certain embodiments, coil 1912 can be printed or embedded on/in battery housing 1930, which eliminates soldering different pieces of the coil 1912 together or using a separate adhesive layer to fix the coil 1912 to battery housing 1930 or to magnetic material 1914 during manufacturing. Because the battery housing 1930 can be made from a rigid material such as hard plastic or aluminum, the battery housing 1930 can protect coil 1912 against damage from external forces.

In some embodiments, coil 1912 can be deformable (e.g., flexible) and can conform to a shape of a battery compartment or an electronic device. For example, coil 1912 can be formed from a conducting gel, which can easily conform to a variety of shapes under the influence of an external applied force. Such implementations can be desirable, for example, in batteries that are used under conditions of high pressure (e.g., at least 2 atm, 3 atm) or high temperature (e.g., at least 85° F., at least 100° F.), where the structure of battery 1900 can be deformed.

Magnetic material 1914 can include a rigid and/or flexible ferrite material. For example, at wireless power transfer frequencies of about 6 MHz, magnetic material 1914 can include ferrite material such as, for example, Nickel-Zinc ferrites, rigidly-formed NL-12S ferrites, and/or flexible FJ3. At lower frequencies (e.g., 2 MHz or lower), magnetic material 1914 can include Manganese-Zinc ferrites, for example.

In some embodiments, magnetic material 1914 can be formed from one or more materials (e.g., metglas, nanoperm, mu-metal, cobalt-iron, permalloy, electric steel, ferrite stainless steel, martensitic stainless steel) listed in the table shown in FIG. 22C.

Control electronics 1920 can include various elements such as a circuit board, conductors, magnets, communication components, antennas, switches, connectors, and displays. Magnetic material 1914 can be arranged to at least partially enclose some of the elements in the control electronics 1920, allowing the magnetic material to shield losses due to elements of the control electronics 1920.

In some embodiments, control electronics 1920 can include circuitry for tuning a resonant frequency of a connected receiver resonator and/or for impedance matching. The receiver resonator can correspond to any of the resonators implemented as wirelessly chargeable batteries disclosed herein. For example, control electronics 1920 can include control circuitry, tuning circuitry, measurement circuitry, and/or monitoring circuitry. The circuitry can be fixed-tuned or variably-tuned, and can be used to monitor the voltages, currents, phases, inductances, and/or capacitances of various elements of the receiver resonator. Measured parameters of the receiver resonator can be used to adjust or tune the receiver resonator. A user can manually tune the receiver resonator, or control electronics 1920 can actively adjust one or more of the capacitance, the resonant frequency, the inductance, and the resistance of the repeater resonator based on a received/measured signal to prevent exceeding the receiver resonator's voltage, current, temperature, and/or power limits. In certain embodiments, control electronics 1920 can include open or closed loop circuits for feedback control, where a feedback signal can be received as a wireless signal (e.g., RF signal, Bluetooth, NFC signal). The feedback signal can be delivered to the circuitry within control electronics 1920.

In certain embodiments, control electronics 1920 can include elements for protecting the components of battery 1900. For example, control electronics 1920 can include switches such as thermal switches, poly switches or DC circuits. Control electronics 1920 can include sensors and/or over-voltage protection, over-current protection, and/or over-temperature protection circuits. The elements can be used detect above threshold conditions (e.g., in voltage, current, temperature), and adjust the operation of battery 1900 and/or send an alerting signal to a monitoring device. In certain embodiments, elements such as field effect transistors (FET) or poly switches can be used to change a resonant frequency of battery 1900 and/or limit the power received by battery 1900. The overall footprint of control electronics 1920 can be reduced using such elements.

In some embodiments, battery housing 1930 of battery 1900 can be opened so that the arrangement of its individual components is adjusted or tuned. For example, in some embodiments, battery housing 1930 can be implemented as a sleeve which can slide off its power receiving sub-structure 1902 and battery cell 1904. In certain embodiments, battery housing 1930 can have a sliding cover or hinged cover. A user can slide open the cover or rotate the hinged cover to directly access the power receiving sub-structure 1902 and/or the battery cell 1904. This can allow easy replacement of any defective elements in battery 1900. Control electronics 1920 can also include electrodes which each contact the anode or cathode of battery 1900. In some embodiments, a user can replace components (such as a battery cell 1904, a resonator, or faulty circuitry) with a replacement component, which reduces the cost of maintaining battery 1900 in operation.

Figure 26:
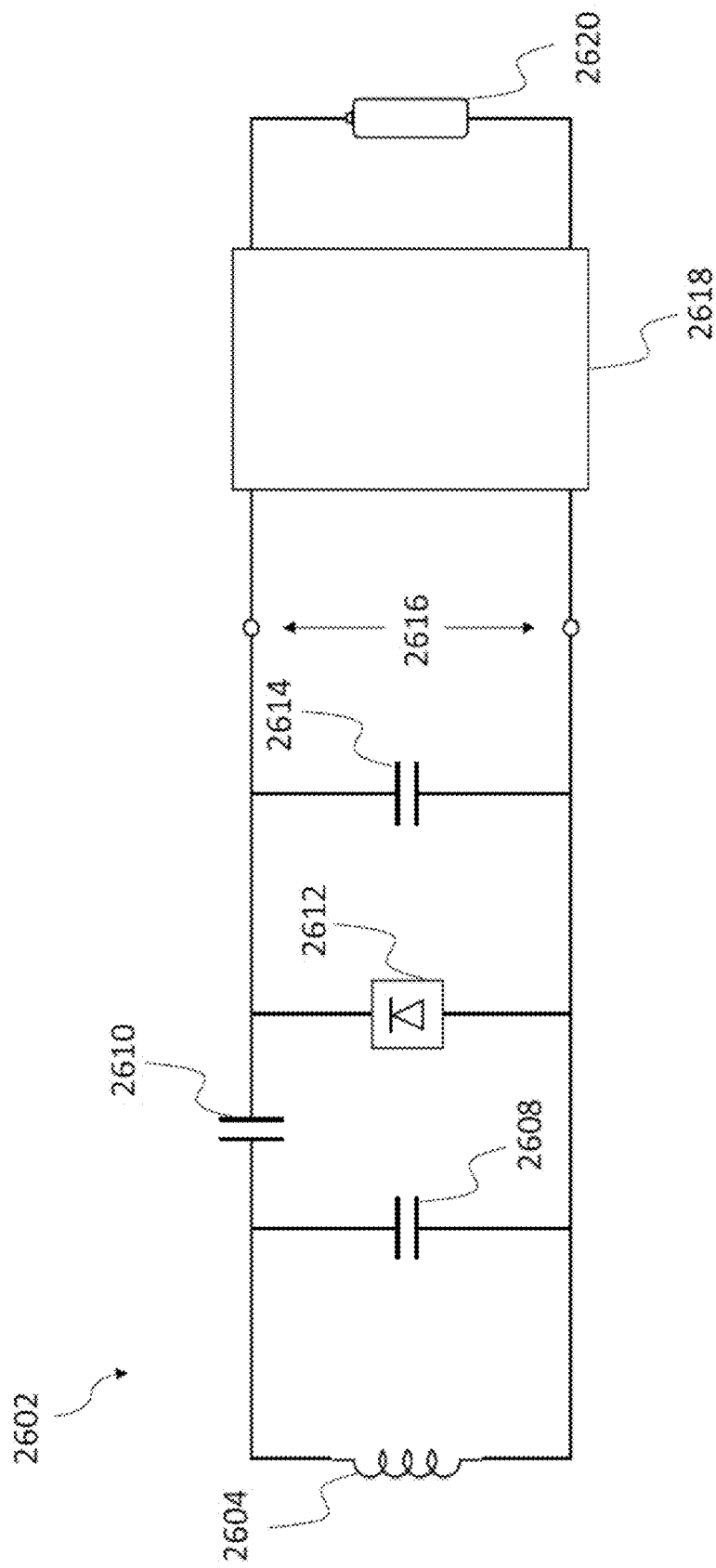
FIG. 26 is a schematic diagram showing a circuit diagram of a wirelessly powered device.
Figure 27:
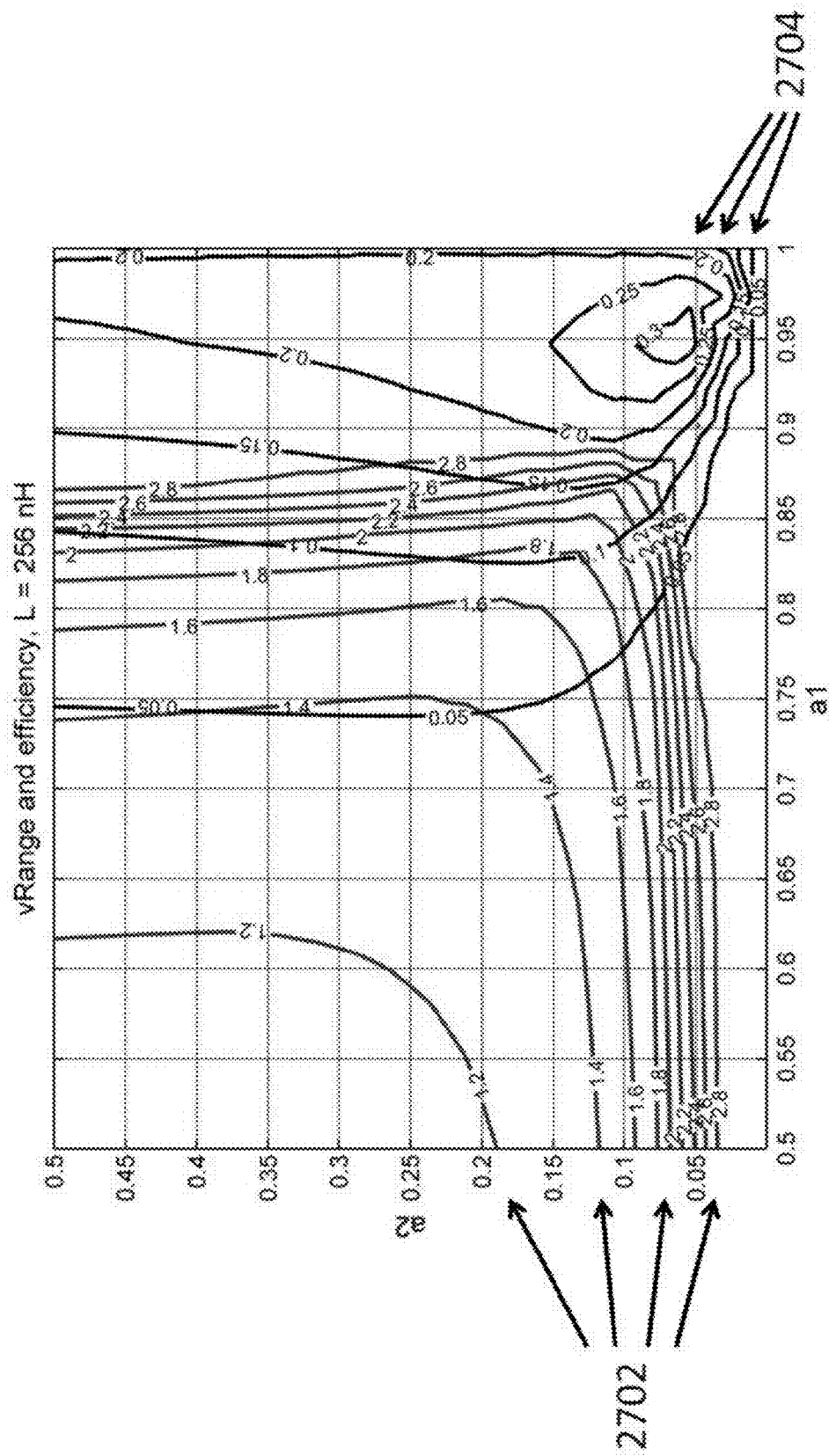
FIGS. 27-30 are plots of the voltage range and coil-to-coil efficiency as a function of variables $a_1$ and $a_2$ for different battery device resonator coil inductances.

In some embodiments, an optimal inductance of a resonator coil can be determined based on a trade-off between nominal coil-to-coil efficiency and dynamic unregulated DC voltage range, where two wirelessly charged batteries are positioned near one another in a wireless power transmitting apparatus. The dynamic unregulated DC voltage can be determined by referring to a circuit diagram of a wirelessly chargeable battery, as shown in FIG. 26. FIG. 26 shows a simplified circuit diagram 2602 for a wirelessly chargeable battery or other wirelessly chargeable device, and includes an inductive element 2604 that captures energy that is used to charge a load 2620 (i.e. battery cell). The unregulated DC voltage 2616 is measured after the rectifier 2612 and before the controller 2618. Circuit 2602 can include capacitors 2608, 2610 which are used to impedance match a device to a source, and a filtering capacitor 2614.

Figure 25B:
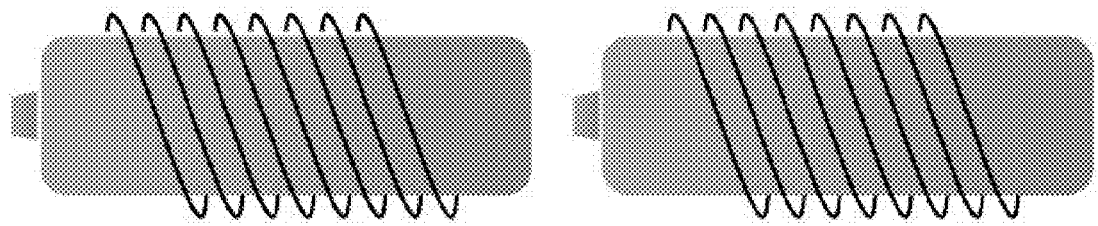
FIGS. 25A and 25B are schematic diagrams showing embodiments of wirelessly re-chargeable batteries.
Figure 25A:
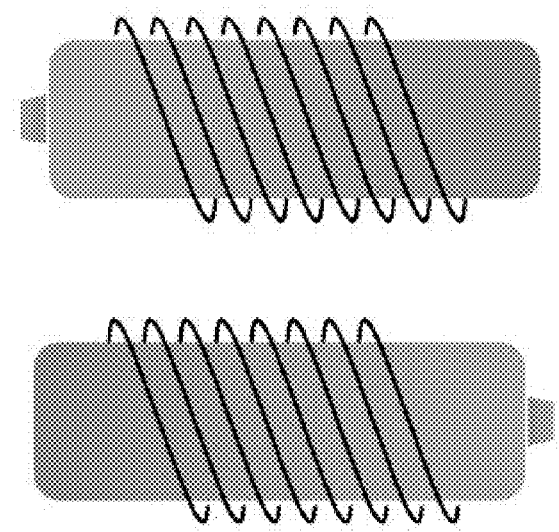

FIGS. 25A and 25B are schematic diagrams showing examples of two different arrangements of two wirelessly re-chargeable batteries within the battery compartment of a battery powered device. In some embodiments, the batteries can be positioned and/or oriented as shown in FIG. 25A or 25B in a wireless power transmitting apparatus. In certain embodiments, the batteries can be oriented or positioned as shown in FIG. 25A or 25B in an electronic device such as a television remote or game controller.

FIGS. 27 through 30 show plots of the voltage range and change in coil-to-coil efficiency as a function of $a_1$ and $a_2$ as inductance of the battery resonator coil is varied. The variables at and $a_2$ are defined by the following:

$$a_1 = \omega^2 C_2 L_D = -\frac{X_D}{X_2}$$

$$a_2 = \omega^2 C_3 L_D = -\frac{X_D}{X_3}$$

The variables $a_1$ and $a_2$ are functions of frequency $\omega^2$, capacitances $C_2$ and $C_3$ in an impedance matching network, and the device-side inductance $L_D$. In some embodiments, inductance $L_D$ corresponds to inductor 2604, and capacitances $C_2$ and $C_3$ correspond to capacitors 2608 and 2610 of FIG. 26.

Figure 28:
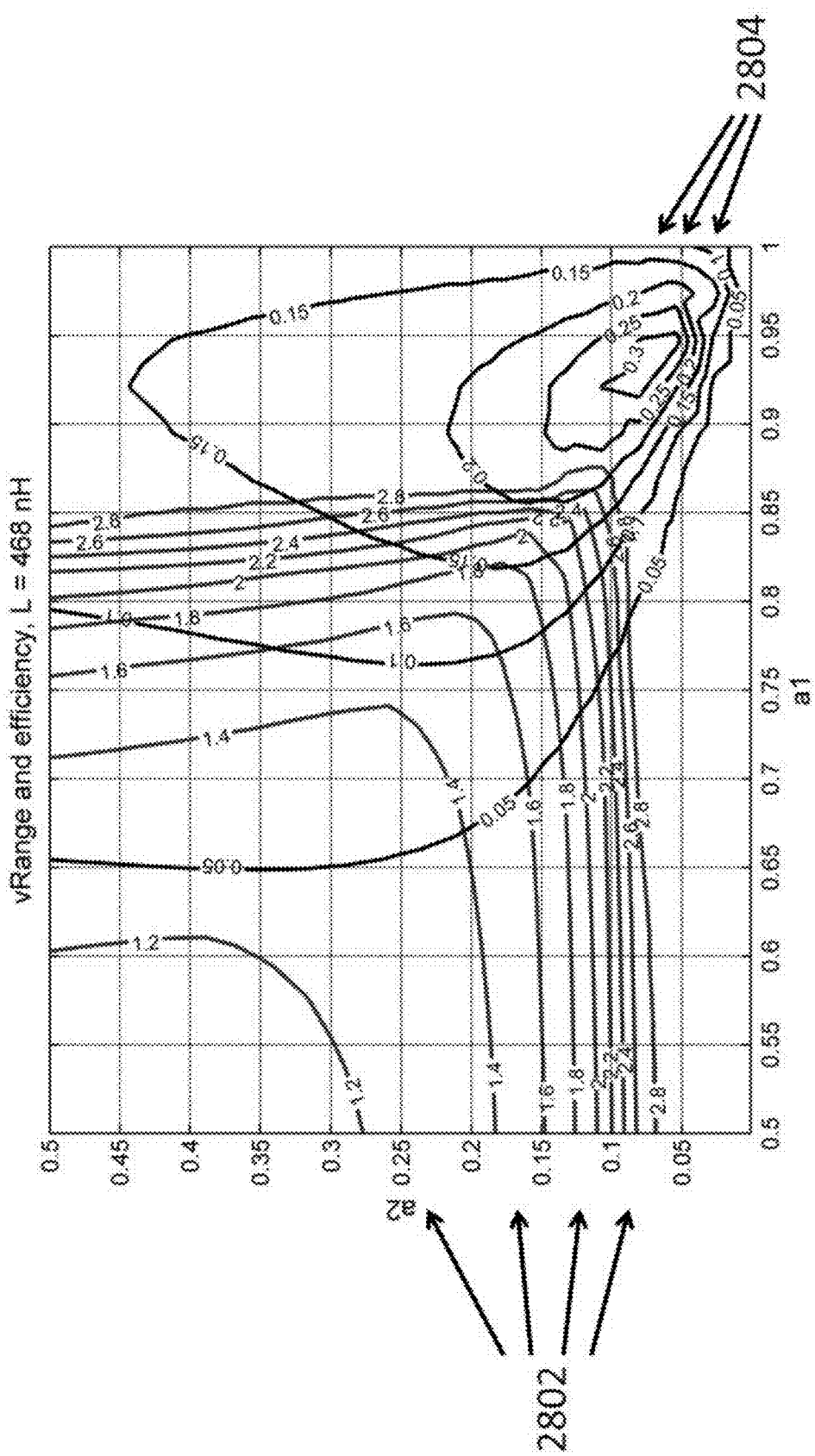
Figure 29:
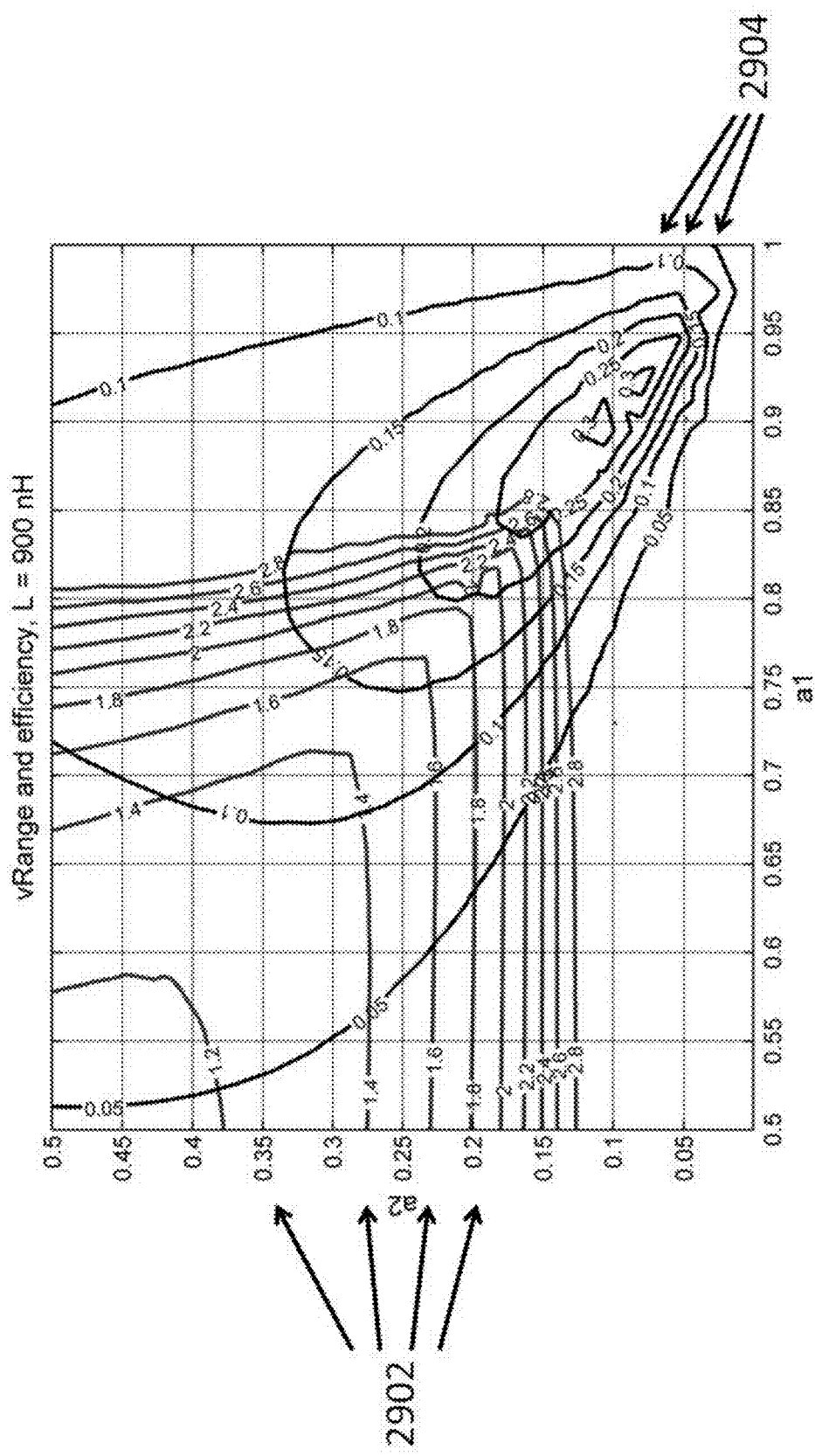
Figure 30:
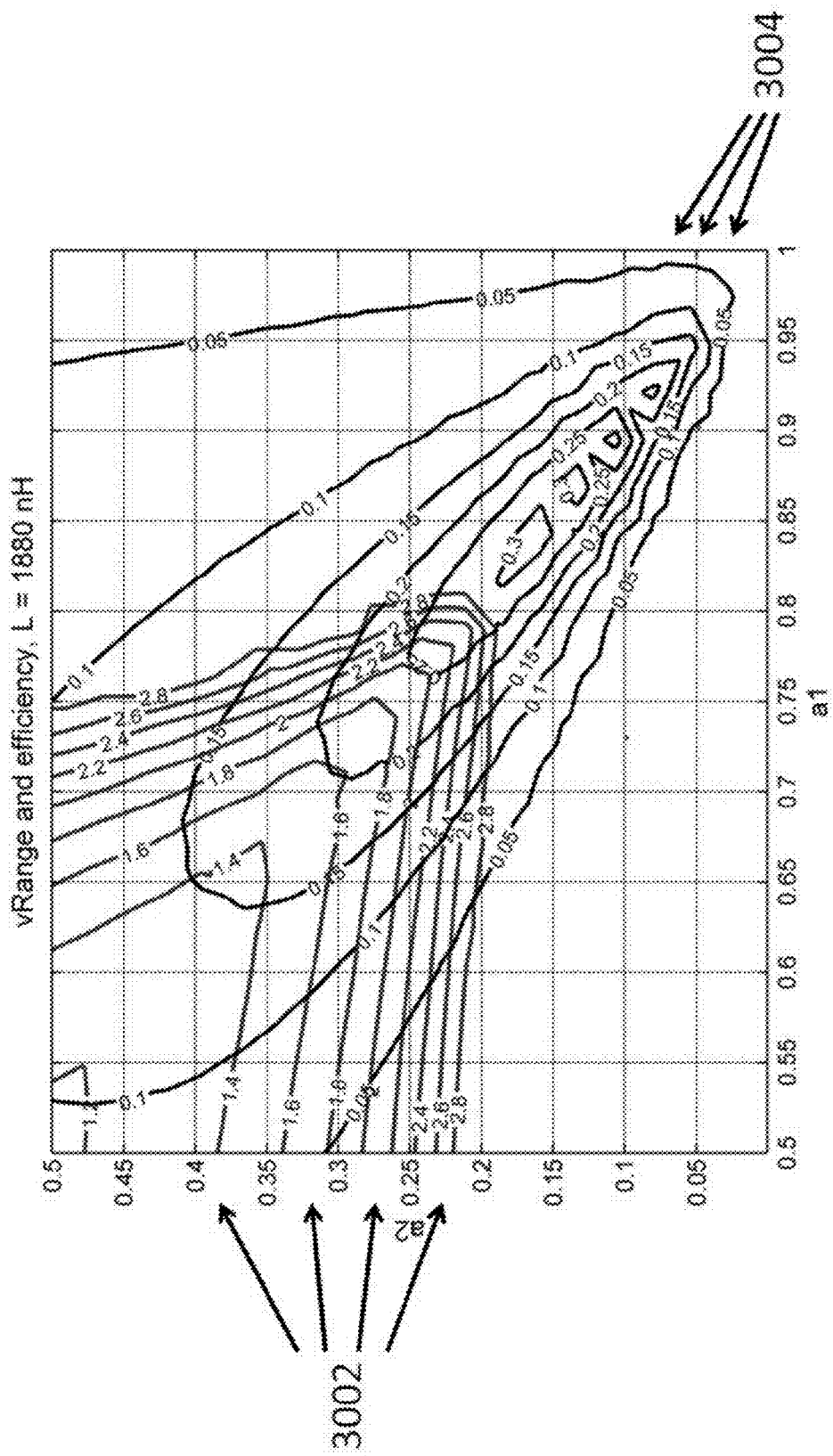

The coil-to-coil efficiency is measured between a source apparatus resonator coil and a battery device resonator coil. Thus, in the plots shown in FIGS. 27-30, points defined by $a_1$, $a_2$ represent an exemplary device-side matching network. As $L_D$ is varied, coil-to-coil efficiency and voltage range also vary. For example, at inductance $L_D$=256 nH shown in FIG. 27, for a voltage range of 1.4 V, there is an approximate expected 5% coil-to-coil efficiency. In FIG. 28, for an inductance of $L_D$=468 nH and a voltage range of 1.4 V, there is an approximate expected coil-to-coil efficiency between 5% and 10%. In FIG. 29, for an inductance $L_D$=900 nH and a voltage range of 1.4 V, there is an approximate expected 10% coil-to-coil efficiency. In FIG. 30, for an inductance $L_D$=1880 nH and a voltage range of 1.4 V, there is an approximate expected 15% coil-to-coil efficiency. The plots in FIGS. 27-30 demonstate that an inductance value for the inductor of a resonator can be chosen such that there is an increase in nominal coil-to-coil efficiency and a decrease in dynamic unregulated DC voltage range.

Hardware and Software Implementations

It should be appreciated that, in general, the wireless power transfer apparatuses disclosed herein can include a controller (e.g., controllers 1208, 1308) that can be configured to adjust any of the parameters and/or perform any of the method steps disclosed herein. Parameters that can be adjusted include, but are not limited to, resistances, capacitances, inductances, frequencies, voltages, and currents of the various components disclosed herein. Parameters can also include, but are not limited to, positions and orientations of various elements such as inductors, capacitors, coils, and resonators. In general, one or more controllers can perform any of the functions or steps that can also be performed by a user of the apparatuses disclosed herein, unless explicitly stated otherwise.

The method steps, features, and/or attributes disclosed herein can be executed by one or more controllers featuring one or more electronic processors (e.g., electronic processors in computing devices and/or pre-programmed integrated circuits) executing programs based on standard programming techniques. Such programs are designed to execute on programmable computing apparatus or specifically designed integrated circuits, each comprising a processor, an optional data storage system (including memory and/or storage elements), optionally at least one input device, and optionally at least one output device, such as a display or printer. The program code is applied to input data to perform functions and generate output information which is applied to one or more output devices.

Each such computer program can be implemented in a high-level procedural or obj ect-oriented programming language, or an assembly or machine language. Furthermore, the language can be a compiled or interpreted language. Each such computer program can be stored on a computer readable storage medium (e.g., optical storage medium such as CD-ROM or DVD, magnetic storage medium, and/or persistent solid state storage medium) that, when read by a computer, processor, or electronic circuit, can cause the computer, processor, or electronic circuit to perform the analysis and control functions described herein.

Other Embodiments

Additional aspects and features of wireless power transfer systems and methods of wirelessly transferring electrical power are disclosed, for example, in U.S. patent application Ser. No. 14/044,440, filed on Oct. 2, 2013, the entire contents of which are incorporated herein by reference.

Other embodiments are within the scope of this disclosure.

What is claimed is:

1. A power transmitting apparatus for wireless power transfer to a receiver, the apparatus comprising:
    a housing having a form factor that corresponds to a container comprising lateral surfaces, a bottom surface, and an opening opposite the bottom surface;
    a first coil comprising a first plurality of non-planar loops of electrically conductive material, wherein the first plurality of loops conforms to a first pair of opposite lateral surfaces and to the bottom surface; and
    a second coil comprising a second plurality of non-planar loops of electrically conductive material, wherein the second plurality of loops conforms to a second pair of opposite lateral surfaces and to the bottom surface.

2. The apparatus of claim 1, wherein the first and second coils are positioned so that during operation of the power transmitting apparatus, the first coil generates a magnetic field having a dipole moment that extends in a first direction, and the second coil generates a magnetic field having a dipole moment that extends in a second direction substantially perpendicular to the first direction.

3. The apparatus of claim 1, wherein the housing comprises a first layer comprising magnetic material.

4. The apparatus of claim 3, wherein the magnetic material comprises a ferrite material.

5. The apparatus of claim 3, wherein the housing comprises a second layer comprising a shielding material.

6. The apparatus of claim 5, wherein the shielding material comprises copper.

7. The apparatus of claim 1, further comprising a third coil comprising a third plurality of non-planar loops of electrically conductive material, wherein the third plurality of loops conforms to each of the lateral surfaces.

8. The apparatus of claim 7, wherein during operation of the power transmitting apparatus, the third coil generates a magnetic field having a dipole moment that extends in a third direction substantially perpendicular to the first and second directions.

9. The apparatus of claim 7, wherein the first, second, and third coils are printed on one or more circuit boards.

10. The apparatus of claim 8, wherein the first and second directions are substantially parallel to a plane defined by the bottom surface, and wherein the third direction is substantially perpendicular to the bottom surface.

11. The apparatus of claim 7, further comprising a control unit connected to each of the first, second, and third coils, wherein during operation, the control unit is configured to:
apply a first oscillating electrical potential to the first coil; and
apply a second oscillating electrical potential to the second coil, wherein the second oscillating electrical potential is out of phase with respect to the first oscillating electrical potential.

12. The apparatus of claim 11, wherein the first and second oscillating electrical potentials are out of phase by about 90°.

13. The apparatus of claim 11, wherein the control unit is configured to apply a third oscillating electrical potential to a third coil, the third coil comprising a plurality of non-planar loops that conform to each of the lateral surfaces, and to vary a phase difference between and first and third oscillating electrical potentials between 0° and 90°.

14. The apparatus of claim 7, further comprising a first decoupling unit connected to the first coil, a second decoupling unit connected to the second coil, and a third decoupling unit connected to the third coil.

15. The apparatus of claim 14, wherein at least one of the decoupling units comprises inductors.

16. The apparatus of claim 14, wherein at least one of the decoupling units comprises inductors connected in parallel to capacitors.

17. The apparatus of claim 16, wherein the capacitors comprise capacitors having a variable capacitance.

18. The apparatus of claim 14, wherein:
the first decoupling unit comprises a first decoupling element configured to reduce magnetic coupling between the first coil and the second coil, and a second decoupling element configured to reduce magnetic coupling between the first coil and the third coil;
the second decoupling unit comprises a third decoupling element configured to reduce magnetic coupling between the second coil and the first coil, and a fourth decoupling element configured to reduce magnetic coupling between the second coil and the third coil; and
the third decoupling unit comprises a fifth decoupling element configured to reduce magnetic coupling between the third coil and the first coil, and a sixth decoupling element configured to reduce magnetic coupling between the third coil and the second coil.

19. The apparatus of claim 18, wherein each of the first, second, third, fourth, fifth, and sixth decoupling elements comprises an inductor, and wherein the control unit is configured to adjust positions of the first, second, third, fourth, fifth, and sixth decoupling elements to reduce magnetic coupling between the first, second, and third coils.

20. The apparatus of claim 18, wherein each of the first, second, third, fourth, fifth, and sixth decoupling elements comprises an inductor connected in parallel to a capacitor having a variable capacitance, and wherein the control unit is configured to adjust capacitances of each of the capacitors in the first, second, third, fourth, fifth, and sixth decoupling elements to reduce magnetic coupling between the first, second, and third coils.

21. The apparatus of claim 1, wherein each lateral surface of the housing comprises a first edge width measured at a position where the lateral surface contacts the bottom surface, and a second edge width measured at an opening opposite to the position where the lateral surface contacts the bottom surface, and wherein the second edge width is larger than the first edge width.

* * * * *